(12) United States Patent
Baba et al.

(10) Patent No.: US 9,454,070 B2
(45) Date of Patent: *Sep. 27, 2016

(54) PROJECTION OPTICAL SYSTEM AND PROJECTION-TYPE DISPLAY APPARATUS

(71) Applicant: FUJIFILM Corporation, Tokyo (JP)

(72) Inventors: Tomoyuki Baba, Saitama-ken (JP);
Masanao Kawana, Saitama-ken (JP);
Masaru Amano, Saitama-ken (JP);
Takeshi Kamiya, Saitama-ken (JP)

(73) Assignee: FUJIFILM Corporation, Tokyo (JP)

(*) Notice: Subject to any disclaimer, the term of this patent is extended or adjusted under 35 U.S.C. 154(b) by 80 days.

This patent is subject to a terminal disclaimer.

(21) Appl. No.: 14/488,720

(22) Filed: Sep. 17, 2014

(65) Prior Publication Data
US 2015/0077722 A1 Mar. 19, 2015

(30) Foreign Application Priority Data
Sep. 19, 2013 (JP) .................. 2013-193987

(51) Int. Cl.
*G03B 21/28* (2006.01)
*G02B 15/177* (2006.01)
*G02B 17/08* (2006.01)

(52) U.S. Cl.
CPC ............ *G03B 21/28* (2013.01); *G02B 15/177* (2013.01); *G02B 17/08* (2013.01); *G02B 17/0852* (2013.01); *G02B 17/0856* (2013.01)

(58) Field of Classification Search
CPC .. G02B 17/08; G02B 17/0856; G02B 13/16; G02B 13/0095; G02B 21/28; G02B 15/173; G02B 15/177

See application file for complete search history.

(56) References Cited

U.S. PATENT DOCUMENTS

| 6,989,936 | B2* | 1/2006 | Hatakeyama | G02B 13/16 359/649 |
| 7,448,760 | B2 | 11/2008 | Yamagishi | |
| 8,482,851 | B2* | 7/2013 | Nagatoshi | G02B 17/08 353/98 |

FOREIGN PATENT DOCUMENTS

| JP | 2007-323047 | 12/2007 |
| JP | 2007-334052 | 12/2007 |
| JP | 4731808 | 7/2011 |
| JP | 4889289 | 3/2012 |

* cited by examiner

*Primary Examiner* — Sultan Chowdhury
(74) *Attorney, Agent, or Firm* — Young & Thompson

(57) ABSTRACT

In a projection optical system that projects an image displayed on an image display device arranged on a reduction-side conjugate plane onto a magnification-side conjugate plane, as a magnified image, the projection optical system includes a refractive optical system and a reflective optical system having negative refractive power in this order from a reduction side. Further, the following conditional formula (1) is satisfied:

$$L/D+2\omega_{min}/\omega_{max} \leq 1.01 \quad (1).$$

20 Claims, 45 Drawing Sheets

EXAMPLE 1

FIG.2 EXAMPLE 2

EXAMPLE 4

EXAMPLE 5

EXAMPLE 6

FIG.8 EXAMPLE 8

FIG.9 EXAMPLE 9

EXAMPLE 12

FIG.17 EXAMPLE 17

EXAMPLE 1

EXAMPLE 2

EXAMPLE 3

EXAMPLE 4

EXAMPLE 5

EXAMPLE 6

EXAMPLE 7

EXAMPLE 8

EXAMPLE 9

EXAMPLE 10

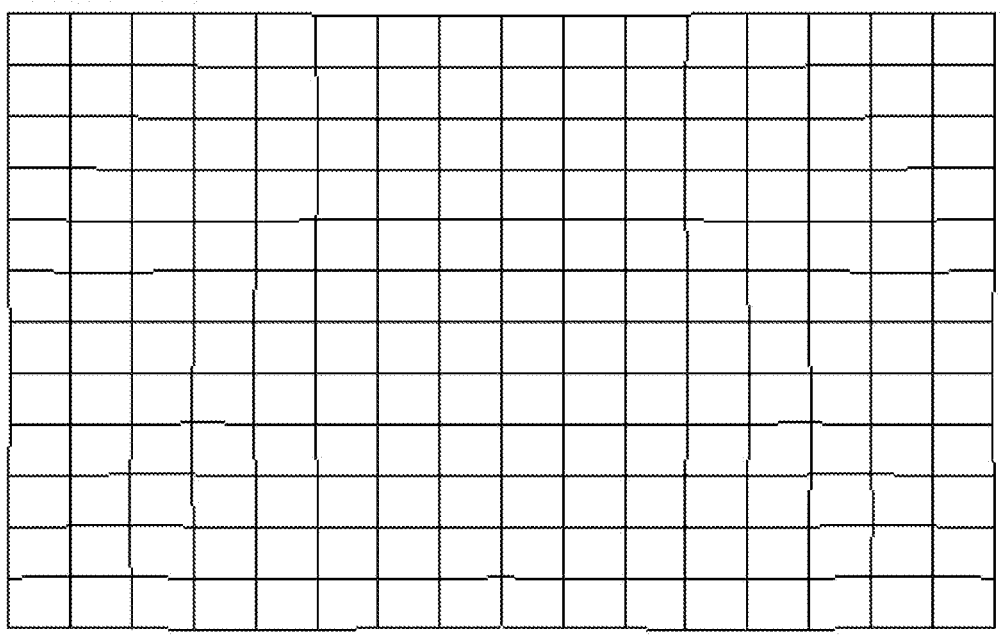
FIG.28 EXAMPLE 11
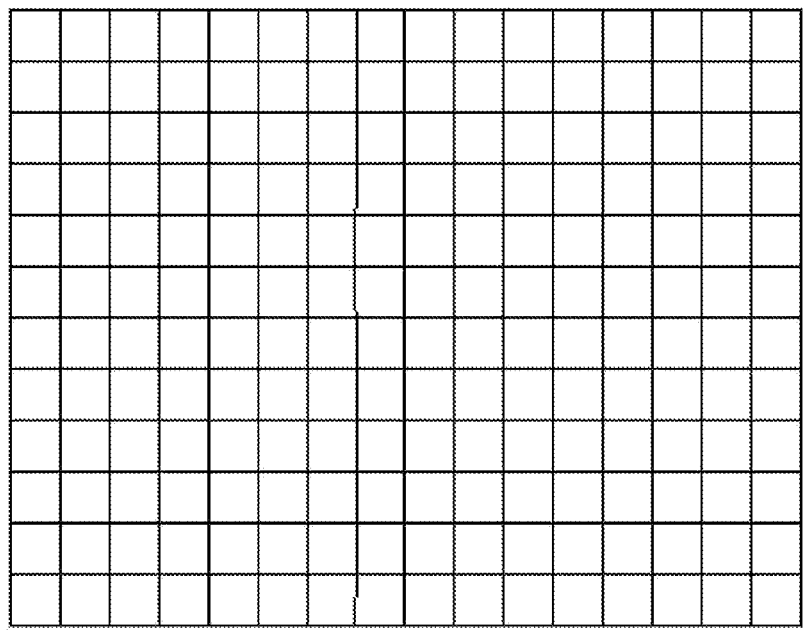
FIG.29 EXAMPLE 12

EXAMPLE 13

EXAMPLE 14

EXAMPLE 15

EXAMPLE 16

EXAMPLE 17

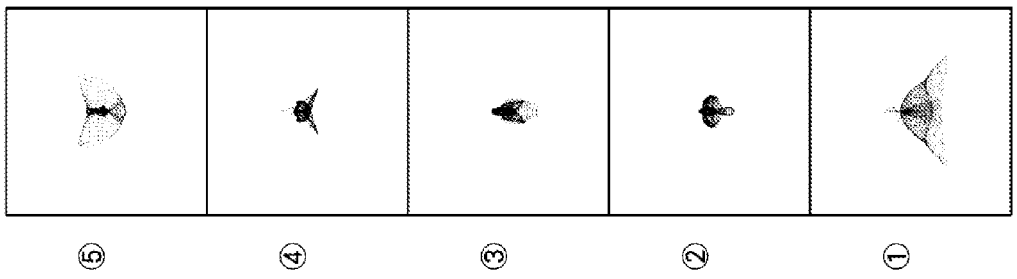
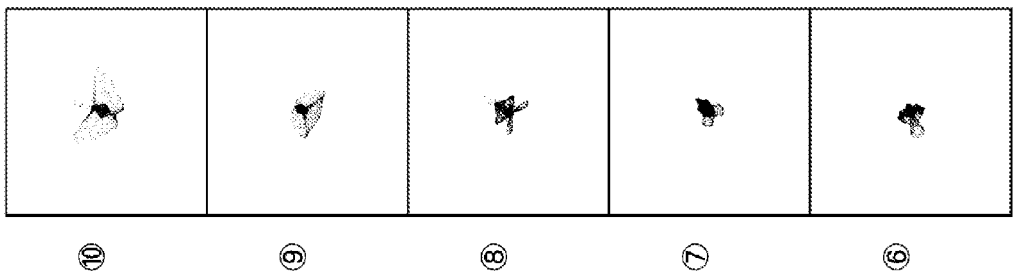
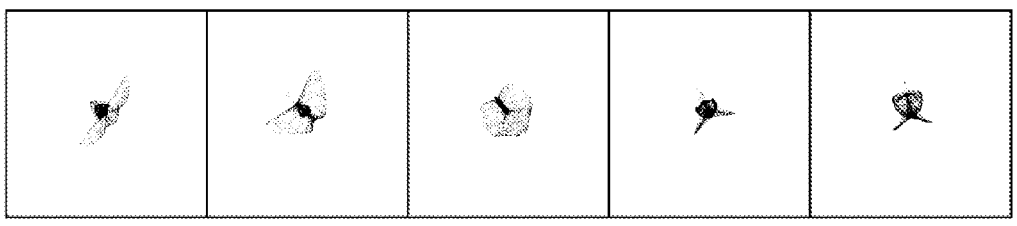
FIG.35

FIG.36
| EVALUATION POINTS IN IMAGE DISPLAY DEVICE | X | Y |
|---|---|---|
| ① | 0.0000 | -1.5000 |
| ② | 0.0000 | -3.6600 |
| ③ | 0.0000 | -5.8200 |
| ④ | 0.0000 | -7.9800 |
| ⑤ | 0.0000 | -10.1400 |
| ⑥ | -3.4560 | -1.5000 |
| ⑦ | -3.4560 | -3.6600 |
| ⑧ | -3.4560 | -5.8200 |
| ⑨ | -3.4560 | -7.9800 |
| ⑩ | -3.4560 | -10.1400 |
| ⑪ | -6.9120 | -1.5000 |
| ⑫ | -6.9120 | -3.6600 |
| ⑬ | -6.9120 | -5.8200 |
| ⑭ | -6.9120 | -7.9800 |
| ⑮ | -6.9120 | -10.1400 |
SCALE : 5mm
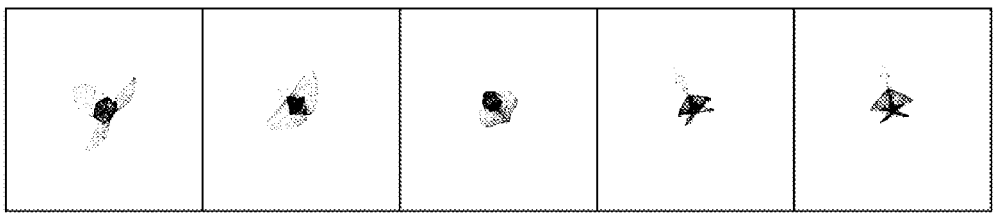
⑮ ⑭ ⑬ ⑫ ⑪
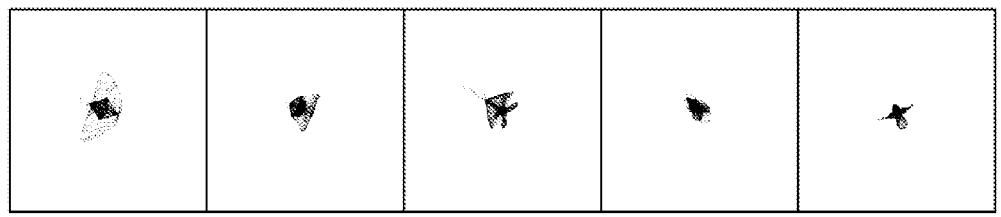
⑩ ⑨ ⑧ ⑦ ⑥
EXAMPLE 2
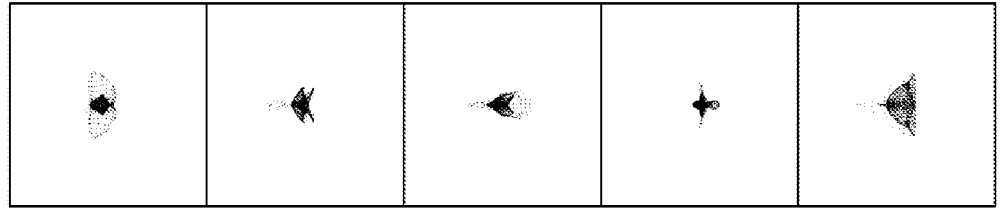
⑤ ④ ③ ② ①

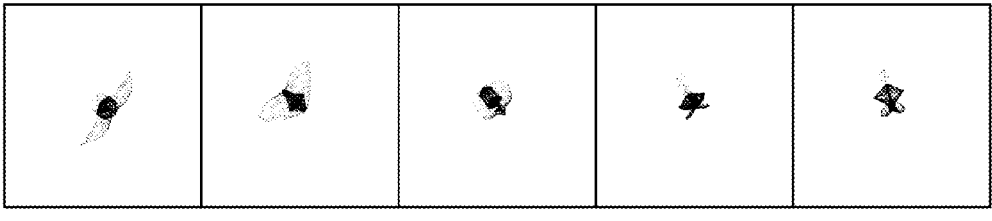
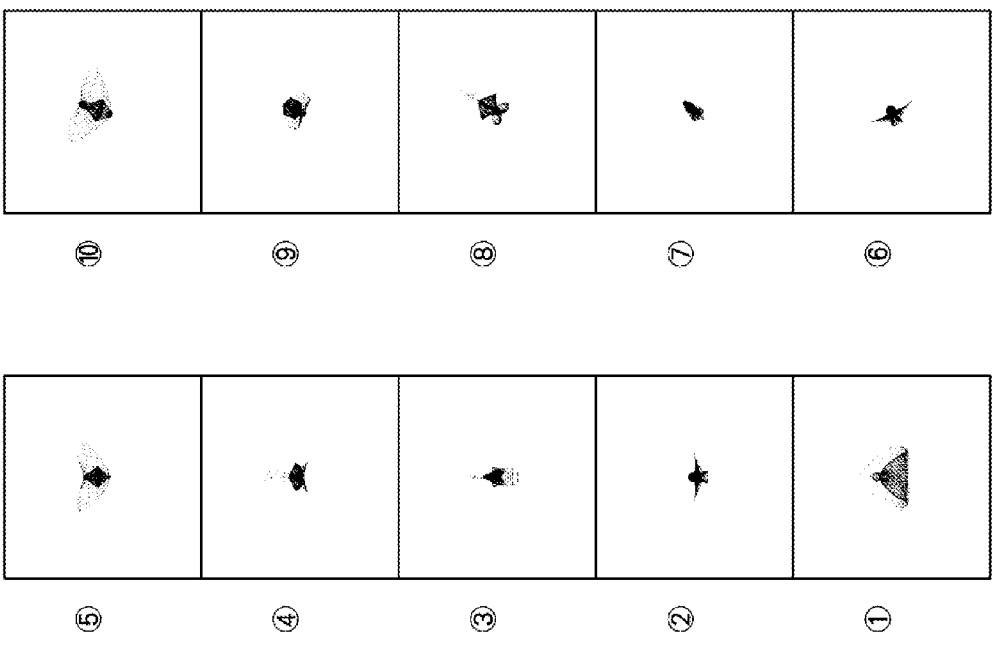
FIG.37

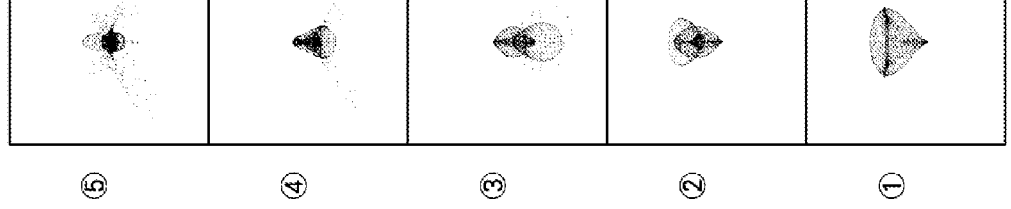
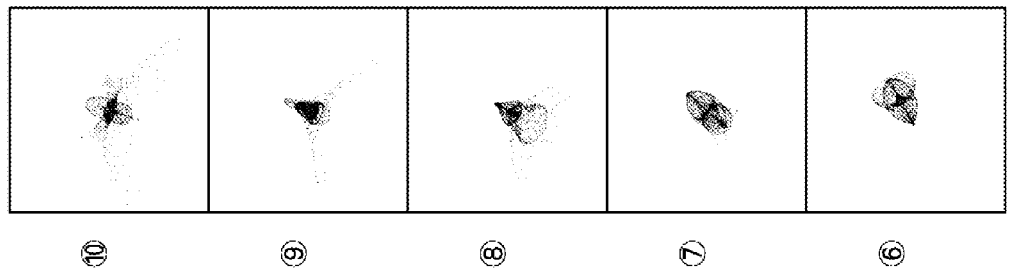
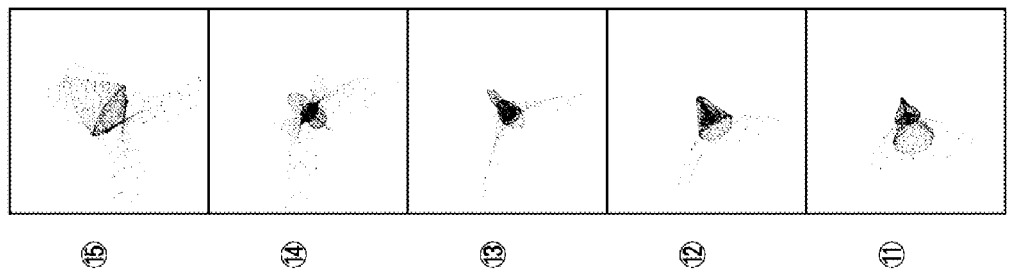
FIG.39

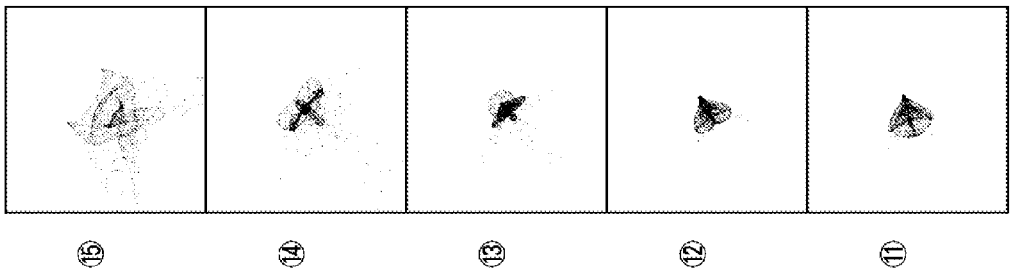
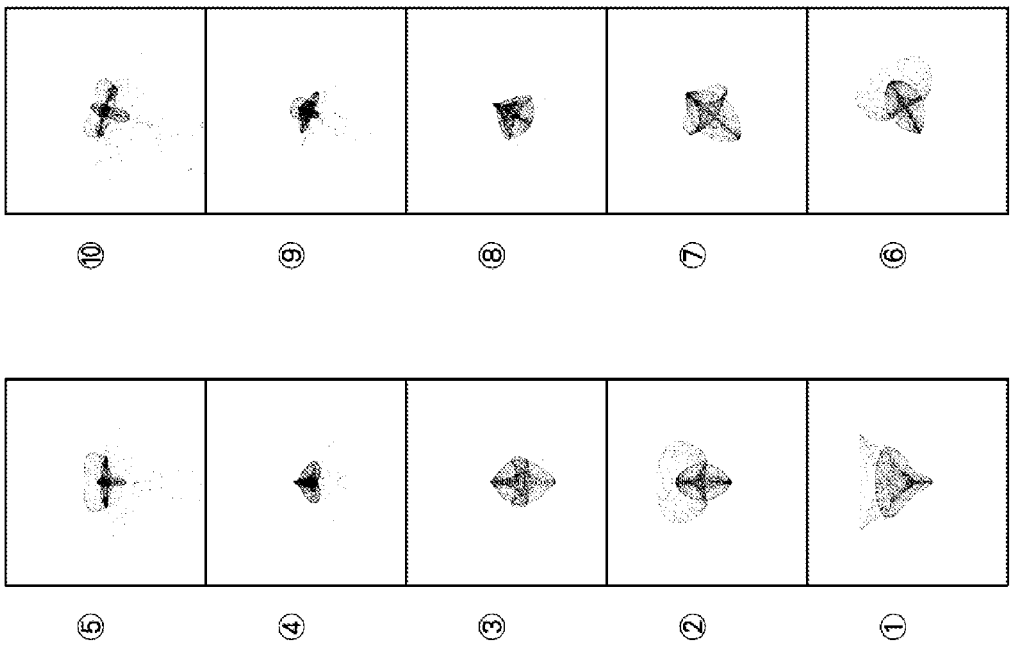
FIG.40

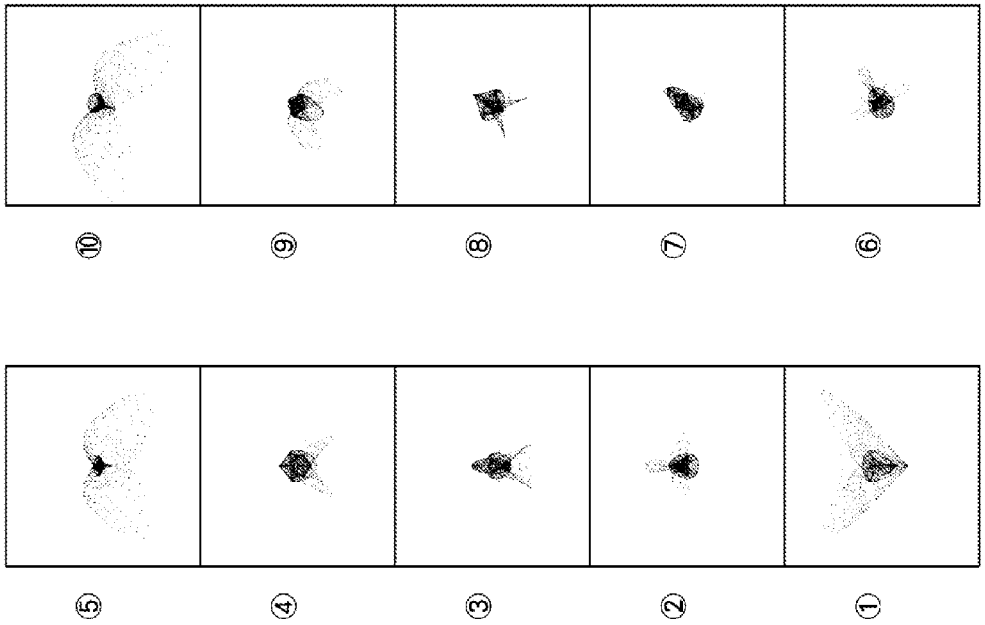
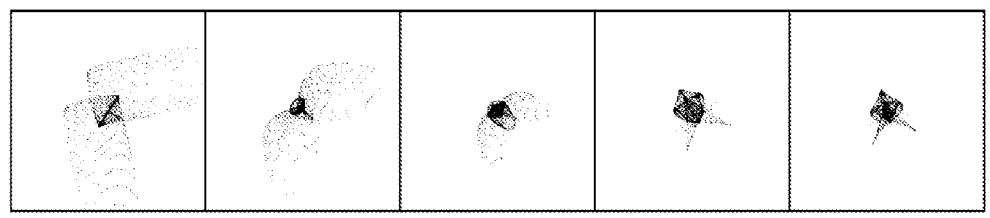
EXAMPLE 8
FIG.42
| EVALUATION POINTS IN IMAGE DISPLAY DEVICE | X | Y |
|---|---|---|
| ① | 0.0000 | -2.0000 |
| ② | 0.0000 | -4.1600 |
| ③ | 0.0000 | -6.3200 |
| ④ | 0.0000 | -8.4800 |
| ⑤ | 0.0000 | -10.6400 |
| ⑥ | -3.4560 | -2.0000 |
| ⑦ | -3.4560 | -4.1600 |
| ⑧ | -3.4560 | -6.3200 |
| ⑨ | -3.4560 | -8.4800 |
| ⑩ | -3.4560 | -10.6400 |
| ⑪ | -6.9120 | -2.0000 |
| ⑫ | -6.9120 | -4.1600 |
| ⑬ | -6.9120 | -6.3200 |
| ⑭ | -6.9120 | -8.4800 |
| ⑮ | -6.9120 | -10.6400 |
SCALE : 5mm

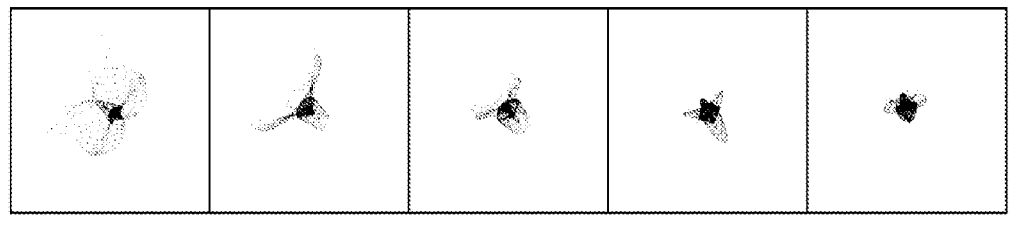
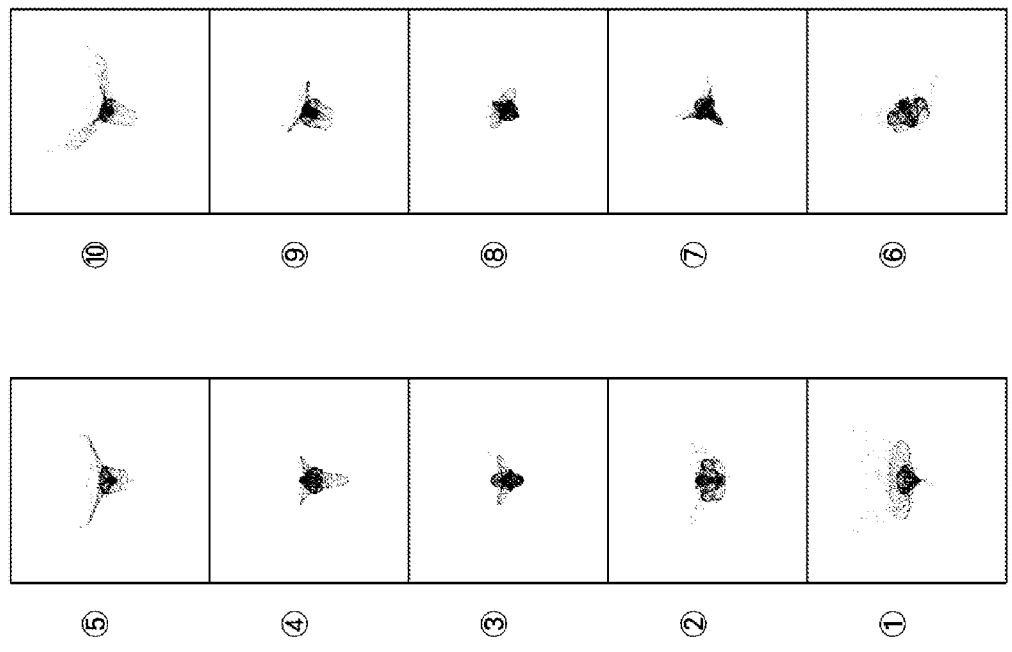
FIG. 43

FIG.49
EVALUATION POINTS IN IMAGE DISPLAY DEVICE
| | X | Y |
|---|---|---|
| ① | 0.0000 | -0.9000 |
| ② | 0.0000 | -2.0525 |
| ③ | 0.0000 | -3.2050 |
| ④ | 0.0000 | -4.3575 |
| ⑤ | 0.0000 | -5.5100 |
| ⑥ | -2.0500 | -0.9000 |
| ⑦ | -2.0500 | -2.0525 |
| ⑧ | -2.0500 | -3.2050 |
| ⑨ | -2.0500 | -4.3575 |
| ⑩ | -2.0500 | -5.5100 |
| ⑪ | -4.1000 | -0.9000 |
| ⑫ | -4.1000 | -2.0525 |
| ⑬ | -4.1000 | -3.2050 |
| ⑭ | -4.1000 | -4.3575 |
| ⑮ | -4.1000 | -5.5100 |
SCALE : 5mm
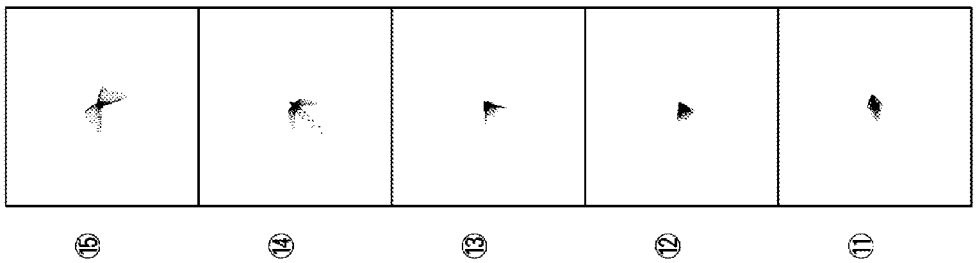
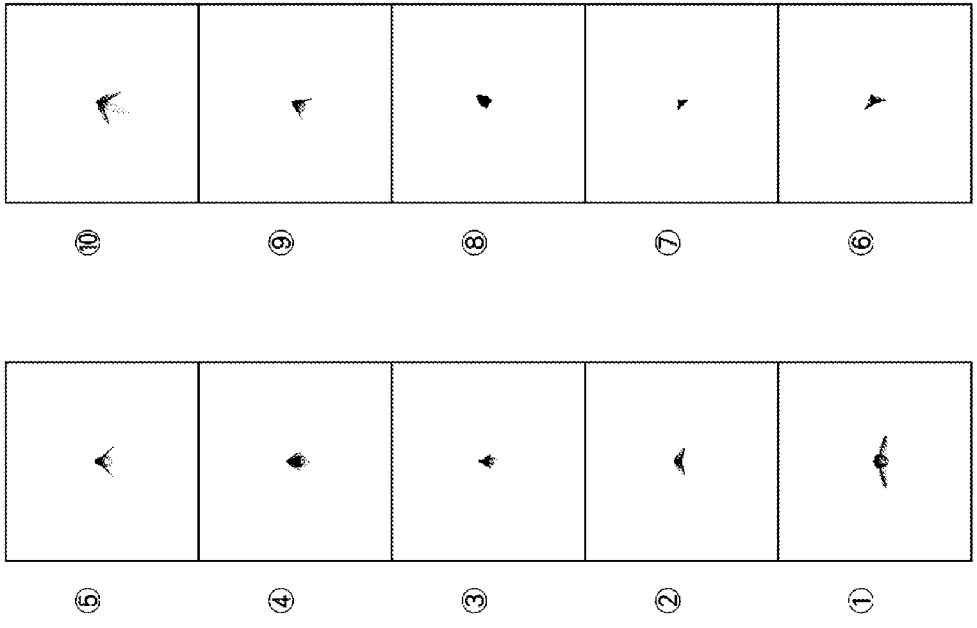
EXAMPLE 15

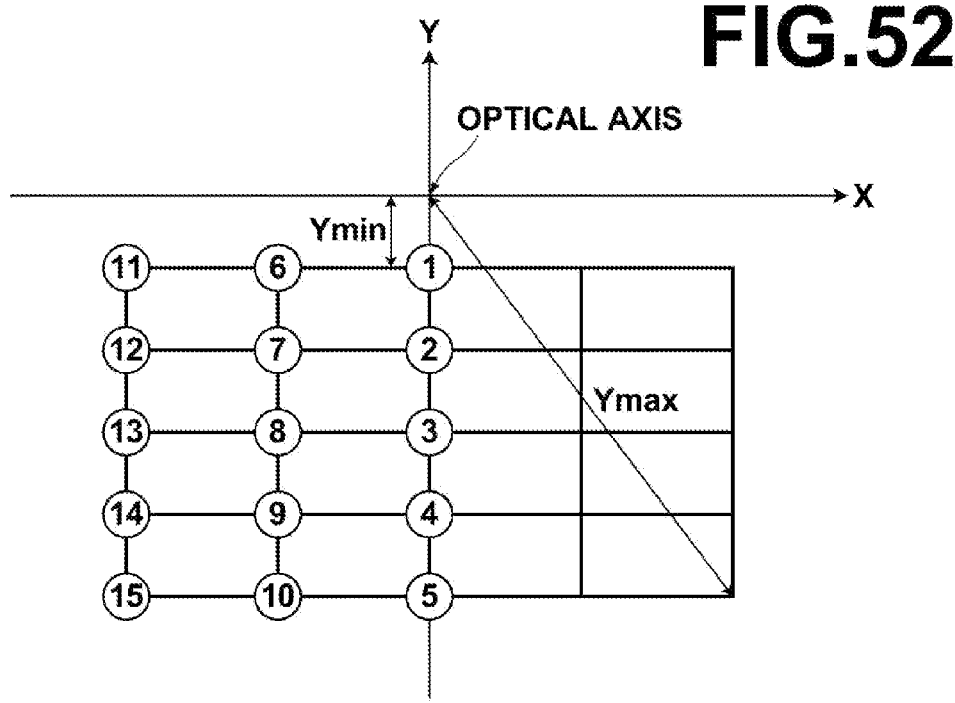
FIG.52 ☆ EVALUATION POINTS IN IMAGE DISPLAY DEVICE
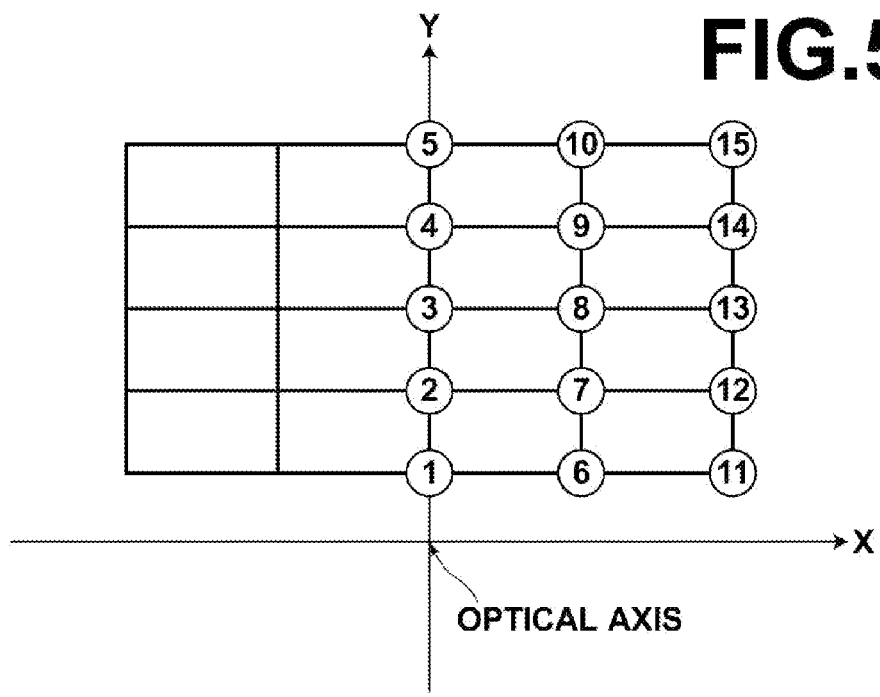
FIG.53 ☆ EVALUATION POINTS IN MAGNIFIED IMAGE ON MAGNIFICATION-SIDE CONJUGATE PLANE

PROJECTION OPTICAL SYSTEM AND PROJECTION-TYPE DISPLAY APPARATUS

CROSS-REFERENCE TO RELATED APPLICATIONS

The present application claims priority under 35 U.S.C. §119 to Japanese Patent Application No. 2013-193987, filed on Sep. 19, 2013. The above application is hereby expressly incorporated by reference, in its entirety, into the present application.

BACKGROUND OF THE INVENTION

1. Field of the Invention

The present invention relates to a projection optical system that uses a refractive optical system and a reflective optical system, and which forms, on a screen, an image of an image displayed on an image display device, and also to a projection-type display apparatus including the projection optical system.

2. Description of the Related Art

As a projection-type display apparatus including a projection optical system that uses a refractive optical system and a reflective optical system, and which forms, on a screen, an image of an image displayed on an image display device, apparatuses disclosed in Japanese Unexamined Patent Publication No. 2007-323047 (Patent Document 1), Japanese Unexamined Patent Publication No. 2007-334052 (Patent Document 2), Specification of Japanese Patent No. 4731808 (Patent Document 3) and Specification of Japanese Patent No. 4889289 (Patent Document 4) are known.

SUMMARY OF THE INVENTION

In the projection optical system and the projection-type display apparatus including the projection optical system, as described above, further reduction in the size and the cost of the apparatus and a shorter projection distance while a magnified video image in sufficient size is displayed on a screen are requested.

In view of the foregoing circumstances, it is an object of the present invention to provide a projection optical system that can display a magnified video image in sufficient size on a screen at a short projection distance while achieving reduction in the size and the cost of an apparatus, and also a projection-type display apparatus including the projection optical system.

A projection optical system of the present invention projects an image displayed on an image display device arranged on a reduction-side conjugate plane onto a magnification-side conjugate plane, as a magnified image. The projection optical system includes a refractive optical system and a reflective optical system having negative refractive power in this order from a reduction side, and the following conditional formula (1) is satisfied:

$$L/D + 2\omega min/\omega max \leq 1.01 \qquad (1), \text{ where}$$

L: a distance on an optical axis between the reflective optical system and the magnification-side conjugate plane,
D: a diagonal length of the magnified image,
ωmin: a minimum angle of incidence of a chief ray entering the magnification-side conjugate plane, and
ωmax: a maximum angle of incidence of the chief ray entering the magnification-side conjugate plane.

In the projection optical system of the present invention, it is desirable that the refractive optical system and the reflective optical system have a common optical axis.

Further, it is desirable that the refractive optical system and the reflective optical system are rotationally symmetric about the optical axis.

Further, it is desirable that the reflective optical system substantially consists of a mirror having negative refractive power.

It is desirable that the following conditional formula (2) is satisfied:

$$\omega min/\omega max \leq 0.60 \qquad (2).$$

It is desirable that the following conditional formula (3) is satisfied:

$$0.095 \leq L/D \leq 0.45 \qquad (3).$$

It is desirable that the following conditional formula (4) is satisfied:

$$|\cos \theta - 2 \cos \phi \cos \psi| \leq 0.6 \qquad (4), \text{ where}$$

θ: an angle between a chief ray from a most peripheral area on a display surface of the image display device and the optical axis when the chief ray exits from the refractive optical system,
φ: an angle between a normal to the reflective optical system and the optical axis at a point where the chief ray from the most peripheral area on the display surface enters the reflective optical system, and
ψ: an angle between the chief ray and the normal to the reflective optical system at the point where the chief ray from the most peripheral area on the display surface enters the reflective optical system.

It is desirable that the following conditional formula (5) is satisfied:

$$0.05 \leq (ZL+ZD)/Hm \leq 2.1 \qquad (5), \text{ where}$$

ZL: a total length of the refractive optical system,
ZD: a distance on an optical axis between the refractive optical system and the reflective optical system, and
Hm: a maximum effective diameter at a reflection surface of the reflective optical system.

It is desirable that the refractive optical system includes at least one aspheric lens between optical element Lp and the reflective optical system when an optical element (a single lens or a cemented lens) including one of a spherical surface or surfaces arranged closest to a magnification side in the refractive optical system is optical element Lp.

It is desirable that a second lens group, as a whole, has positive refractive power when a lens system (which does not include optical element Lp) arranged between optical element Lp and the reflective optical system is a first lens group in the refractive optical system and a lens system including optical element Lp, and which is arranged toward a reduction side of the optical element Lp, is the second lens group in the refractive optical system.

Further, the first lens group may substantially consist of two lenses of an aspheric lens having negative refractive power and an aspheric lens having positive refractive power in this order from the magnification side. Alternatively, the first lens group may substantially consist of an aspheric lens having negative refractive power.

Further, it is desirable that a most-magnification-side surface of optical element Lp has a convex shape toward the magnification side.

It is desirable that a most-reduction-side surface of optical element Lp has a concave shape facing the reduction side.

Further, it is desirable that optical element Lp has negative refractive power.

Further, the second lens group may substantially consist of a 2a-th lens group, in which optical element Lp, a positive lens with its convex surface facing the magnification side, a negative lens with its concave surface facing the magnification side, a positive lens with its convex surface facing the reduction side and at least one positive lens having biconvex shape are arranged in this order from the magnification side, and a 2b-th lens group arranged toward the reduction side of the 2a-th lens group, and in which a most-magnification-side optical element (a single lens or a cemented lens) has negative refractive power. Alternatively, the second lens group may substantially consist of a 2a-th lens group, in which optical element Lp, a negative lens with its concave surface facing the magnification side, a positive lens with its convex surface facing the reduction side and at least one positive lens having biconvex shape are arranged in this order from the magnification side, and a 2b-th lens group arranged toward the reduction side of the 2a-th lens group, and in which a most-magnification-side optical element (a single lens or a cemented lens) has negative refractive power.

It is desirable that the 2a-th lens group, as a whole, has positive refractive power.

It is desirable that the 2b-th lens group, as a whole, has positive refractive power.

It is desirable that the 2b-th lens group includes at least one aspheric lens.

It is desirable that the following conditional formula (1-1) is satisfied:

$$L/D+2\omega min/\omega max \leq 0.97 \qquad (1\text{-}1).$$

Further, it is desirable that the following conditional formula (2-1) is satisfied:

$$\omega min/\omega max \leq 0.45 \qquad (2\text{-}1).$$

It is desirable that the following conditional formula (3-1) is satisfied:

$$0.11 \leq L/D \leq 0.35 \qquad (3\text{-}1)$$

Further, it is desirable that the following conditional formula (4-1) is satisfied:

$$|\cos \theta - 2 \cos \phi \cos \psi| \leq 0.4 \qquad (4\text{-}1).$$

Further, it is desirable that the following conditional formula (5-1) is satisfied:

$$1.0 \leq (ZL+ZD)/Hm \leq 1.6 \qquad (5\text{-}1).$$

A projection-type display apparatus of the present invention includes a light source, a light valve on which light from the light source is incident, and the aforementioned projection optical system of the present invention, as a projection optical system that projects an optical image of light that has been optically modulated by the light valve onto a screen.

Here, the expression "substantially consisting of" means that lenses substantially without any refractive power, optical elements other than lenses, such as a stop, a mask, a cover glass and a filter, mechanism parts, such as a lens flange, a lens barrel, an imaging device and a hand shake blur correction mechanism, and the like may be included in addition to the lens groups mentioned as composition elements.

The surface shape of the lens and the sign of the refractive power of the lens are considered in a paraxial region when the lens includes an aspherical surface.

Further, the term "chief ray" means a ray crossing the optical axis at an entrance pupil position.

A projection optical system of the present invention projects an image displayed on an image display device arranged on a reduction-side conjugate plane onto a magnification-side conjugate plane, as a magnified image. The projection optical system includes a refractive optical system and a reflective optical system having negative refractive power in this order from a reduction side, and the following conditional formula (1) is satisfied. Therefore, it is possible to display a magnified video image in sufficient size on a screen at a short projection distance while achieving reduction in the size and the cost of the optical system.

$$L/D+2\omega min/\omega max \leq 1.01 \qquad (1)$$

The projection-type display apparatus of the present invention includes the projection optical system of the present invention. Therefore, it is possible to display a magnified video image in sufficient size on a screen at a short projection distance while achieving reduction in the size and the cost of the apparatus.

BRIEF DESCRIPTION OF THE DRAWINGS

FIG. 28 is a diagram illustrating distortion performance of the projection optical system in Example 11 of the present invention;

FIG. 29 is a diagram illustrating distortion performance of the projection optical system in Example 12 of the present invention;

FIG. 35 is a diagram illustrating spot performance of the projection optical system in Example 1 of the present invention;

FIG. 36 is a diagram illustrating spot performance of the projection optical system in Example 2 of the present invention;

FIG. 37 is a diagram illustrating spot performance of the projection optical system in Example 3 of the present invention;

FIG. 39 is a diagram illustrating spot performance of the projection optical system in Example 5 of the present invention;

FIG. 40 is a diagram illustrating spot performance of the projection optical system in Example 6 of the present invention;

FIG. 42 is a diagram illustrating spot performance of the projection optical system in Example 8 of the present invention;

FIG. 43 is a diagram illustrating spot performance of the projection optical system in Example 9 of the present invention;

FIG. 49 is a diagram illustrating spot performance of the projection optical system in Example 15 of the present invention;

FIG. 52 is a diagram illustrating evaluation points in an image display device;

FIG. 53 is a diagram illustrating evaluation points in a magnified image on a magnification-side conjugate plane.

DESCRIPTION OF THE PREFERRED EMBODIMENTS

Figure 1:
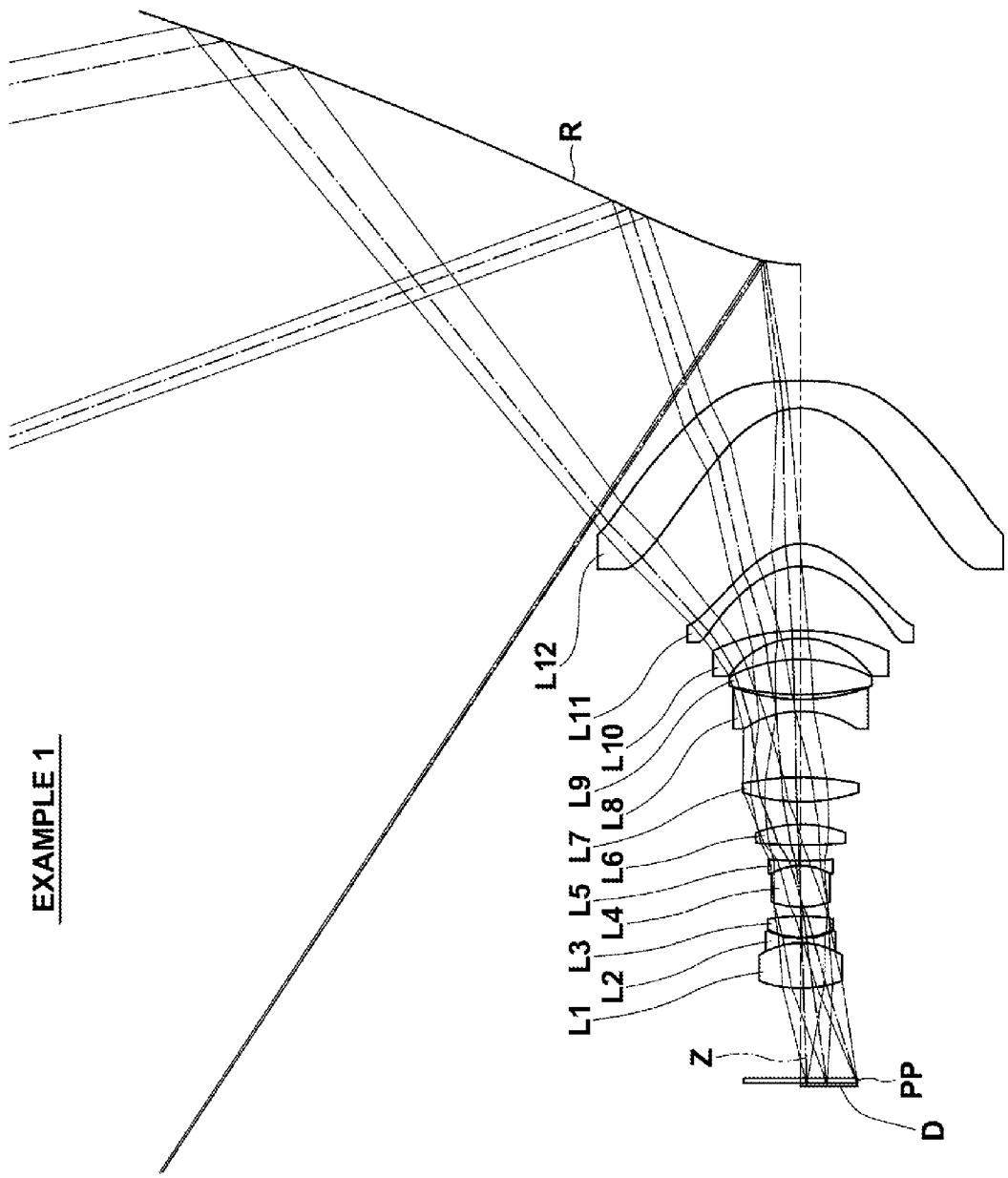
FIG. 1 is a cross section illustrating the structure of a projection optical system according to an embodiment of the present invention (common to Example 1)

Embodiments of the present invention will be described in detail with reference to drawings. FIG. 1 is a cross section illustrating the structure of a projection optical system according to an embodiment of the present invention. The example of structure illustrated in FIG. 1 is common to the structure of a projection optical system in Example 1, which will be described later. In FIG. 1, the left side is a reduction side, and the right side is a magnification side.

As illustrated in FIG. 1, this projection optical system projects an image displayed on image display device D arranged on a reduction-side conjugate plane onto a magnification-side conjugate plane, as a magnified image. The projection optical system includes a refractive optical system substantially consisting of lenses L1 through L12 and reflective optical system R having negative refractive power in this order from a reduction side along optical axis Z.

Image display device D is arranged at a position of so-called full shift or more so that no part of a whole display surface of image display device ID crosses optical axis Z.

When this projection optical system is applied to a projection-type display apparatus, it is desirable to arrange a cover glass, a prism, and various filters, such as an infrared-ray-cut filter and a low-pass filter, between image display device D and the refractive optical system based on the configuration of the apparatus. Therefore, FIG. 1 illustrates an example in which parallel-flat-plate-shaped optical member PP, assuming these elements, is arranged between image display device D and the refractive optical system.

The projection optical system is structured in such a manner to satisfy the following conditional formula (1). Therefore, it is possible to display a magnified video image in sufficient size on a screen at a short projection distance while achieving reduction in the size and the cost of the optical system. When the following conditional formula (1-1) is satisfied, more excellent properties are achievable:

$$L/D+2\omega min/\omega max \leq 1.01 \quad (1); \text{ and}$$

$$L/D+2\omega min/\omega max \leq 0.97 \quad (1\text{-}1), \text{ where}$$

L: a distance on an optical axis between the reflective optical system and the magnification-side conjugate plane, D: a diagonal length of the magnified image, $\omega min$: a minimum angle of incidence of a chief ray entering the magnification-side conjugate plane, and $\omega max$: a maximum angle of incidence of the chief ray entering the magnification-side conjugate plane.

In the projection optical system, it is desirable that the refractive optical system and reflective optical system R have a common optical axis. Further, it is desirable that the refractive optical system and the reflective optical system are rotationally symmetric about the optical axis. Further, it is desirable that the reflective optical system substantially consists of a mirror having negative refractive power. Accordingly, it is possible to simplify the structure of the projection optical system, and that contributes to reduction in cost.

Further, it is desirable that the following conditional formula (2) is satisfied. Accordingly, it becomes possible to display a magnified video image in sufficient size on a screen at a short projection distance. When the following conditional formula (2-1) is satisfied, more excellent properties are achievable:

$$\omega min/\omega max \leq 0.60 \quad (2); \text{ and}$$

$$\omega min/\omega max \leq 0.45 \quad (2\text{-}1).$$

Further, it is desirable that the following conditional formula (3) is satisfied. When the value does not exceed the upper limit of conditional formula (3), it becomes possible to display a magnified video image in sufficient size on a screen at a short projection distance. When the value is not lower than the lower limit of conditional formula (3), reduction in the size and the cost of the optical system is achievable. When the following conditional formula (3-1) is satisfied, more excellent properties are achievable:

$$0.095 \leq L/D \leq 0.45 \quad (3);$$

$$0.11 \leq L/D \leq 0.35 \quad (3\text{-}1).$$

Further, it is desirable that the following conditional formula (4) is satisfied. Accordingly, it becomes possible to display a magnified video image in sufficient size on a screen at a short projection distance while achieving reduction in the size and the cost of the optical system. When the following conditional formula (4-1) is satisfied, more excellent properties are achievable:

$$|\cos \theta - 2 \cos \phi \cos \psi| \leq 0.6 \quad (4); \text{ and}$$

$$|\cos \theta - 2 \cos \phi \cos \psi| \leq 0.4 \quad (4\text{-}1), \text{ where}$$

$\theta$: an angle between a chief ray from a most peripheral area on a display surface of the image display device and the optical axis when the chief ray exits from the refractive optical system, $\phi$: an angle between a normal to the reflective optical system and the optical axis at a point where the chief ray from the most peripheral area on the display surface enters the reflective optical system, and $\psi$: an angle between the chief ray and the normal to the reflective optical system at the point where the chief ray from the most peripheral area on the display surface enters the reflective optical system.

Further, it is desirable to satisfy the following conditional formula (5). Accordingly, it becomes possible to display a magnified video image in sufficient size on a screen at a short projection distance while achieving reduction in the size and the cost of the optical system. When the following conditional formula (5-1) is satisfied, more excellent properties are achievable:

$$0.5 \leq (ZL+ZD)/Hm \leq 2.1 \quad (5); \text{ and}$$

$$1.0 \leq (ZL+ZD)/Hm \leq 1.6 \quad (5\text{-}1), \text{ where}$$

ZL: a total length of the refractive optical system,

ZD: a distance on the optical axis between the refractive optical system and the reflective optical system, and Hm: a maximum effective diameter at a reflection surface of the reflective optical system.

Further, it is desirable that the refractive optical system includes at least one aspheric lens between optical element Lp and reflective optical system R when an optical element (a single lens or a cemented lens) including one of a spherical surface or surfaces arranged closest to a magnification side in the refractive optical system is optical element Lp. Accordingly, it is possible to excellently correct various aberrations generated in reflective optical system R. In the embodiment of the present invention, lens L10 corresponds to optical element Lp, and the projection optical system includes two aspheric lenses L11, L12 between optical element Lp and reflective optical system R.

It is desirable that a second lens group, as a whole, has positive refractive power when a lens system (which does not include optical element Lp) arranged between optical element Lp and reflective optical system R is a first lens group in the refractive optical system and a lens system including the optical element Lp, and which is arranged toward a reduction side of the optical element Lp, is the second lens group in the refractive optical system. Accordingly, it is possible to excellently correct various aberrations generated in reflective optical system R.

Further, the first lens group may substantially consist of two lenses of an aspheric lens having negative refractive power and an aspheric lens having positive refractive power in this order from the magnification side. Alternatively, the first lens group may substantially consist of an aspheric lens having negative refractive power. However, when the first lens group substantially consists of two lenses of a negative aspheric lens and a positive aspheric lens, it is possible to more excellently correct various aberrations generated in reflective optical system R. When the first lens group substantially consists of an aspheric lens having negative refractive power, it is possible to simplify the optical system, and to suppress a level of difficulty in assembly and adjustment. In the embodiment of the present invention, the first lens group substantially consists of two lenses of aspheric lens L12 having negative refractive power and aspheric lens L11 having positive refractive power in this order from the magnification side.

It is desirable that a most-magnification-side surface of optical element Lp has a convex shape toward the magnification side. Further, it is desirable that a most-reduction-side surface of optical element Lp has a concave shape facing the reduction side. Accordingly, it is possible to excellently correct various aberrations generated in reflective optical system R.

Further, it is desirable that optical element Lp has negative refractive power. Accordingly, it becomes possible to excellently correct various aberrations generated in reflective optical system R while displaying a magnified video image in sufficient size on a screen at a short projection distance.

Further, the second lens group may substantially consist of a 2a-th lens group, in which optical element Lp, a positive lens with its convex surface facing the magnification side, a negative lens with its concave surface facing the magnification side, a positive lens with its convex surface facing the reduction side and at least one positive lens having biconvex shape are arranged in this order from the magnification side, and a 2b-th lens group arranged toward the reduction side of the 2a-th lens group, and in which a most-magnification-side optical element (a single lens or a cemented lens) has negative refractive power. Alternatively, the second lens group may substantially consist of a 2a-th lens group, in which optical element Lp, a negative lens with its concave surface facing the magnification side, a positive lens with its convex surface facing the reduction side and at least one positive lens having biconvex shape are arranged in this order from the magnification side, and a 2b-th lens group arranged toward the reduction side of the 2a-th lens group, and in which a most-magnification-side optical element (a single lens or a cemented lens) has negative refractive power. Accordingly, it becomes possible to excellently correct various aberrations generated in reflective optical system R.

It is desirable that the 2a-th lens group, as a whole, has positive refractive power. Further, it is desirable that the 2b-th lens group, as a whole, has positive refractive power. Further, it is desirable that the 2b-th lens group includes at least one aspheric lens. Accordingly, it becomes possible to excellently correct various aberrations generated in reflective optical system R.

FIG. 1 illustrates an example in which optical member PP is arranged between image display device D and the refractive optical system. Instead of arranging various filters, such as a low-pass filter and a filter that cuts a specific wavelength band, and the like between image display device D and the refractive optical system, the various filters and the like may be arranged between lenses. Alternatively, a coating having a similar action to the various filters and the like may be applied to a lens surface of one of the lenses, or a multi-layer coating for protection, an anti-reflection coating for reducing ghost light or the like, and the like may be applied to a lens surface of one of the lenses.

Next, numerical value examples of the projection optical system of the present invention will be described.

First, a projection optical system in Example 1 will be described. FIG. 1 is a cross section illustrating the structure of the projection optical system in Example 1. In FIG. 1 and FIGS. 2 through 17 corresponding to Examples 2 through 17, which will be described later, optical member PP is also illustrated, and the left side of the diagrams is a reduction side, and the right side of the diagrams is a magnification side.

Table 1 shows basic lens data on the projection optical system in Example 1. Table 2 shows data about specification, and Table 3 shows data about aspherical surface coefficients. Next, the meanings of signs in the tables will be described using the tables in Example 1, as an example. The meanings are basically similar in Examples 2 through 17.

In the lens data of Table 1, column Si shows the surface number of the i-th surface (i=1, 2, 3, . . . ) when the most-reduction-side surface of composition elements is the first surface, and surface numbers sequentially increase toward the magnification side. Column Ri shows the curvature radius of the i-th surface, and column Di shows a distance between the i-th surface and the (i+1)th surface on optical axis Z. Column Ndj shows the refractive index of the j-th optical element (j=1, 2, 3, . . . ) for d-line (wavelength is 587.6 nm). The most reduction-side optical element is the first optical element, and the number j sequentially increases toward the magnification side. The column vdj shows the Abbe number of also the j-th optical element for d-line (wavelength is 587.6 nm).

Here, the sign of a curvature radius is positive when a surface shape is convex toward the reduction side, and negative when a surface shape is convex toward the magnification side. The basic lens data show data including optical member PP.

The data about specification in Table 2 show the value of F-number FNo. and the value of full angle of view 2ω.

In the basic lens data and data about specification, degree is used as the unit of an angle, and mm is used as the unit of a length. Since an optical system is usable by being proportionally enlarged or proportionally reduced, other appropriate units may be used.

In the lens data of Table 1, marks * are attached to the surface numbers of aspherical surfaces. Further, the numerical value of a paraxial curvature radius is shown as a curvature radius of an aspherical surface. The data about aspherical surface coefficients in Table 3 show surface numbers Si of aspherical surfaces and aspherical surface coefficients about the aspherical surfaces. The aspherical surface coefficients are values of coefficients KA, Am (m=4, 6, 8, . . . 20) in an aspherical surface equation represented by the following expression (A):

$$Zd = C \cdot h^2 / \{1 + (1 - KA \cdot C^2 \cdot h^2)^{1/2}\} + \Sigma Am \cdot h^m \quad (A),$$ where Zd: the depth of an aspherical surface (the length of a perpendicular from a point on the aspherical surface at height h to a flat plane that contacts with the vertex of the aspherical surface and is perpendicular to the optical axis), h: a height (a length from the optical axis), C: a reciprocal of a paraxial curvature radius, and KA, Am: aspherical surface coefficients (m=3, 4, 5, . . . 20).

TABLE 1

EXAMPLE 1·LENS DATA (n, ν FOR d-LINE)

| Si (SURFACE NUMBER) | Ri (CURVATURE RADIUS) | Di (SURFACE DISTANCE) | Ndj (REFRACTIVE INDEX) | νdj (ABBE NUMBER) |
|---|---|---|---|---|
| 1 | ∞ | 0.6987 | | |
| 2 | ∞ | 1.0500 | 1.51633 | 64.14 |
| 3 | ∞ | 19.9000 | | |
| 4 | 24.6586 | 10.0091 | 1.65960 | 48.29 |
| 5 | −15.6789 | 1.0000 | 1.80000 | 48.00 |
| 6 | 15.7283 | 0.1999 | | |
| 7 | 14.1414 | 4.7519 | 1.58587 | 49.98 |
| 8 | −38.7087 | 1.9998 | | |
| 9 | 18.0461 | 9.0902 | 1.49007 | 65.38 |
| 10 | −12.2005 | 0.1200 | | |
| 11 | −11.5906 | 1.0002 | 1.90366 | 31.31 |
| 12 | 65.2415 | 3.4718 | | |
| 13 | 85.7210 | 4.6078 | 1.55557 | 62.86 |
| 14 | −25.2767 | 4.9873 | | |
| 15 | 37.6964 | 5.3799 | 1.63028 | 40.80 |
| 16 | −57.2505 | 14.6255 | | |
| 17 | −20.3607 | 2.6358 | 1.55831 | 62.76 |
| 18 | 40.3593 | 1.0481 | | |
| 19 | 59.8280 | 7.7872 | 1.61102 | 36.90 |
| 20 | −30.9203 | 4.6847 | | |
| 21 | −17.8928 | 1.7010 | 1.75054 | 49.35 |
| 22 | −40.0374 | 14.1767 | | |
| *23 | −13.1426 | 5.0014 | 1.49100 | 57.58 |
| *24 | −10.8105 | 29.9627 | | |
| *25 | −14.3833 | 6.0000 | 1.49100 | 57.58 |
| *26 | −15301.9711 | 25.7890 | | |
| *27 | 34.0756 | −240.0000 | REFLECTION SURFACE | |

ENTRANCE PUPIL POSITION: 40.0 FROM FIRST SURFACE

TABLE 2

EXAMPLE 1·SPECIFICATION (d-LINE)

| FNo. | 2.50 |
|---|---|
| 2ω[°] | 156.10 |

TABLE 3

EXAMPLE 1·ASPHERICAL SURFACE COEFFICIENT

| SURFACE NUMBER | 23 |
|---|---|
| KA | −4.6412961E−02 |
| A3 | −3.2780215E−03 |
| A4 | 6.2262301E−04 |
| A5 | −5.7798269E−06 |
| A6 | −6.4964585E−06 |
| A7 | 4.2948136E−07 |
| A8 | 1.5028564E−08 |
| A9 | −2.7888875E−09 |
| A10 | 9.6125863E−11 |
| A11 | 1.4890607E−12 |
| A12 | −1.1758397E−13 |
| A13 | −9.1203310E−16 |
| A14 | −6.5840553E−17 |
| A15 | 1.2272777E−17 |
| A16 | −2.6452600E−19 |

| SURFACE NUMBER | 24 |
|---|---|
| KA | 1.6532179E−01 |
| A3 | −2.1512871E−03 |
| A4 | 3.5886722E−04 |
| A5 | −3.0768866E−05 |
| A6 | 9.3696535E−06 |
| A7 | −1.7389268E−06 |

TABLE 3-continued

EXAMPLE 1·ASPHERICAL SURFACE COEFFICIENT

| A8 | 1.5561909E−07 |
|---|---|
| A9 | −6.8935855E−09 |
| A10 | 6.6355189E−11 |
| A11 | 9.4534688E−12 |
| A12 | −4.5745988E−13 |
| A13 | −2.7719524E−15 |
| A14 | 8.9862999E−16 |
| A15 | −2.9125420E−17 |
| A16 | 3.1248281E−19 |

| SURFACE NUMBER | 25 |
|---|---|
| KA | −5.0166516E−03 |
| A3 | −2.6609567E−03 |
| A4 | 5.2802485E−04 |
| A5 | −2.7498193E−05 |
| A6 | −7.0818516E−07 |
| A7 | 6.2838432E−08 |
| A8 | 2.9559652E−09 |
| A9 | −2.3843579E−10 |
| A10 | 3.8266963E−13 |
| A11 | 2.3662850E−13 |
| A12 | −2.4988875E−15 |
| A13 | −1.4401058E−16 |
| A14 | 3.6438603E−18 |
| A15 | −2.0672982E−20 |
| A16 | −6.8018496E−23 |

| SURFACE NUMBER | 26 |
|---|---|
| KA | 1.2663467E+05 |
| A3 | −9.1565413E−04 |
| A4 | 2.8728395E−05 |
| A5 | −8.3301551E−07 |
| A6 | −1.3025401E−07 |
| A7 | 8.8433551E−09 |
| A8 | −1.0064131E−10 |
| A9 | −2.5674450E−12 |
| A10 | −1.2063025E−14 |
| A11 | 2.8003831E−15 |
| A12 | −3.1931820E−17 |
| A13 | −4.6032388E−19 |
| A14 | 1.5503710E−20 |
| A15 | −1.9170291E−22 |
| A16 | 1.0120978E−24 |

| SURFACE NUMBER | 27 |
|---|---|
| KA | −3.5372007E+00 |
| A3 | 3.6766137E−05 |
| A4 | −1.0325833E−06 |
| A5 | 8.6090225E−09 |
| A6 | −1.3764971E−10 |
| A7 | 3.6950491E−12 |
| A8 | −2.7956965E−14 |
| A9 | −2.8233783E−16 |
| A10 | 4.5775758E−18 |
| A11 | 3.8203822E−21 |
| A12 | −3.8319158E−22 |
| A13 | 2.2811185E−24 |
| A14 | −1.3780969E−27 |
| A15 | −2.6728962E−29 |
| A16 | 6.6325098E−32 |

In Example 1, Surface 22 through Surface 21 are optical element Lp, Surface 26 through Surface 23 are a first lens group, Surface 22 through Surface 13 are a 2a-th lens group, and Surface 12 through Surface 4 are a 2b-th lens group.

Figure 18:
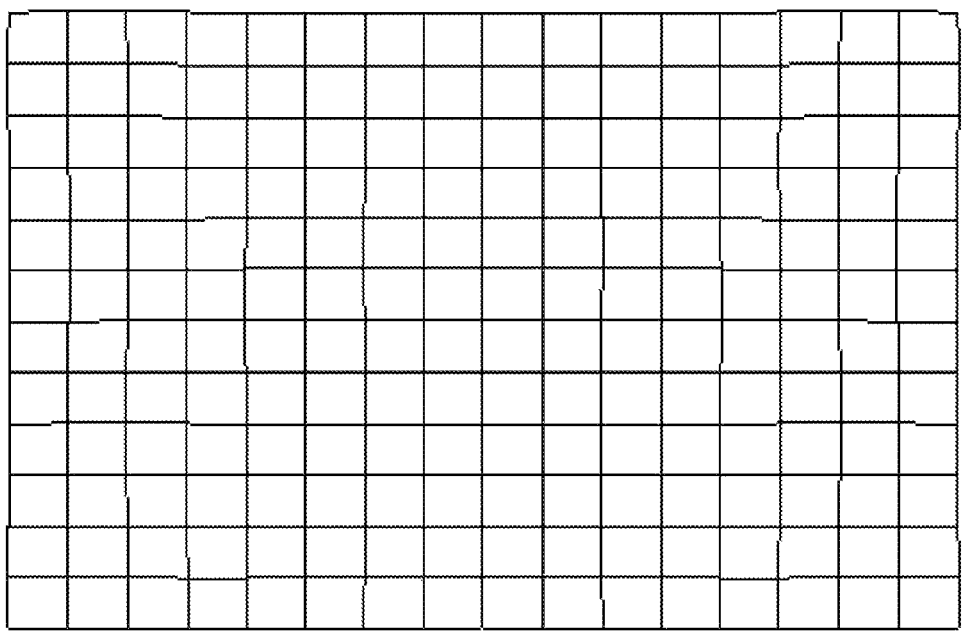
FIG. 18 is a diagram illustrating distortion performance of the projection optical system in Example 1 of the present invention.

FIG. 18 illustrates distortion performance of the projection optical system in Example 1, and FIG. 35 illustrates spot performance of the projection optical system in Example 1. Evaluation points in the diagram illustrating spot performance correspond to point 1 through point 15 in FIG. 52 and FIG. 53, and that is similar also in Examples 2 through 17.

Figure 2:
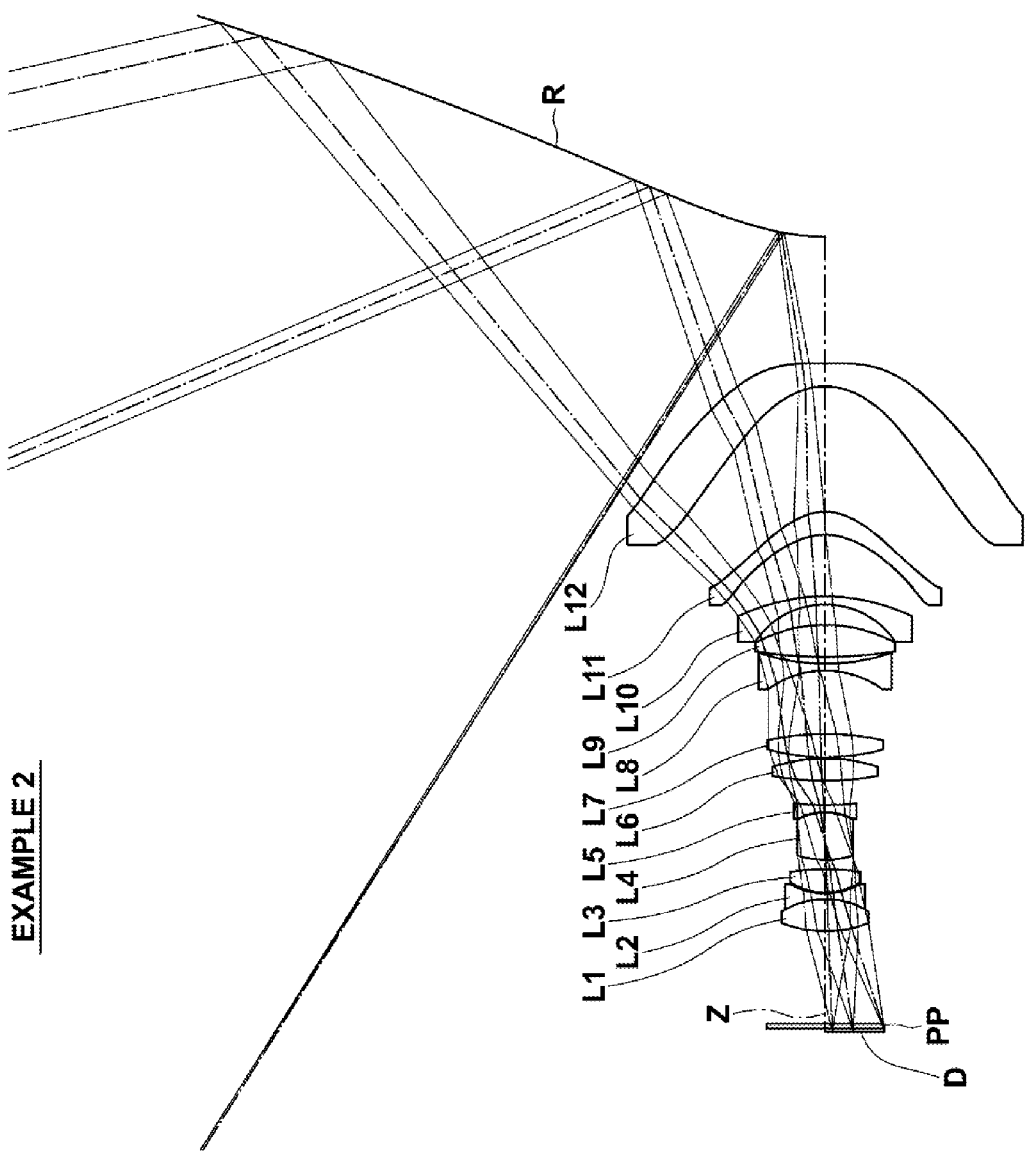
FIG. 2 is a cross section illustrating the structure of a projection optical system in Example 2 of the present invention.
Figure 19:
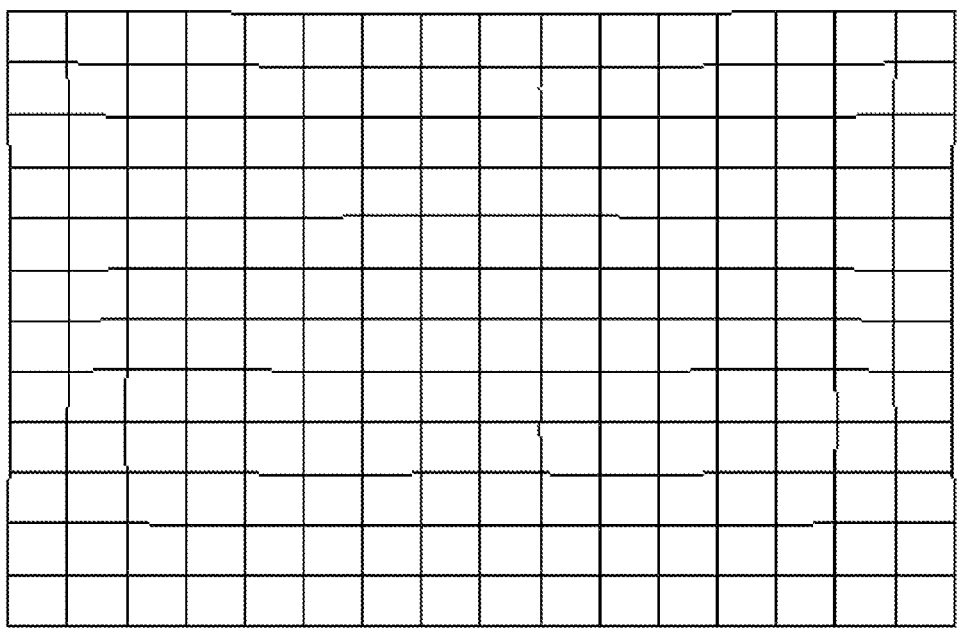
FIG. 19 is a diagram illustrating distortion performance of the projection optical system in Example 2 of the present invention.

Next, a projection optical system in Example 2 will be described. FIG. 2 is a cross section illustrating the structure of the projection optical system in Example 2. Table 4 shows basic lens data on the projection optical system in Example 2, and Table 5 shows data about specification. Table 6 shows data about aspherical surface coefficients. FIG. 19 is a diagram illustrating distortion performance, and FIG. 36 is a diagram illustrating spot performance.

In Example 2, Surface 22 through Surface 21 are optical element Lp, Surface 26 through Surface 23 are a first lens group, Surface 22 through Surface 13 are a 2a-th lens group, and Surface 12 through Surface 4 are a 2b-th lens group.

TABLE 4

EXAMPLE 2•LENS DATA (n, ν FOR d-LINE)

| Si (SURFACE NUMBER) | Ri (CURVATURE RADIUS) | Di (SURFACE DISTANCE) | Ndj (REFRACTIVE INDEX) | νdj (ABBE NUMBER) |
|---|---|---|---|---|
| 1 | ∞ | 0.7012 | | |
| 2 | ∞ | 1.0500 | 1.51633 | 64.14 |
| 3 | ∞ | 20.0002 | | |
| 4 | 23.7903 | 6.9435 | 1.71976 | 40.01 |
| 5 | −16.2245 | 1.2008 | 1.80001 | 48.00 |
| 6 | 13.9036 | 0.1998 | | |
| 7 | 13.1492 | 5.0686 | 1.55294 | 62.96 |
| 8 | −42.5195 | 2.0002 | | |
| 9 | 18.9943 | 10.1632 | 1.48999 | 65.39 |
| 10 | −12.5556 | 0.1491 | | |
| 11 | −11.7473 | 1.5008 | 1.80001 | 28.16 |
| 12 | 65.9312 | 5.2755 | | |
| 13 | 56.7245 | 4.8304 | 1.53701 | 63.58 |
| 14 | −32.8901 | 0.1990 | | |
| 15 | 41.9824 | 5.0841 | 1.58194 | 39.81 |
| 16 | −51.2078 | 13.6442 | | |
| 17 | −19.4317 | 1.4998 | 1.52280 | 64.12 |
| 18 | 41.3726 | 1.4655 | | |
| 19 | 90.1560 | 6.8992 | 1.67458 | 31.82 |
| 20 | −29.3643 | 4.4550 | | |
| 21 | −17.0768 | 1.7007 | 1.76427 | 51.57 |
| 22 | −40.1439 | 13.3109 | | |
| *23 | −13.5347 | 4.9990 | 1.49100 | 57.58 |
| *24 | −10.8237 | 27.0600 | | |
| *25 | −15.3393 | 5.0002 | 1.49100 | 57.58 |
| *26 | 126.2269 | 27.3740 | | |
| *27 | 44.1766 | −290.0000 | REFLECTION SURFACE | |

ENTRANCE PUPIL POSITION: 40.0 FROM FIRST SURFACE

TABLE 5

EXAMPLE 2•SPECIFICATION (d-LINE)

| FNo. | 2.40 |
|---|---|
| 2ω[°] | 153.10 |

TABLE 6

EXAMPLE 2•ASPHERICAL SURFACE COEFFICIENT

| SURFACE NUMBER | 23 |
|---|---|
| KA | −6.1194506E−02 |
| A3 | −2.5414362E−03 |
| A4 | 5.5231532E−04 |
| A5 | −1.5278226E−05 |
| A6 | −4.9756216E−06 |
| A7 | 4.1820671E−07 |
| A8 | 7.3790248E−09 |
| A9 | −2.3384664E−09 |
| A10 | 9.6482227E−11 |
| A11 | 7.3185219E−13 |
| A12 | −1.1947420E−13 |
| A13 | 3.7688650E−16 |

TABLE 6-continued

EXAMPLE 2•ASPHERICAL SURFACE COEFFICIENT

| A14 | −3.3157198E−17 |
|---|---|
| A15 | 8.4666890E−18 |
| A16 | −1.9786634E−19 |

| SURFACE NUMBER | 24 |
|---|---|
| KA | 1.6789111E−01 |
| A3 | −1.7002545E−03 |
| A4 | 3.3988322E−04 |
| A5 | −3.5993263E−05 |
| A6 | 1.0101722E−05 |
| A7 | −1.8489816E−06 |
| A8 | 1.6954470E−07 |
| A9 | −7.6330064E−09 |
| A10 | 6.8605228E−11 |
| A11 | 1.0760666E−11 |
| A12 | −5.0625644E−13 |
| A13 | −3.3851910E−15 |
| A14 | 1.0260264E−15 |
| A15 | −3.3857834E−17 |
| A16 | 3.7240880E−19 |

| SURFACE NUMBER | 25 |
|---|---|
| KA | −2.1145789E−02 |
| A3 | −3.1164922E−03 |
| A4 | 5.3886174E−04 |
| A5 | −3.0073789E−05 |
| A6 | −6.2682977E−07 |
| A7 | 7.3431696E−08 |
| A8 | 3.0089777E−09 |
| A9 | −2.8755645E−10 |
| A10 | 1.0629670E−12 |
| A11 | 2.9732423E−13 |
| A12 | −3.6042557E−15 |
| A13 | −1.8764745E−16 |
| A14 | 4.9399102E−18 |
| A15 | −2.6630863E−20 |
| A16 | −1.2444372E−22 |

| SURFACE NUMBER | 26 |
|---|---|
| KA | −1.3092026E+01 |
| A3 | −1.3821578E−03 |
| A4 | 3.0252589E−05 |
| A5 | 3.8048965E−08 |
| A6 | −1.6581558E−07 |
| A7 | 1.0168569E−08 |
| A8 | −1.2622266E−10 |
| A9 | −2.7089593E−12 |
| A10 | −2.7249480E−14 |
| A11 | 3.9321784E−15 |
| A12 | −4.6088715E−17 |
| A13 | −6.9749411E−19 |
| A14 | 2.5446130E−20 |
| A15 | −3.4239994E−22 |
| A16 | 1.9353451E−24 |

| SURFACE NUMBER | 27 |
|---|---|
| KA | −4.3366875E+00 |
| A3 | 5.3926804E−05 |
| A4 | −1.3391705E−06 |
| A5 | 9.8200425E−09 |
| A6 | −2.0776567E−10 |
| A7 | 6.3809824E−12 |
| A8 | −4.9798883E−14 |
| A9 | −5.6057817E−16 |
| A10 | 9.3161027E−18 |
| A11 | 9.8245743E−21 |
| A12 | −8.9078606E−22 |
| A13 | 5.5840605E−24 |
| A14 | −3.3733947E−27 |
| A15 | −7.5313252E−29 |
| A16 | 1.9838590E−31 |

Figure 3:
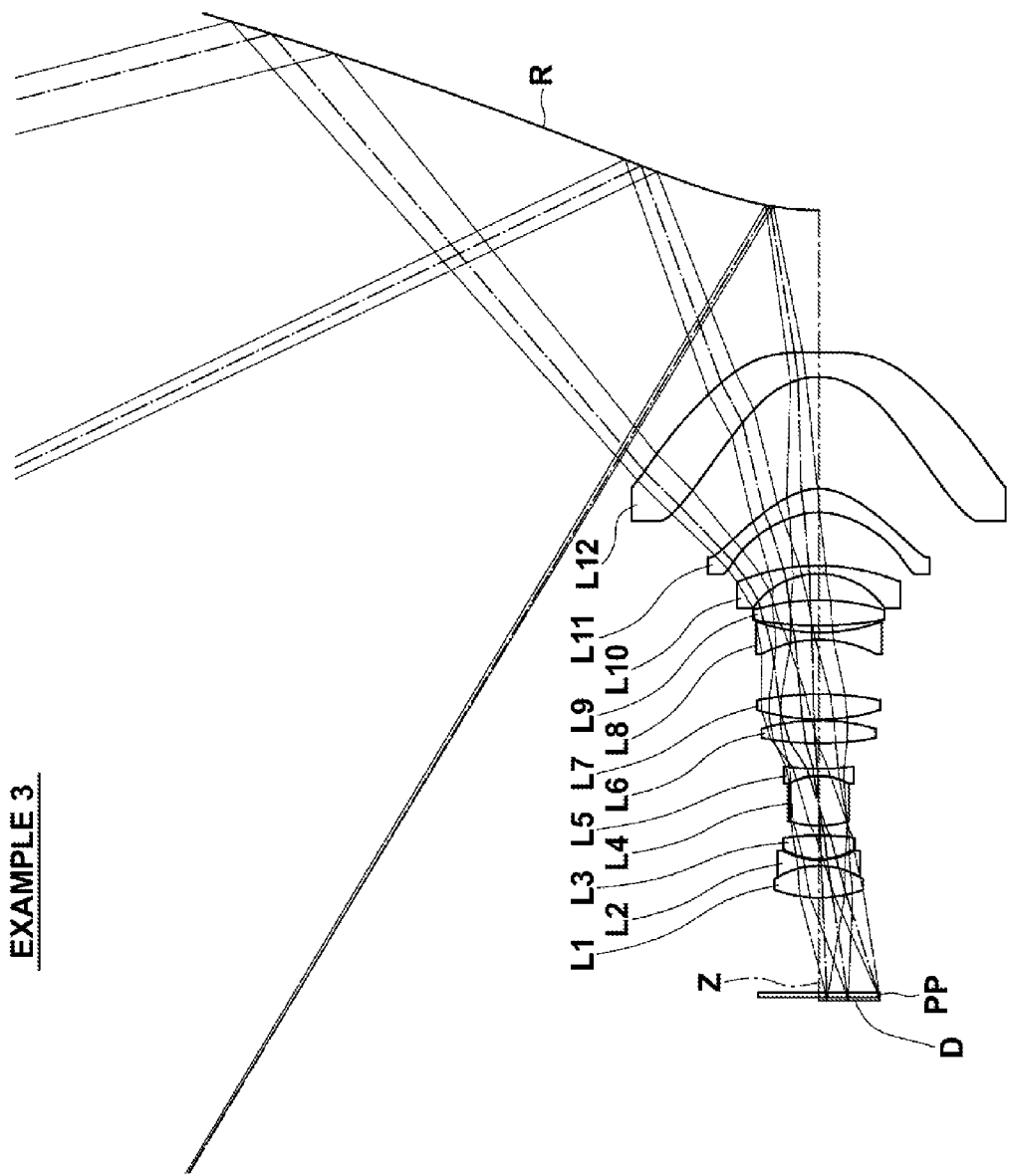
FIG. 3 is a cross section illustrating the structure of a projection optical system in Example 3 of the present invention.
Figure 20:
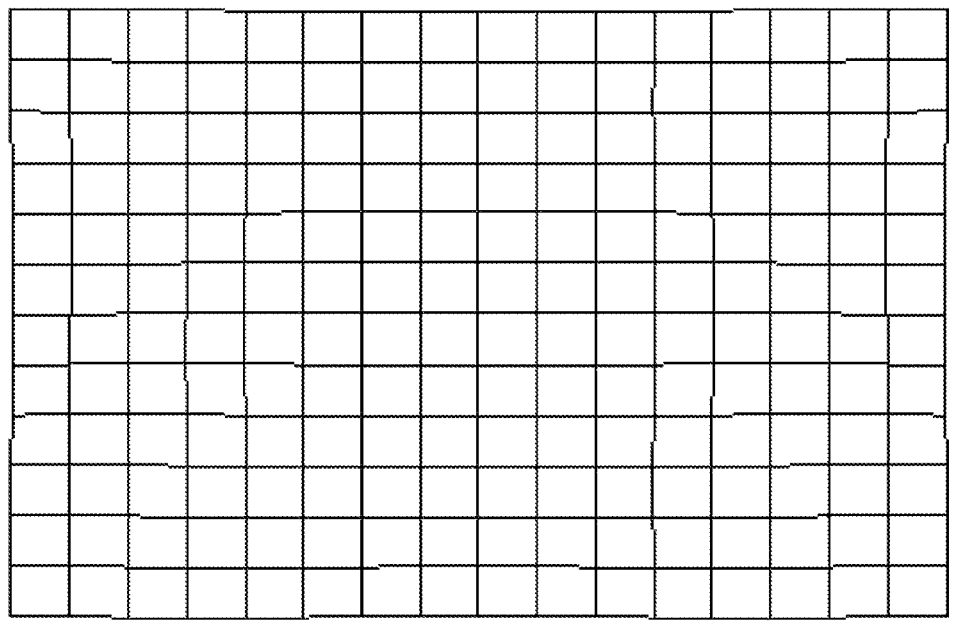
FIG. 20 is a diagram illustrating distortion performance of the projection optical system in Example 3 of the present invention.

Next, a projection optical system in Example 3 will be described. FIG. 3 is a cross section illustrating the structure of the projection optical system in Example 3. Table 7 shows basic lens data on the projection optical system in Example 3, and Table 8 shows data about specification. Table 9 shows data about aspherical surface coefficients. FIG. 20 is a diagram illustrating distortion performance, and FIG. 37 is a diagram illustrating spot performance.

In Example 3, Surface 22 through Surface 21 are optical element Lp, Surface 26 through Surface 23 are a first lens group, Surface 22 through Surface 13 are a 2a-th lens group, and Surface 12 through Surface 4 are a 2b-th lens group.

TABLE 7

EXAMPLE 3·LENS DATA (n, ν FOR d-LINE)

| Si (SURFACE NUMBER) | Ri (CURVATURE RADIUS) | Di (SURFACE DISTANCE) | Ndj (REFRACTIVE INDEX) | νdj (ABBE NUMBER) |
|---|---|---|---|---|
| 1 | ∞ | 0.7009 | | |
| 2 | ∞ | 1.0500 | 1.51633 | 64.14 |
| 3 | ∞ | 20.0010 | | |
| 4 | 25.5726 | 6.7309 | 1.73200 | 39.48 |
| 5 | −15.5584 | 1.1999 | 1.80001 | 48.00 |
| 6 | 14.3760 | 0.1991 | | |
| 7 | 13.3689 | 5.0218 | 1.54418 | 63.30 |
| 8 | −46.6808 | 2.0002 | | |
| 9 | 19.3005 | 10.4662 | 1.48999 | 65.38 |
| 10 | −12.4734 | 0.1490 | | |
| 11 | −11.7144 | 1.5000 | 1.80001 | 27.02 |
| 12 | 74.6714 | 5.2910 | | |
| 13 | 60.8455 | 4.8649 | 1.66531 | 41.40 |
| 14 | −39.1599 | 0.2005 | | |
| 15 | 40.2186 | 5.3141 | 1.60466 | 60.97 |
| 16 | −61.0762 | 11.4801 | | |
| 17 | −23.9550 | 1.4997 | 1.52511 | 64.03 |
| 18 | 35.2385 | 1.4771 | | |
| 19 | 71.7629 | 5.3887 | 1.74446 | 27.78 |
| 20 | −42.9540 | 5.5497 | | |
| 21 | −15.9111 | 1.7000 | 1.71640 | 55.68 |
| 22 | −42.0422 | 11.2507 | | |
| *23 | −14.1095 | 5.0001 | 1.49100 | 57.58 |
| *24 | −10.8434 | 23.5897 | | |
| *25 | −15.7823 | 5.1561 | 1.49100 | 57.58 |
| *26 | 102.6229 | 29.9990 | | |
| *27 | 54.1512 | −345.0000 | REFLECTION SURFACE | |

ENTRANCE PUPIL POSITION: 40.0 FROM FIRST SURFACE

TABLE 8

EXAMPLE 3·SPECIFICATION (d-LINE)

| FNo. | 2.40 |
|---|---|
| 2ω[°] | 149.90 |

TABLE 9

EXAMPLE 3·ASPHERICAL SURFACE COEFFICIENT

| SURFACE NUMBER | 23 |
|---|---|
| KA | −2.0639393E−02 |
| A3 | −2.2428175E−03 |
| A4 | 7.0894582E−04 |
| A5 | −3.5395657E−05 |
| A6 | −7.5077644E−06 |
| A7 | 8.6886666E−07 |
| A8 | 1.1665169E−08 |
| A9 | −5.7474932E−09 |
| A10 | 2.1668961E−10 |
| A11 | 6.1721628E−12 |
| A12 | −3.7936224E−13 |
| A13 | −6.7067101E−15 |
| A14 | 1.0982016E−16 |

TABLE 9-continued

EXAMPLE 3·ASPHERICAL SURFACE COEFFICIENT

| A15 | 2.9753518E−17 |
|---|---|
| A16 | −7.6815219E−19 |

| SURFACE NUMBER | 24 |
|---|---|
| KA | 1.7672298E−01 |
| A3 | −1.8281729E−03 |
| A4 | 4.8935302E−04 |
| A5 | −4.0200405E−05 |
| A6 | 7.8115439E−06 |
| A7 | −1.7384392E−06 |
| A8 | 1.8293213E−07 |
| A9 | −8.1403441E−09 |
| A10 | 9.9820032E−12 |
| A11 | 1.2464099E−11 |
| A12 | −3.8041398E−13 |
| A13 | −6.0465040E−15 |
| A14 | 8.8171579E−16 |
| A15 | −3.1554069E−17 |
| A16 | 4.1570146E−19 |

| SURFACE NUMBER | 25 |
|---|---|
| KA | −9.1213395E−02 |
| A3 | −3.1739315E−03 |
| A4 | 6.1510088E−04 |
| A5 | −4.2429242E−05 |
| A6 | −5.5034644E−07 |
| A7 | 1.1268926E−07 |
| A8 | 4.2515689E−09 |
| A9 | −5.1007821E−10 |
| A10 | 3.1856576E−12 |
| A11 | 6.0179609E−13 |
| A12 | −8.7928372E−15 |
| A13 | −4.3662096E−16 |
| A14 | 1.2814644E−17 |
| A15 | −7.4196538E−20 |
| A16 | −3.9318034E−22 |

| SURFACE NUMBER | 26 |
|---|---|
| KA | 5.9764602E+00 |
| A3 | −1.1980257E−03 |
| A4 | 6.5886160E−06 |
| A5 | −2.1395820E−08 |
| A6 | −1.6486329E−07 |
| A7 | 1.5717320E−08 |
| A8 | −3.9497973E−10 |
| A9 | −1.3833639E−12 |
| A10 | 5.4003304E−14 |
| A11 | 6.4540563E−15 |
| A12 | −1.7110134E−16 |
| A13 | −9.2439125E−19 |
| A14 | 9.0244609E−20 |
| A15 | −1.3067207E−21 |
| A16 | 6.2798026E−24 |

| SURFACE NUMBER | 27 |
|---|---|
| KA | −6.2052363E+00 |
| A3 | 7.2391590E−05 |
| A4 | −1.5134281E−06 |
| A5 | 8.0683826E−09 |
| A6 | −2.6461014E−10 |
| A7 | 9.2070275E−12 |
| A8 | −7.1848366E−14 |
| A9 | −8.7571201E−16 |
| A10 | 1.4440586E−17 |
| A11 | 1.8591265E−20 |
| A12 | −1.4850227E−21 |
| A13 | 9.4753676E−24 |
| A14 | −5.3295272E−27 |
| A15 | −1.3916960E−28 |
| A16 | 3.7601655E−31 |

Figure 4:
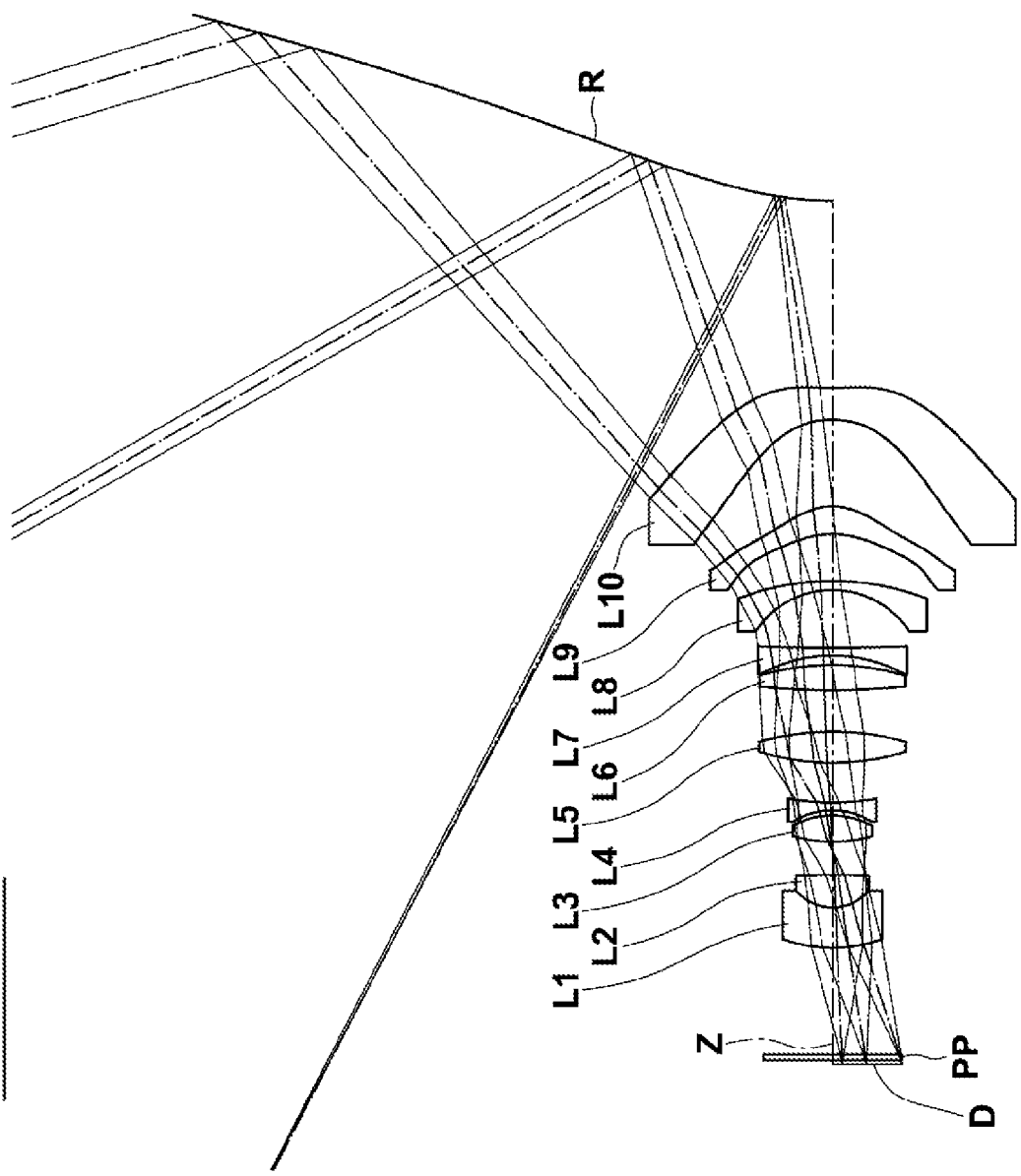
FIG. 4 is a cross section illustrating the structure of a projection optical system in Example 4 of the present invention.
Figure 21:
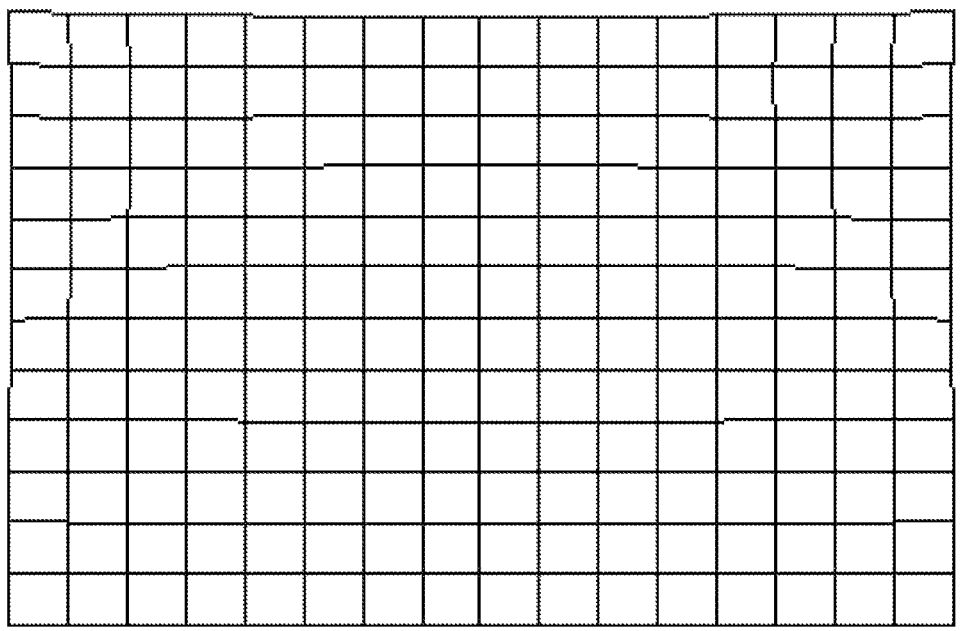
FIG. 21 is a diagram illustrating distortion performance of the projection optical system in Example 4 of the present invention.
Figure 38:
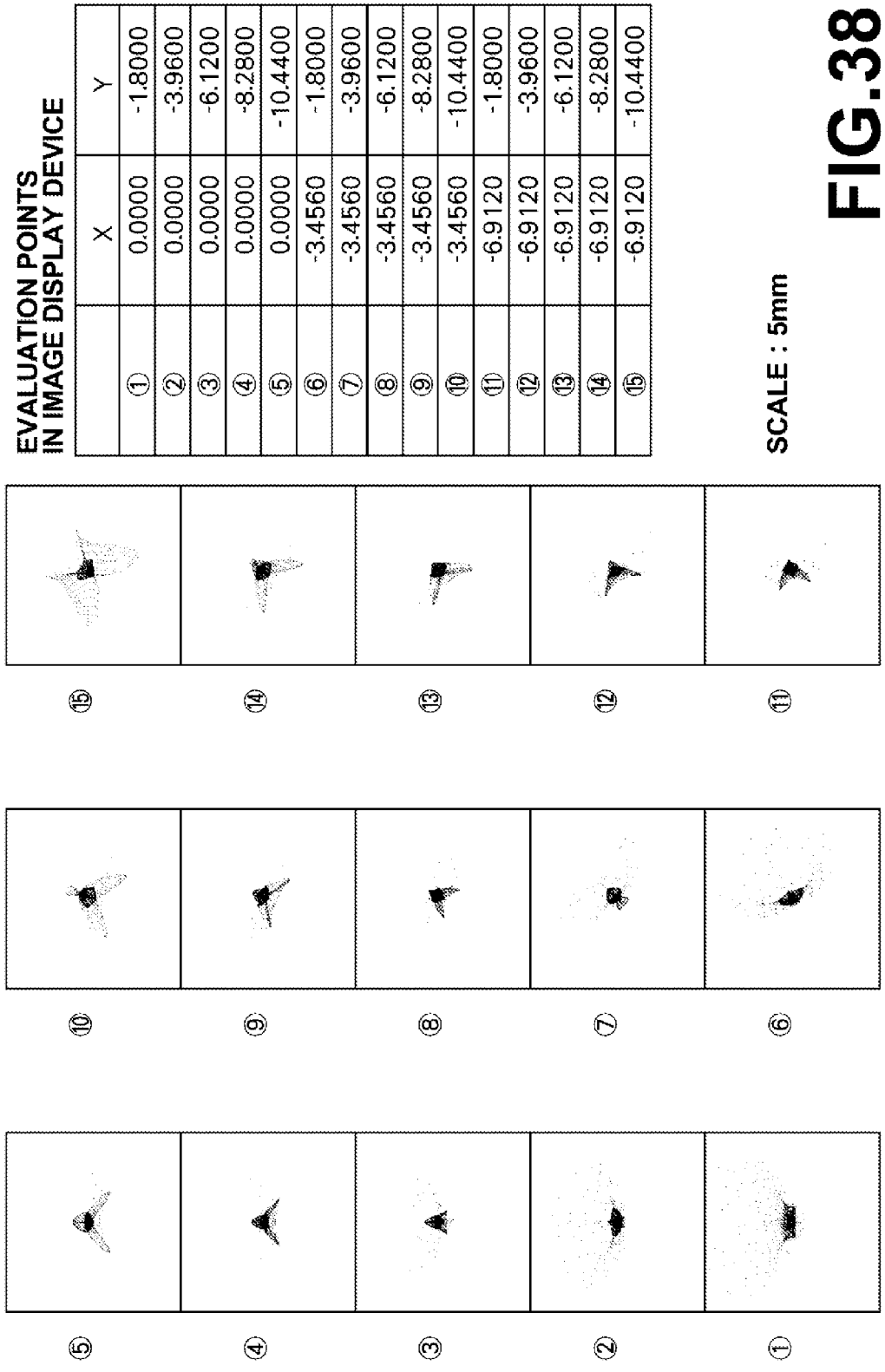
FIG. 38 is a diagram illustrating spot performance of the projection optical system in Example 4 of the present invention.

Next, a projection optical system in Example 4 will be described. FIG. 4 is a cross section illustrating the structure of the projection optical system in Example 4. Table 10 shows basic lens data on the projection optical system in Example 4, and Table 11 shows data about specification. Table 12 shows data about aspherical surface coefficients. FIG. 21 is a diagram illustrating distortion performance, and FIG. 38 is a diagram illustrating spot performance.

In Example 4, Surface 18 through Surface 17 are optical element Lp, Surface 22 through Surface 19 are a first lens group, Surface 18 through Surface 11 are a 2a-th lens group, and Surface 10 through Surface 4 are a 2b-th lens group.

TABLE 10

EXAMPLE 4•LENS DATA (n, ν FOR d-LINE)

| Si (SURFACE NUMBER) | Ri (CURV-ATURE RADIUS) | Di (SURFACE DISTANCE) | Ndj (RE-FRACTIVE INDEX) | νdj (ABBE NUMBER) |
|---|---|---|---|---|
| 1 | ∞ | 0.7087 | | |
| 2 | ∞ | 1.0500 | 1.51633 | 64.14 |
| 3 | ∞ | 20.0008 | | |
| 4 | 25.9189 | 7.5621 | 1.80001 | 48.00 |
| 5 | 8.3415 | 6.0621 | 1.68841 | 57.08 |
| 6 | −225.5059 | 6.2257 | | |
| 7 | 23.4804 | 4.9370 | 1.57886 | 61.97 |
| 8 | −14.0217 | 0.9494 | | |
| 9 | −13.0557 | 1.5004 | 1.68892 | 30.79 |
| 10 | 43.3546 | 7.4113 | | |
| 11 | 41.9575 | 5.8914 | 1.75513 | 45.36 |
| 12 | −44.8569 | 7.7187 | | |
| 13 | 120.1457 | 4.7104 | 1.61001 | 37.00 |
| 14 | −44.2753 | 1.7754 | | |
| 15 | −25.7538 | 1.5007 | 1.51499 | 64.42 |
| 16 | 326.9731 | 10.7972 | | |
| 17 | −16.1641 | 1.7005 | 1.49804 | 65.08 |
| 18 | −45.0924 | 8.7789 | | |
| *19 | −12.6516 | 5.2032 | 1.49100 | 57.58 |
| *20 | −9.3356 | 16.1991 | | |
| *21 | −21.0963 | 5.9848 | 1.49100 | 57.58 |
| *22 | 22.8430 | 35.1061 | | |
| *23 | 57.4912 | −425.0000 | REFLECTION SURFACE | |

ENTRANCE PUPIL POSITION: 40.0 FROM FIRST SURFACE

TABLE 11

EXAMPLE 4•SPECIFICATION (d-LINE)

| FNo. | 2.50 |
|---|---|
| 2ω[°] | 144.80 |

TABLE 12

EXAMPLE 4•ASPHERICAL SURFACE COEFFICIENT

| SURFACE NUMBER | 19 |
|---|---|
| KA | −6.7156234E−02 |
| A3 | 1.0567713E−03 |
| A4 | 1.9219394E−04 |
| A5 | −3.5906268E−05 |
| A6 | −8.5470585E−07 |
| A7 | 5.6451265E−07 |
| A8 | −2.0566226E−08 |
| A9 | −3.2759567E−09 |
| A10 | 2.6972146E−10 |
| A11 | −1.4475486E−12 |
| A12 | −3.7746164E−13 |
| A13 | 4.9580039E−15 |
| A14 | 4.9548202E−18 |
| A15 | 2.0541125E−17 |
| A16 | −5.9640374E−19 |

TABLE 12-continued

EXAMPLE 4•ASPHERICAL SURFACE COEFFICIENT

| SURFACE NUMBER | 20 |
|---|---|
| KA | 1.0579492E−01 |
| A3 | 2.5017462E−04 |
| A4 | 3.4537062E−04 |
| A5 | −5.5802286E−05 |
| A6 | 7.9112290E−06 |
| A7 | −1.1651071E−06 |
| A8 | 1.2252480E−07 |
| A9 | −6.2224057E−09 |
| A10 | 3.7564237E−11 |
| A11 | 9.0614032E−12 |
| A12 | −2.8240213E−13 |
| A13 | −4.6937030E−15 |
| A14 | 5.4150234E−16 |
| A15 | −1.6898556E−17 |
| A16 | 2.0937344E−19 |

| SURFACE NUMBER | 21 |
|---|---|
| KA | 3.9545077E−01 |
| A3 | −2.2688757E−03 |
| A4 | 1.5752495E−04 |
| A5 | −8.8038289E−06 |
| A6 | 7.0147962E−08 |
| A7 | 9.4251735E−09 |
| A8 | 9.5959499E−10 |
| A9 | −7.0382801E−11 |
| A10 | 1.3800570E−13 |
| A11 | 6.2556412E−14 |
| A12 | −5.7014117E−16 |
| A13 | −3.4866746E−17 |
| A14 | 8.0807199E−19 |
| A15 | −5.2545272E−21 |
| A16 | 5.0591645E−24 |

| SURFACE NUMBER | 22 |
|---|---|
| KA | −1.4636230E+00 |
| A3 | −3.8320839E−03 |
| A4 | 1.3504916E−04 |
| A5 | 3.3822783E−06 |
| A6 | −6.3274316E−07 |
| A7 | 3.1103619E−08 |
| A8 | −6.2754133E−10 |
| A9 | −2.7111426E−13 |
| A10 | −3.0866385E−14 |
| A11 | 2.0258915E−14 |
| A12 | −6.3486489E−16 |
| A13 | −3.2260850E−18 |
| A14 | 4.5398157E−19 |
| A15 | −7.3492347E−21 |
| A16 | 3.5784190E−23 |

| SURFACE NUMBER | 23 |
|---|---|
| KA | −4.3689790E+00 |
| A3 | 2.7225351E−05 |
| A4 | −8.7775940E−07 |
| A5 | 1.7257081E−08 |
| A6 | −7.5182563E−10 |
| A7 | 1.7040996E−11 |
| A8 | −9.1515104E−14 |
| A9 | −2.0808430E−15 |
| A10 | 2.8724682E−17 |
| A11 | 7.3195980E−20 |
| A12 | −3.6670401E−21 |
| A13 | 2.4143458E−23 |
| A14 | −1.3140987E−26 |
| A15 | −4.1509346E−28 |
| A16 | 1.2055245E−30 |

Figure 5:
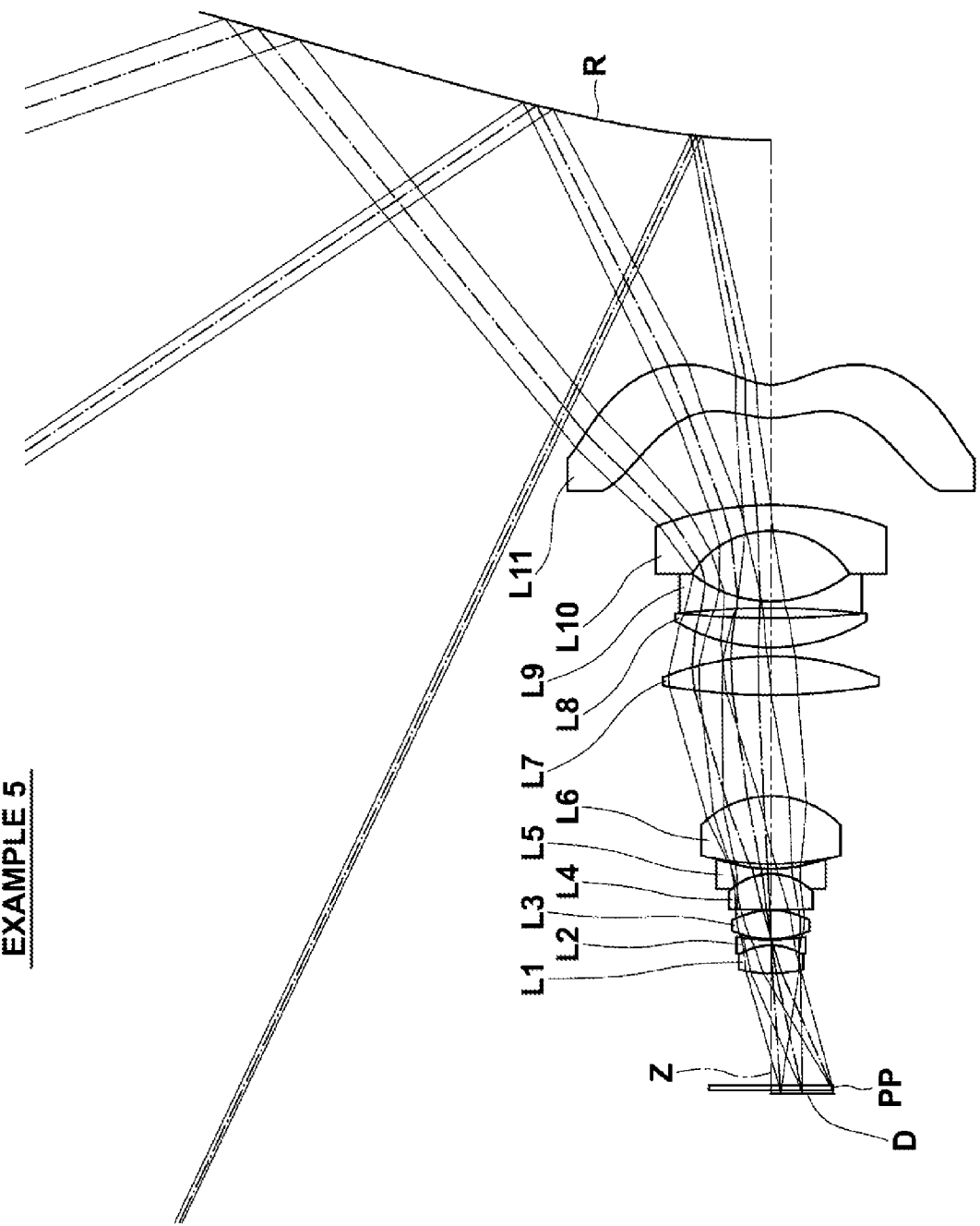
FIG. 5 is a cross section illustrating the structure of a projection optical system in Example 5 of the present invention.

Next, a projection optical system in Example 5 will be described. FIG. 5 is a cross section illustrating the structure of the projection optical system in Example 5. Table 13 shows basic lens data on the projection optical system in Example 5, and Table 14 shows data about specification. Table 15 shows data about aspherical surface coefficients.

Figure 22:
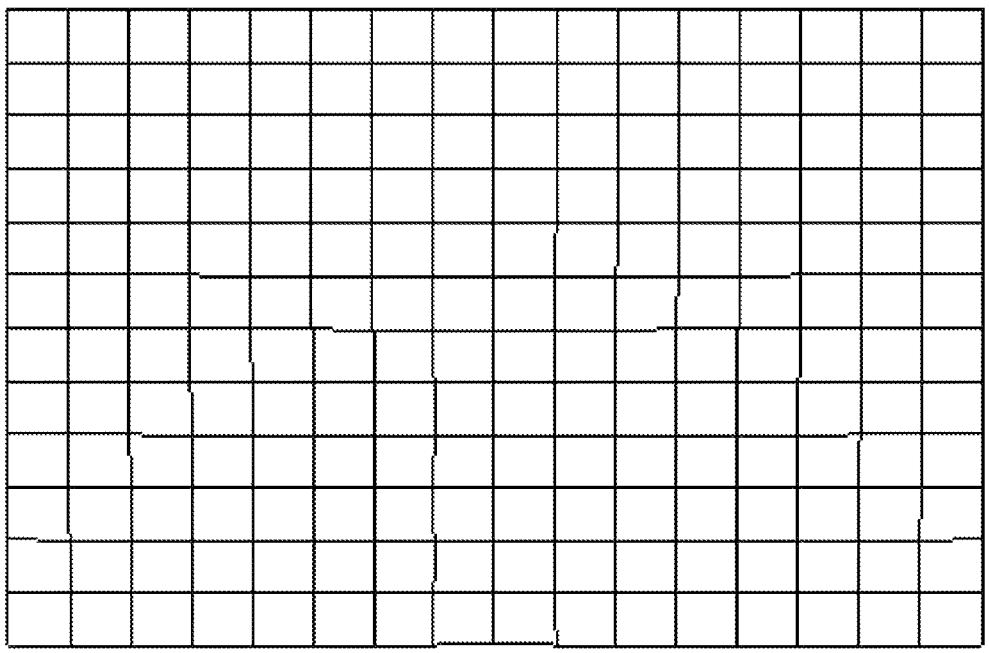
FIG. 22 is a diagram illustrating distortion performance of the projection optical system in Example 5 of the present invention.

FIG. 22 is a diagram illustrating distortion performance, and FIG. 39 is a diagram illustrating spot performance.

In Example 5, Surface 23 through Surface 22 are optical element Lp, Surface 25 through Surface 24 are a first lens group, Surface 23 through Surface 14 are a 2a-th lens group, and Surface 13 through Surface 4 are a 2b-th lens group.

TABLE 13

EXAMPLE 5•LENS DATA (n, ν FOR d-LINE)

| Si (SURFACE NUMBER) | Ri (CURV- ATURE RADIUS) | Di (SURFACE DISTANCE) | Ndj (RE- FRACTIVE INDEX) | νdj (ABBE NUMBER) |
|---|---|---|---|---|
| 1 | ∞ | 0.7064 | | |
| 2 | ∞ | 1.0500 | 1.51633 | 64.14 |
| 3 | ∞ | 23.5000 | | |
| 4 | 24.3572 | 5.9036 | 1.48749 | 70.23 |
| 5 | −11.7048 | 0.0397 | | |
| 6 | −11.4784 | 1.1360 | 1.83400 | 37.16 |
| 7 | 41.3595 | 0.2001 | | |
| *8 | 17.6321 | 5.9987 | 1.58313 | 59.38 |
| *9 | −14.7819 | 0.2008 | | |
| 10 | 532.1221 | 7.4349 | 1.51633 | 64.14 |
| 11 | −11.4305 | 0.0604 | | |
| 12 | −11.2711 | 1.0506 | 1.78590 | 44.20 |
| 13 | 30.5625 | 0.9942 | | |
| 14 | 57.7667 | 14.2840 | 1.51742 | 52.43 |
| 15 | −19.1849 | 21.2107 | | |
| 16 | 120.1641 | 8.1224 | 1.80518 | 25.42 |
| 17 | −55.7119 | 1.8827 | | |
| 18 | 36.4802 | 6.1085 | 1.80518 | 25.42 |
| 19 | 167.9520 | 2.1727 | | |
| 20 | −144.0455 | 1.3991 | 1.80518 | 25.42 |
| 21 | 24.6524 | 14.7685 | | |
| 22 | −18.4764 | 5.4618 | 1.84666 | 23.78 |
| 23 | −60.6146 | 18.2285 | | |
| *24 | 15.0773 | 7.0000 | 1.49100 | 57.58 |
| *25 | 9.2087 | 51.3833 | | |
| *26 | 113.6259 | −562.0000 | REFLECTION SURFACE | |

ENTRANCE PUPIL POSITION: 30.2 FROM FIRST SURFACE

TABLE 14

EXAMPLE 5•SPECIFICATION (d-LINE)

| FNo. | 2.40 |
|---|---|
| 2ω[°] | 140.20 |

TABLE 15

EXAMPLE 5•ASPHERICAL SURFACE COEFFICIENT

| SURFACE NUMBER | 8 |
|---|---|
| KA | 1.0000000E+00 |
| A4 | −5.8646571E−05 |
| A6 | 3.0074427E−07 |
| A8 | 1.0977627E−09 |
| A10 | −3.0481514E−12 |

| SURFACE NUMBER | 9 |
|---|---|
| KA | 1.0000000E+00 |
| A4 | 3.0060642E−05 |
| A6 | 5.3583142E−08 |
| A8 | 1.9272085E−09 |
| A10 | 2.8311516E−11 |

| SURFACE NUMBER | 24 |
|---|---|
| KA | −4.8530596E+00 |
| A3 | −6.8078736E−04 |

TABLE 15-continued

EXAMPLE 5•ASPHERICAL SURFACE COEFFICIENT

| A4 | −1.8886971E−05 |
|---|---|
| A5 | −1.3974903E−06 |
| A6 | −4.5172871E−08 |
| A7 | 1.1636985E−08 |
| A8 | 3.2713625E−11 |
| A9 | −2.8750701E−11 |
| A10 | 4.2833732E−13 |
| A11 | 1.4527379E−14 |
| A12 | 5.4481976E−17 |
| A13 | −1.2091389E−17 |
| A14 | −2.3255189E−19 |
| A15 | 1.2626231E−20 |
| A16 | −1.1360084E−22 |

| SURFACE NUMBER | 25 |
|---|---|
| KA | −2.7478619E+00 |
| A3 | −8.4342662E−05 |
| A4 | −7.0929113E−05 |
| A5 | 1.1930934E−06 |
| A6 | 1.3015805E−07 |
| A7 | −5.7260652E−10 |
| A8 | −4.9222461E−10 |
| A9 | 2.0850003E−11 |
| A10 | −2.1174948E−13 |
| A11 | −2.5709636E−15 |
| A12 | −2.2162726E−17 |
| A13 | 3.8373323E−19 |
| A14 | 1.2458051E−19 |
| A15 | −3.5196617E−21 |
| A16 | 2.7900258E−23 |

| SURFACE NUMBER | 26 |
|---|---|
| KA | −1.0143512E+01 |
| A3 | −9.9531779E−06 |
| A4 | 1.2027936E−07 |
| A5 | 5.6799538E−09 |
| A6 | −1.2021621E−10 |
| A7 | 3.0011813E−12 |
| A8 | −1.5049754E−13 |
| A9 | 4.5218697E−15 |
| A10 | −8.7270730E−17 |
| A11 | 1.2285732E−18 |
| A12 | −1.2946242E−20 |
| A13 | 9.7693647E−23 |
| A14 | −4.8799440E−25 |
| A15 | 1.4265937E−27 |
| A16 | −1.8362336E−30 |

Figure 6:
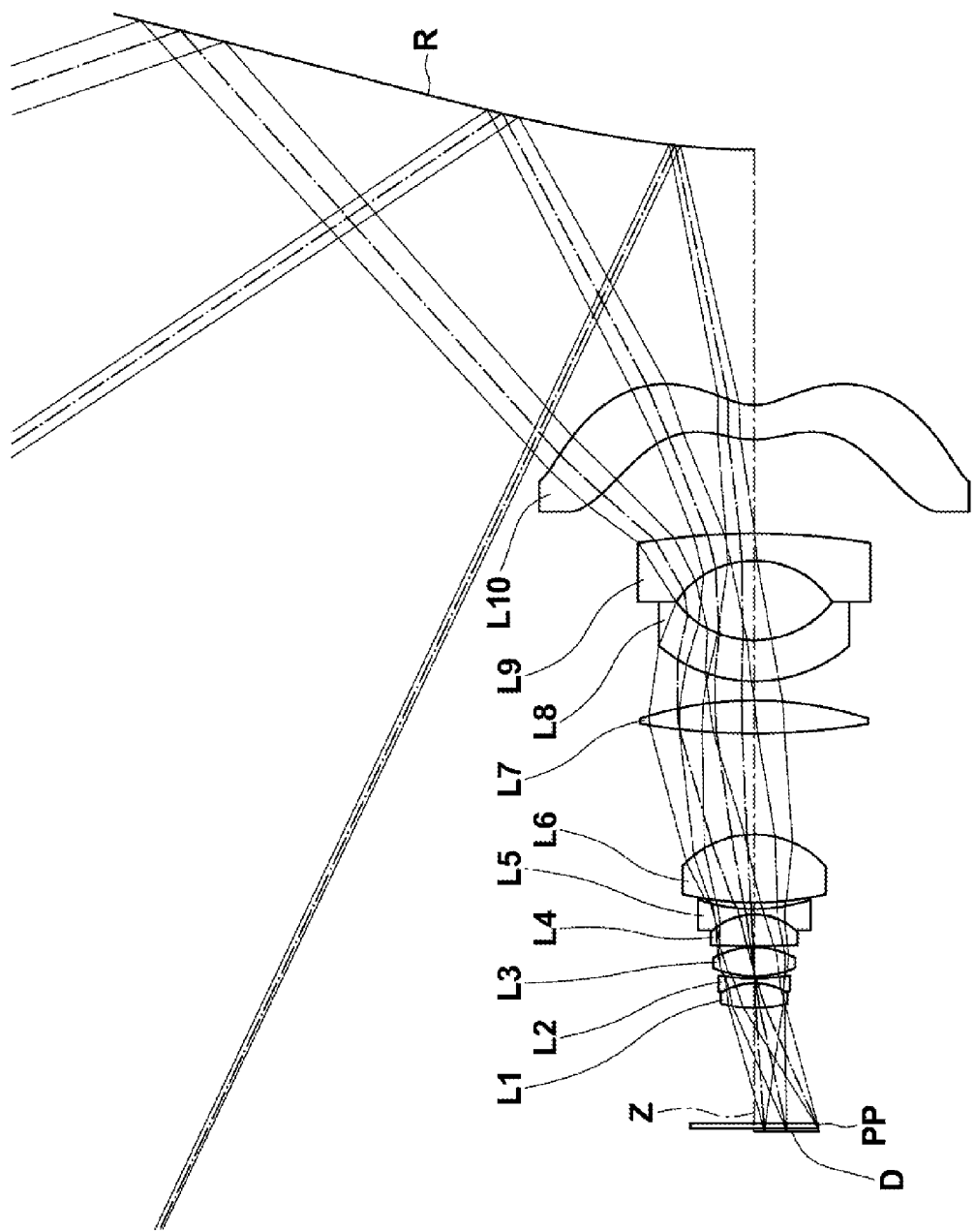
FIG. 6 is a cross section illustrating the structure of a projection optical system in Example 6 of the present invention.
Figure 23:
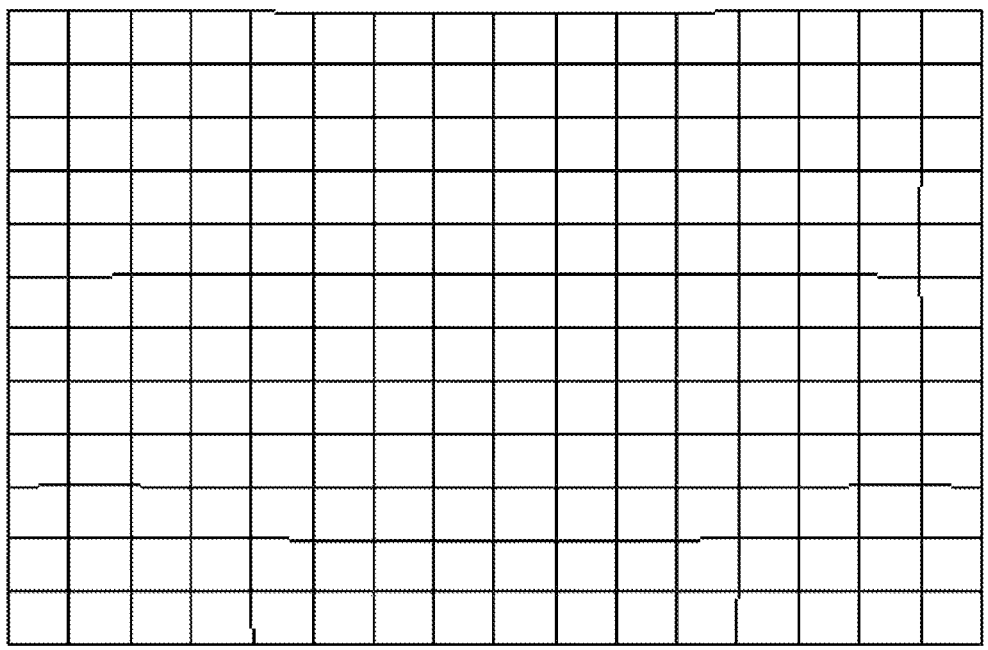
FIG. 23 is a diagram illustrating distortion performance of the projection optical system in Example 6 of the present invention.

Next, a projection optical system in Example 6 will be described. FIG. 6 is a cross section illustrating the structure of the projection optical system in Example 6. Table 16 shows basic lens data on the projection optical system in Example 6, and Table 17 shows data about specification. Table 18 shows data about aspherical surface coefficients. FIG. 23 is a diagram illustrating distortion performance, and FIG. 40 is a diagram illustrating spot performance.

In Example 6, Surface 21 through Surface 20 are optical element Lp, Surface 23 through Surface 22 are a first lens group, Surface 21 through Surface 14 are a 2a-th lens group, and Surface 13 through Surface 4 are a 2b-th lens group.

TABLE 16

EXAMPLE 6•LENS DATA (n, ν FOR d-LINE)

| Si (SURFACE NUMBER) | Ri (CURV- ATURE RADIUS) | Di (SURFACE DISTANCE) | Ndj (RE- FRACTIVE INDEX) | νdj (ABBE NUMBER) |
|---|---|---|---|---|
| 1 | ∞ | 0.7122 | | |
| 2 | ∞ | 1.0500 | 1.51633 | 64.14 |

TABLE 16-continued

EXAMPLE 6•LENS DATA (n, ν FOR d-LINE)

| Si (SURFACE NUMBER) | Ri (CURVATURE RADIUS) | Di (SURFACE DISTANCE) | Ndj (REFRACTIVE INDEX) | νdj (ABBE NUMBER) |
|---|---|---|---|---|
| 3 | ∞ | 23.5000 | | |
| 4 | 24.2572 | 5.0038 | 1.48749 | 70.23 |
| 5 | −11.9259 | 0.0409 | | |
| 6 | −11.6867 | 0.9634 | 1.83400 | 37.16 |
| 7 | 41.3064 | 0.4546 | | |
| *8 | 19.1138 | 5.9124 | 1.58313 | 59.38 |
| *9 | −14.6324 | 0.1991 | | |
| 10 | 167.0780 | 6.4709 | 1.48749 | 70.23 |
| 11 | −11.7776 | 0.0600 | | |
| 12 | −11.5974 | 1.0501 | 1.80400 | 46.58 |
| 13 | 31.8087 | 1.3550 | | |
| 14 | 59.1257 | 13.8651 | 1.49533 | 64.48 |
| 15 | −18.3239 | 20.6040 | | |
| 16 | 126.3462 | 6.7262 | 1.79999 | 25.00 |
| 17 | −69.2194 | 3.9097 | | |
| 18 | 27.4705 | 8.3848 | 1.51669 | 64.36 |
| 19 | 18.8667 | 16.2428 | | |
| 20 | −18.0070 | 5.5007 | 1.83419 | 24.27 |
| 21 | −134.9902 | 19.1604 | | |
| *22 | 14.0814 | 7.0001 | 1.49100 | 57.58 |
| *23 | 8.9104 | 52.1050 | | |
| *24 | 119.1422 | −562.0000 | REFLECTION SURFACE | |

ENTRANCE PUPIL POSITION: 30.2 FROM FIRST SURFACE

TABLE 17

EXAMPLE 6•SPECIFICATION (d-LINE)

| FNo. | 2.40 |
|---|---|
| 2ω[°] | 140.00 |

TABLE 18

EXAMPLE 6•ASPHERICAL SURFACE COEFFICIENT

| SURFACE NUMBER | 8 |
|---|---|
| KA | 1.0000000E+00 |
| A4 | −4.2839566E−05 |
| A6 | 1.5838606E−07 |
| A8 | 5.3108137E−09 |
| A10 | −1.9739049E−11 |

| SURFACE NUMBER | 9 |
|---|---|
| KA | 1.0000000E+00 |
| A4 | 3.0351035E−05 |
| A6 | 1.4248812E−07 |
| A8 | −7.9831740E−10 |
| A10 | 7.3628436E−11 |

| SURFACE NUMBER | 22 |
|---|---|
| KA | −4.9675509E+00 |
| A3 | −8.3564233E−04 |
| A4 | 2.7260068E−06 |
| A5 | −1.5162176E−06 |
| A6 | −1.1582365E−07 |
| A7 | 1.2896963E−08 |
| A8 | 1.4178798E−10 |
| A9 | −3.0636011E−11 |
| A10 | 3.1856151E−13 |
| A11 | 1.6763884E−14 |
| A12 | 7.8227138E−17 |
| A13 | −1.2591173E−17 |
| A14 | −2.1397590E−19 |

TABLE 18-continued

EXAMPLE 6•ASPHERICAL SURFACE COEFFICIENT

| A15 | 1.1737565E−20 |
|---|---|
| A16 | −1.0356158E−22 |

| SURFACE NUMBER | 23 |
|---|---|
| KA | −3.1856063E+00 |
| A3 | 1.4615400E−04 |
| A4 | −8.0637819E−05 |
| A5 | 1.0613018E−06 |
| A6 | 1.4639739E−07 |
| A7 | −7.9152457E−10 |
| A8 | −4.8778452E−10 |
| A9 | 2.0158050E−11 |
| A10 | −1.9044707E−13 |
| A11 | −2.6270917E−15 |
| A12 | −2.3810326E−17 |
| A13 | 4.0749800E−19 |
| A14 | 1.1553271E−19 |
| A15 | −3.2263399E−21 |
| A16 | 2.5278504E−23 |

| SURFACE NUMBER | 24 |
|---|---|
| KA | −1.1141359E+01 |
| A3 | −1.0024196E−05 |
| A4 | 1.2358980E−07 |
| A5 | 5.5061450E−09 |
| A6 | −1.2298128E−10 |
| A7 | 3.2343199E−12 |
| A8 | −1.6444853E−13 |
| A9 | 4.9846709E−15 |
| A10 | −9.6899945E−17 |
| A11 | 1.3763157E−18 |
| A12 | −1.4673207E−20 |
| A13 | 1.1207577E−22 |
| A14 | −5.6564215E−25 |
| A15 | 1.6666037E−27 |
| A16 | −2.1575652E−30 |

Figure 7:
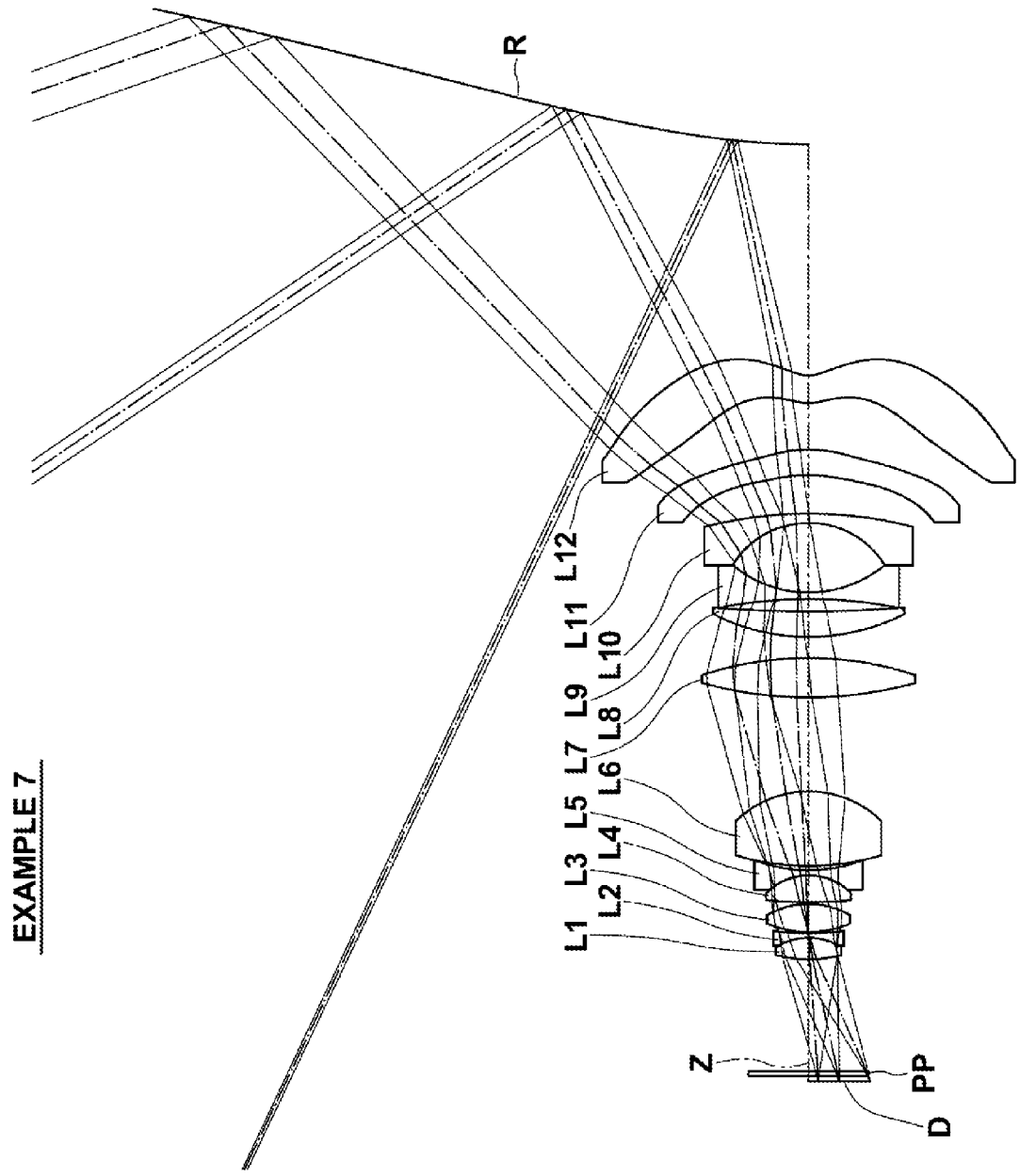
FIG. 7 is a cross section illustrating the structure of a projection optical system in Example 7 of the present invention.
Figure 24:
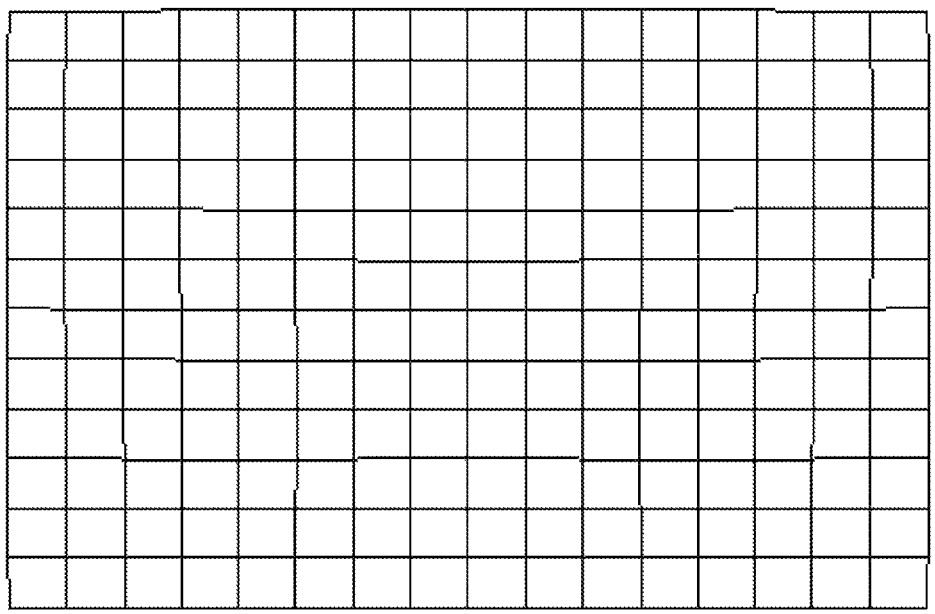
FIG. 24 is a diagram illustrating distortion performance of the projection optical system in Example 7 of the present invention.
Figure 41:
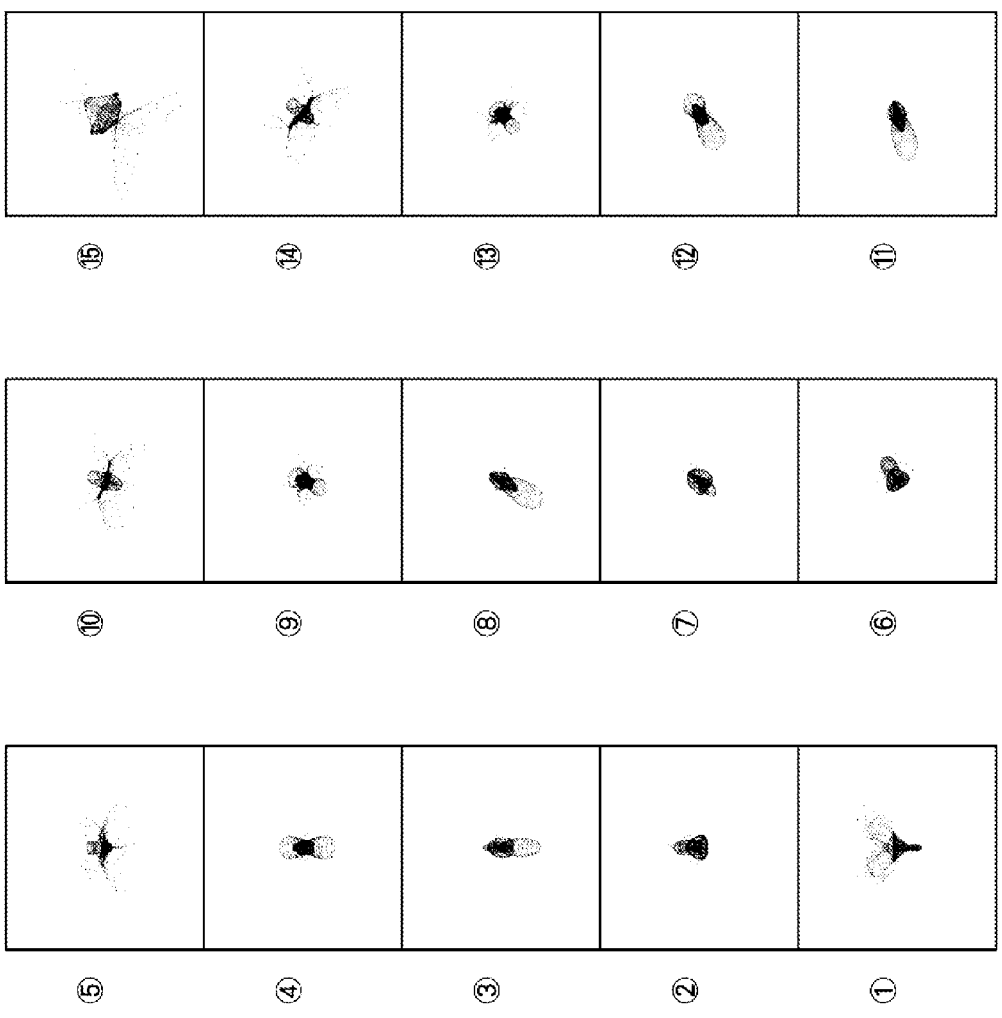
FIG. 41 is a diagram illustrating spot performance of the projection optical system in Example 7 of the present invention.

Next, a projection optical system in Example 7 will be described. FIG. 7 is a cross section illustrating the structure of the projection optical system in Example 7. Table 19 shows basic lens data on the projection optical system in Example 7, and Table 20 shows data about specification. Table 21 shows data about aspherical surface coefficients. FIG. 24 is a diagram illustrating distortion performance, and FIG. 41 is a diagram illustrating spot performance.

In Example 7, Surface 23 through Surface 22 are optical element Lp, Surface 27 through Surface 24 are a first lens group, Surface 23 through Surface 14 are a 2a-th lens group, and Surface 13 through Surface 4 are a 2b-th lens group.

TABLE 19

EXAMPLE 7•LENS DATA (n, ν FOR d-LINE)

| Si (SURFACE NUMBER) | Ri (CURVATURE RADIUS) | Di (SURFACE DISTANCE) | Ndj (REFRACTIVE INDEX) | νdj (ABBE NUMBER) |
|---|---|---|---|---|
| 1 | ∞ | 1.1436 | | |
| 2 | ∞ | 1.0500 | 1.51633 | 64.14 |
| 3 | ∞ | 24.0000 | | |
| 4 | 26.4352 | 4.6158 | 1.48749 | 70.23 |
| 5 | −12.2017 | 0.0408 | | |
| 6 | −11.9544 | 0.8998 | 1.83400 | 37.16 |
| 7 | 50.2341 | 0.2469 | | |
| *8 | 19.7081 | 6.0697 | 1.58313 | 59.38 |
| *9 | −15.5249 | 0.3641 | | |
| 10 | 86.6728 | 5.7616 | 1.48749 | 70.23 |
| 11 | −11.9472 | 0.0594 | | |
| 12 | −11.7832 | 1.0508 | 1.80400 | 46.58 |
| 13 | 29.8102 | 0.9315 | | |

TABLE 19-continued

EXAMPLE 7·LENS DATA (n, ν FOR d-LINE)

| Si (SURFACE NUMBER) | Ri (CURV- ATURE RADIUS) | Di (SURFACE DISTANCE) | Ndj (RE- FRACTIVE INDEX) | νdj (ABBE NUMBER) |
|---|---|---|---|---|
| 14 | 50.9628 | 16.0000 | 1.51633 | 64.14 |
| 15 | −20.8828 | 20.1857 | | |
| 16 | 79.7028 | 8.4744 | 1.80000 | 29.84 |
| 17 | −66.9751 | 4.5035 | | |
| 18 | 41.7057 | 5.4800 | 1.80518 | 25.42 |
| 19 | 233.4703 | 2.6733 | | |
| 20 | −91.1313 | 1.3999 | 1.68893 | 31.07 |
| 21 | 23.7989 | 14.9364 | | |
| 22 | −18.0261 | 1.9861 | 1.84666 | 23.78 |
| 23 | −82.9595 | 8.2553 | | |
| *24 | −41.5406 | 5.4696 | 1.49100 | 57.58 |
| *25 | −54.9166 | 10.0230 | | |
| *26 | 7.3049 | 5.9036 | 1.49100 | 57.58 |
| *27 | 5.1475 | 49.6818 | | |
| *28 | 135.0387 | −562.0000 | REFLECTION SURFACE | |

ENTRANCE PUPIL POSITION: 29.3 FROM FIRST SURFACE

TABLE 20

EXAMPLE 7·SPECIFICATION (d-LINE)

| FNo. | 2.40 |
|---|---|
| 2ω[°] | 139.70 |

TABLE 21

EXAMPLE 7·ASPHERICAL SURFACE COEFFICIENT

| SURFACE NUMBER | 8 |
|---|---|
| KA | 1.0000000E+00 |
| A4 | −3.6369620E−05 |
| A6 | 2.8442859E−07 |
| A8 | −2.2536981E−10 |
| A10 | −2.4002750E−12 |

| SURFACE NUMBER | 9 |
|---|---|
| KA | 1.0000000E+00 |
| A4 | 2.2149593E−05 |
| A6 | −6.7326578E−09 |
| A8 | 3.0573301E−09 |
| A10 | −3.6453768E−12 |

| SURFACE NUMBER | 24 |
|---|---|
| KA | 1.5583500E+00 |
| A3 | −1.5401324E−03 |
| A4 | 9.6295783E−05 |
| A5 | 1.5917455E−05 |
| A6 | −9.2729971E−07 |
| A7 | −6.5352396E−08 |
| A8 | 3.6993206E−09 |
| A9 | 1.3928520E−10 |
| A10 | −7.5961829E−12 |
| A11 | −1.6273741E−13 |
| A12 | 8.3948834E−15 |
| A13 | 9.8648985E−17 |
| A14 | −4.7521895E−18 |
| A15 | −2.4171128E−20 |
| A16 | 1.0851097E−21 |

| SURFACE NUMBER | 25 |
|---|---|
| KA | 1.2510904E+00 |
| A3 | −2.6851525E−03 |
| A4 | 1.0669764E−04 |

TABLE 21-continued

EXAMPLE 7·ASPHERICAL SURFACE COEFFICIENT

| A5 | 1.9861296E−05 |
|---|---|
| A6 | −8.5838808E−07 |
| A7 | −6.9757964E−08 |
| A8 | 3.1315071E−09 |
| A9 | 1.3167122E−10 |
| A10 | −6.0404997E−12 |
| A11 | −1.3718034E−13 |
| A12 | 6.4062963E−15 |
| A13 | 7.4185264E−17 |
| A14 | −3.5372651E−18 |
| A15 | −1.6271230E−20 |
| A16 | 7.9462615E−22 |

| SURFACE NUMBER | 26 |
|---|---|
| KA | −5.6235108E+00 |
| A3 | −2.9333167E−03 |
| A4 | 8.3296856E−05 |
| A5 | 4.6023512E−06 |
| A6 | −4.5096481E−07 |
| A7 | 1.0073123E−09 |
| A8 | 8.8563150E−10 |
| A9 | −1.2610404E−11 |
| A10 | −7.2112729E−13 |
| A11 | 5.6478789E−15 |
| A12 | 6.4584300E−16 |
| A13 | −5.5762994E−18 |
| A14 | −3.1653003E−19 |
| A15 | 5.8095791E−21 |
| A16 | −2.2969300E−23 |

| SURFACE NUMBER | 27 |
|---|---|
| KA | −4.0374968E+00 |
| A3 | −6.5960709E−04 |
| A4 | −4.4331836E−05 |
| A5 | 2.2207558E−06 |
| A6 | 4.6458610E−08 |
| A7 | −1.8244784E−09 |
| A8 | −2.9177789E−10 |
| A9 | 1.6823917E−11 |
| A10 | −2.3813487E−13 |
| A11 | −1.9087294E−15 |
| A12 | 1.6682888E−17 |
| A13 | 1.6807941E−19 |
| A14 | 7.7040757E−20 |
| A15 | −2.2684215E−21 |
| A16 | 1.8118812E−23 |

| SURFACE NUMBER | 28 |
|---|---|
| KA | −1.8325942E+01 |
| A3 | 4.6594993E−06 |
| A4 | 2.7099017E−07 |
| A5 | −2.4593862E−09 |
| A6 | −9.4890899E−11 |
| A7 | 2.2823093E−12 |
| A8 | −4.6562219E−14 |
| A9 | 1.1671872E−15 |
| A10 | −2.1804927E−17 |
| A11 | 2.7641493E−19 |
| A12 | −2.4781109E−21 |
| A13 | 1.5877131E−23 |
| A14 | −6.9267939E−26 |
| A15 | 1.8238324E−28 |
| A16 | −2.1615054E−31 |

Figure 8:
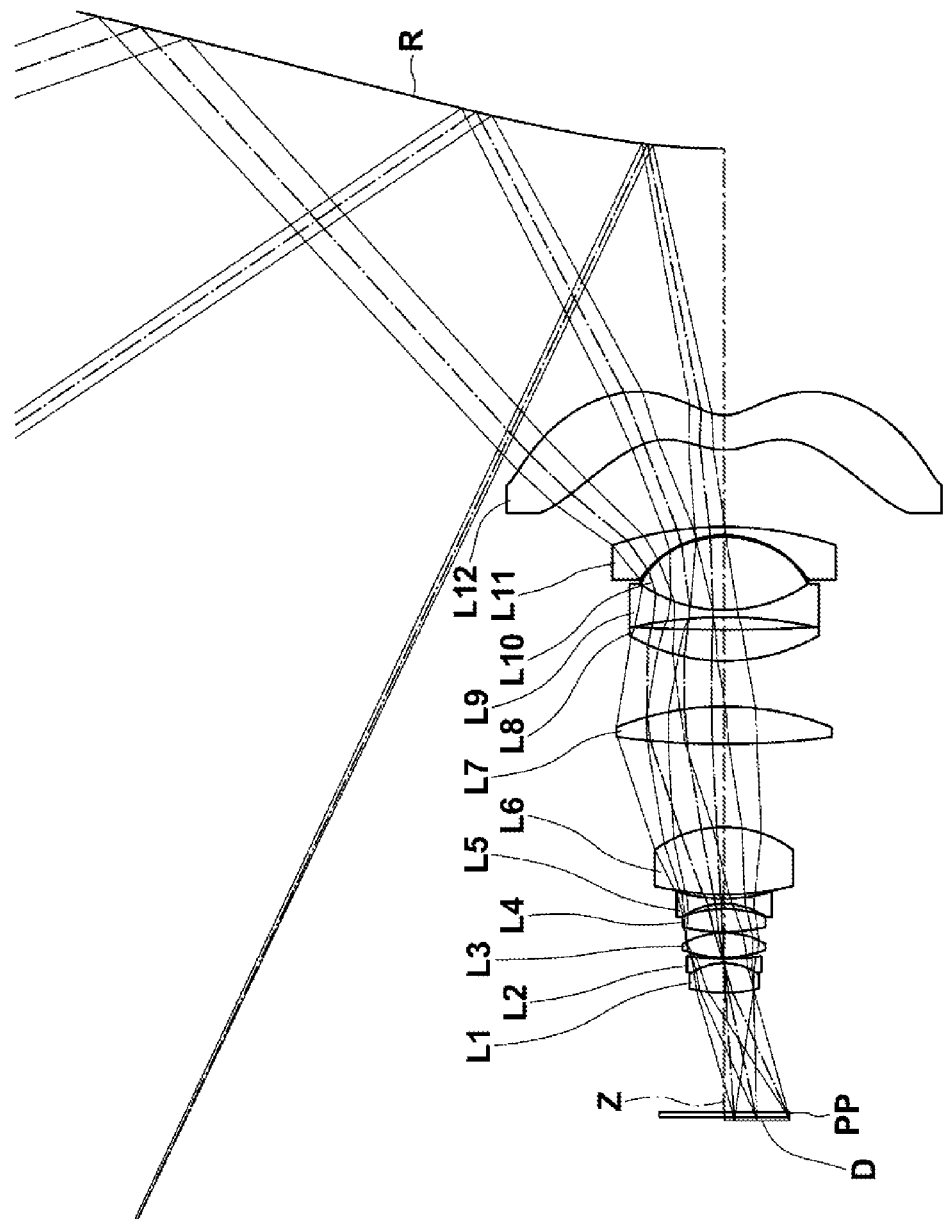
FIG. 8 is a cross section illustrating the structure of a projection optical system in Example 8 of the present invention.
Figure 25:
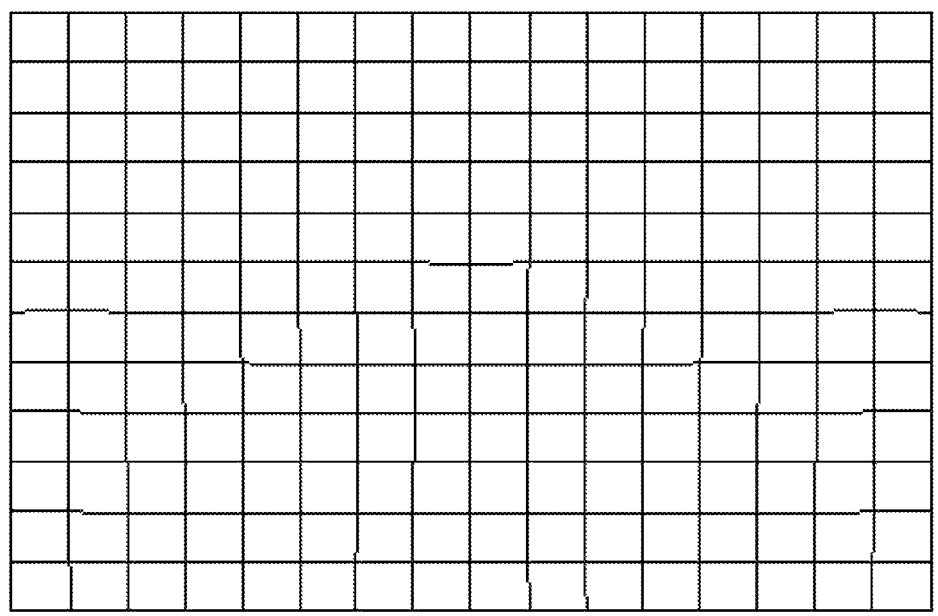
FIG. 25 is a diagram illustrating distortion performance of the projection optical system in Example 8 of the present invention.

Next, a projection optical system in Example 8 will be described. FIG. 8 is a cross section illustrating the structure of the projection optical system in Example 8. Table 22 shows basic lens data on the projection optical system in Example 8, and Table 23 shows data about specification. Table 24 shows data about aspherical surface coefficients. FIG. 25 is a diagram illustrating distortion performance, and FIG. 42 is a diagram illustrating spot performance.

In Example 8, Surface 24 through Surface 22 are optical element Lp, Surface 26 through Surface 25 are a first lens group, Surface 24 through Surface 14 are a 2a-th lens group, and Surface 13 through Surface 4 are a 2b-th lens group.

TABLE 22

EXAMPLE 8·LENS DATA (n, ν FOR d-LINE)

| Si (SURFACE NUMBER) | Ri (CURVATURE RADIUS) | Di (SURFACE DISTANCE) | Ndj (REFRACTIVE INDEX) | νdj (ABBE NUMBER) |
|---|---|---|---|---|
| 1 | ∞ | 0.7027 | | |
| 2 | ∞ | 1.0500 | 1.51633 | 64.14 |
| 3 | ∞ | 24.0000 | | |
| 4 | 25.3362 | 5.9809 | 1.51199 | 64.54 |
| 5 | −11.2080 | 0.0409 | | |
| 6 | −10.9968 | 0.8991 | 1.90366 | 31.31 |
| 7 | 61.3664 | 0.2004 | | |
| 8 | 21.9589 | 4.9836 | 1.56104 | 50.24 |
| 9 | −15.1724 | 0.1991 | | |
| 10 | 34.6386 | 4.6245 | 1.51919 | 51.40 |
| 11 | −21.5342 | 0.9936 | | |
| 12 | −13.5703 | 1.0492 | 1.83400 | 37.16 |
| 13 | 30.7732 | 0.8494 | | |
| 14 | 53.5248 | 13.5547 | 1.56564 | 44.58 |
| 15 | −21.8172 | 16.7220 | | |
| 16 | 149.3213 | 7.5906 | 1.80518 | 25.42 |
| 17 | −53.7445 | 9.1930 | | |
| 18 | 35.5435 | 6.2231 | 1.80000 | 29.64 |
| 19 | 265.5989 | 2.5746 | | |
| 20 | −80.3130 | 1.3990 | 1.80518 | 25.42 |
| 21 | 27.4807 | 14.6970 | | |
| *22 | −19.7727 | 0.4010 | 1.52437 | 53.67 |
| 23 | −19.2203 | 1.7000 | 1.80518 | 25.42 |
| 24 | −64.3321 | 15.4613 | | |
| *25 | 10.3764 | 7.0009 | 1.49100 | 57.58 |
| *26 | 6.8379 | 53.6900 | | |
| *27 | 120.1798 | −516.0000 | REFLECTION SURFACE | |

ENTRANCE PUPIL POSITION: 29.3 FROM FIRST SURFACE

TABLE 23

EXAMPLE 8·SPECIFICATION (d-LINE)

| FNo. | 2.40 |
|---|---|
| 2ω[°] | 139.70 |

TABLE 24

EXAMPLE 8·ASPHERICAL SURFACE COEFFICIENT

| SURFACE NUMBER | 22 |
|---|---|
| KA | 1.0000000E+00 |
| A3 | 0.0000000E+00 |
| A4 | 4.3301170E−05 |
| A5 | −3.2557864E−06 |
| A6 | −7.0340177E−08 |
| A7 | 7.7847644E−10 |
| A8 | 1.8653702E−10 |
| A9 | 7.0752174E−12 |
| A10 | 2.5778014E−13 |
| A11 | −2.0204305E−14 |
| A12 | −3.3943719E−16 |
| A13 | −1.0284233E−16 |
| A14 | −5.0935247E−18 |
| A15 | 1.9504046E−19 |
| A16 | 1.3198964E−21 |

TABLE 24-continued

EXAMPLE 8·ASPHERICAL SURFACE COEFFICIENT

| SURFACE NUMBER | 25 |
|---|---|
| KA | −2.0811958E+00 |
| A3 | −1.1519904E−03 |
| A4 | −4.0862512E−05 |
| A5 | −1.0901039E−06 |
| A6 | 6.8913160E−08 |
| A7 | 1.1016458E−08 |
| A8 | −2.0162098E−10 |
| A9 | −2.3114343E−11 |
| A10 | 5.5827689E−13 |
| A11 | 1.0899909E−14 |
| A12 | −1.5724241E−16 |
| A13 | −7.2553162E−18 |
| A14 | −6.1150901E−20 |
| A15 | 6.7240125E−21 |
| A16 | −6.8609827E−23 |

| SURFACE NUMBER | 26 |
|---|---|
| KA | −1.7389678E+00 |
| A3 | −9.1409111E−04 |
| A4 | −4.5203813E−05 |
| A5 | 2.5559318E−08 |
| A6 | 5.1169398E−08 |
| A7 | −1.1890333E−09 |
| A8 | −3.8699943E−10 |
| A9 | 2.0163039E−11 |
| A10 | −2.7472040E−13 |
| A11 | −1.8935931E−15 |
| A12 | −8.3881513E−19 |
| A13 | 1.2646365E−19 |
| A14 | 1.1997609E−19 |
| A15 | −3.4318299E−21 |
| A16 | 2.7441423E−23 |

| SURFACE NUMBER | 27 |
|---|---|
| KA | −1.9228012E+01 |
| A3 | 2.4033356E−05 |
| A4 | −4.3123308E−07 |
| A5 | −7.6485930E−10 |
| A6 | 1.1464411E−10 |
| A7 | 3.7338832E−12 |
| A8 | −2.7061878E−13 |
| A9 | 7.3336443E−15 |
| A10 | −1.3677378E−16 |
| A11 | 2.0250792E−18 |
| A12 | −2.3044680E−20 |
| A13 | 1.8483775E−22 |
| A14 | −9.5824880E−25 |
| A15 | 2.8556539E−27 |
| A16 | −3.7060729E−30 |

Figure 9:
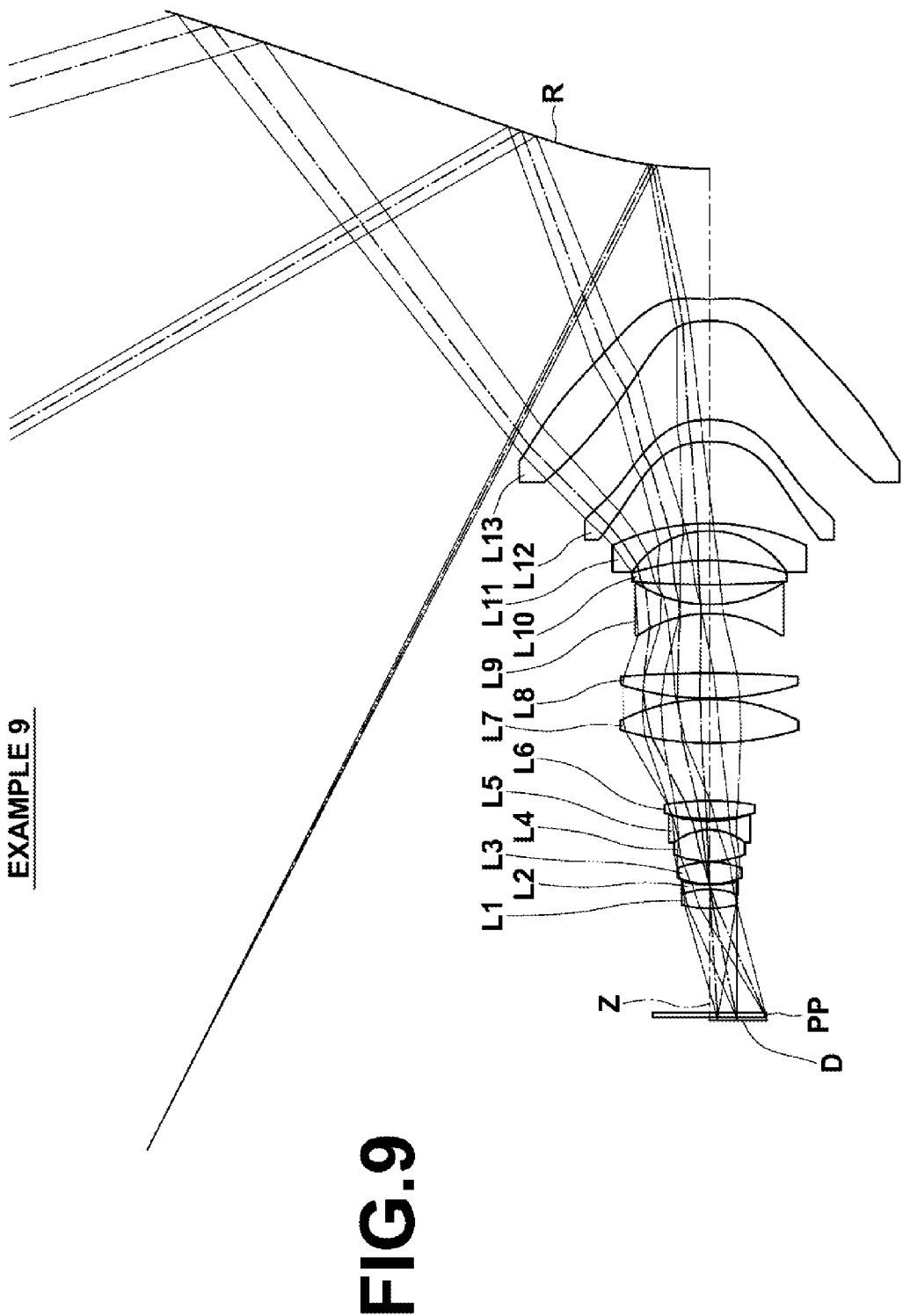
FIG. 9 is a cross section illustrating the structure of a projection optical system in Example 9 of the present invention.
Figure 26:
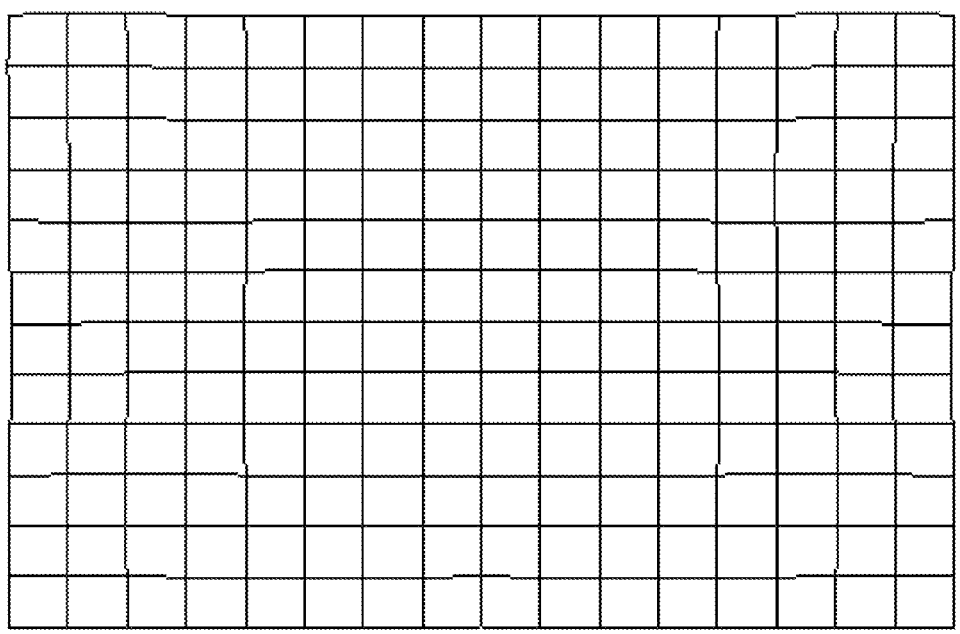
FIG. 26 is a diagram illustrating distortion performance of the projection optical system in Example 9 of the present invention.

Next, a projection optical system in Example 9 will be described. FIG. 9 is a cross section illustrating the structure of the projection optical system in Example 9. Table 25 shows basic lens data on the projection optical system in Example 9, and Table 26 shows data about specification. Table 27 shows data about aspherical surface coefficients. FIG. 26 is a diagram illustrating distortion performance, and FIG. 43 is a diagram illustrating spot performance.

In Example 9, Surface 25 through Surface 24 are optical element Lp, Surface 29 through Surface 26 are a first lens group, Surface 25 through Surface 14 are a 2a-th lens group, and Surface 13 through Surface 4 are a 2b-th lens group.

TABLE 25

EXAMPLE 9・LENS DATA (n, ν FOR d-LINE)

| Si (SURFACE NUMBER) | Ri (CURVATURE RADIUS) | Di (SURFACE DISTANCE) | Ndj (REFRACTIVE INDEX) | νdj (ABBE NUMBER) |
|---|---|---|---|---|
| 1 | ∞ | 0.7048 | | |
| 2 | ∞ | 1.0500 | 1.51633 | 64.14 |
| 3 | ∞ | 24.0000 | | |
| 4 | 24.8239 | 4.3703 | 1.48749 | 70.24 |
| 5 | −16.3683 | 0.0402 | | |
| 6 | −15.9011 | 1.0000 | 1.80400 | 46.58 |
| 7 | 27.7848 | 0.1990 | | |
| 8 | 18.6030 | 5.0117 | 1.50581 | 64.78 |
| 9 | −19.1856 | 0.1999 | | |
| 10 | 20.9264 | 7.1571 | 1.48749 | 70.24 |
| 11 | −12.1402 | 0.0608 | | |
| 12 | −11.9689 | 1.9396 | 1.80001 | 43.85 |
| 13 | 26.3423 | 0.5600 | | |
| 14 | 37.9928 | 4.1565 | 1.53060 | 63.82 |
| 15 | −58.8206 | 13.2720 | | |
| 16 | 65.2172 | 10.0808 | 1.57193 | 62.23 |
| 17 | −41.7832 | 0.2002 | | |
| 18 | 62.2668 | 5.8088 | 1.79443 | 32.68 |
| 19 | −241.9075 | 13.6843 | | |
| 20 | −27.3434 | 2.0742 | 1.51000 | 53.13 |
| 21 | 29.1097 | 4.5987 | | |
| 22 | 206.7866 | 5.5512 | 1.80000 | 35.09 |
| 23 | −51.6637 | 6.8130 | | |
| 24 | −20.1641 | 1.7002 | 1.84566 | 23.78 |
| 25 | −47.5862 | 18.7680 | | |
| *26 | −55.7840 | 5.0042 | 1.49100 | 57.58 |
| *27 | −36.4526 | 22.7525 | | |
| *28 | −26.9278 | 5.0006 | 1.49100 | 57.58 |
| *29 | 19.4847 | 30.0000 | | |
| *30 | 94.4520 | −430.0000 | REFLECTION SURFACE | |

ENTRANCE PUPIL POSITION: 29.3 FROM FIRST SURFACE

TABLE 26

EXAMPLE 9・SPECIFICATION (d-LINE)

| | |
|---|---|
| FNo. | 2.40 |
| 2ω[°] | 144.80 |

TABLE 27

EXAMPLE 9・ASPHERICAL SURFACE COEFFICIENT

| SURFACE NUMBER | 26 |
|---|---|
| KA | 4.2742769E+00 |
| A3 | −3.0679255E−03 |
| A4 | 1.3199878E−04 |
| A5 | −2.1822209E−06 |
| A6 | −7.9313815E−07 |
| A7 | 1.0887543E−07 |
| A8 | −2.6572306E−09 |
| A9 | −5.3262036E−10 |
| A10 | 3.9437503E−11 |
| A11 | −3.9345972E−13 |
| A12 | −2.7188425E−14 |
| A13 | 5.4193605E−16 |
| A14 | −2.5653762E−17 |
| A15 | 1.6129763E−18 |
| A16 | −2.5222424E−20 |

| SURFACE NUMBER | 27 |
|---|---|
| KA | 8.4019028E−01 |
| A3 | −1.4161064E−03 |
| A4 | −7.6633531E−05 |
| A5 | −7.2072345E−06 |
| A6 | 3.6477353E−06 |
| A7 | −4.1235608E−07 |
| A8 | 2.3999573E−08 |
| A9 | −8.3236016E−10 |
| A10 | 1.1848177E−11 |
| A11 | 6.7342354E−13 |
| A12 | −3.7650201E−14 |
| A13 | −4.6000900E−17 |
| A14 | 4.4791608E−17 |
| A15 | −1.1105544E−18 |
| A16 | 8.3329621E−21 |

| SURFACE NUMBER | 28 |
|---|---|
| KA | −3.6940660E+00 |
| A3 | 1.2454970E−03 |
| A4 | −4.5013280E−04 |
| A5 | −9.0926391E−06 |
| A6 | 2.9038766E−06 |
| A7 | −9.0182168E−08 |
| A8 | 7.7883408E−10 |
| A9 | −8.9844580E−11 |
| A10 | 2.2275225E−12 |
| A11 | 1.5425791E−13 |
| A12 | −3.6275698E−15 |
| A13 | −2.1563571E−16 |
| A14 | 9.9890726E−18 |
| A15 | −1.5051643E−19 |
| A16 | 7.9845950E−22 |

| SURFACE NUMBER | 29 |
|---|---|
| KA | −4.9082415E−01 |
| A3 | −4.1301737E−03 |
| A4 | 9.0454113E−05 |
| A5 | 3.2145474E−06 |
| A6 | −4.6721060E−07 |
| A7 | 2.5360824E−08 |
| A8 | −4.1241893E−10 |
| A9 | −5.1046458E−12 |
| A10 | −1.2247544E−13 |
| A11 | 1.7277863E−14 |
| A12 | −2.9701064E−16 |
| A13 | −3.7764965E−18 |
| A14 | 2.1893241E−19 |
| A15 | −3.6245785E−21 |
| A16 | 2.3488105E−23 |

| SURFACE NUMBER | 30 |
|---|---|
| KA | −2.0882647E+00 |
| A3 | −8.3116592E−06 |
| A4 | 1.5285758E−06 |
| A5 | −1.0936649E−08 |
| A6 | −1.7665390E−09 |
| A7 | 4.3511488E−11 |
| A8 | −1.3681297E−13 |
| A9 | −6.5213847E−15 |
| A10 | 6.6348516E−17 |
| A11 | 3.7153014E−19 |
| A12 | −9.7647580E−21 |
| A13 | 5.2574189E−23 |
| A14 | 2.2682052E−26 |
| A15 | −1.0773951E−27 |
| A16 | 2.6966738E−30 |

Figure 10:
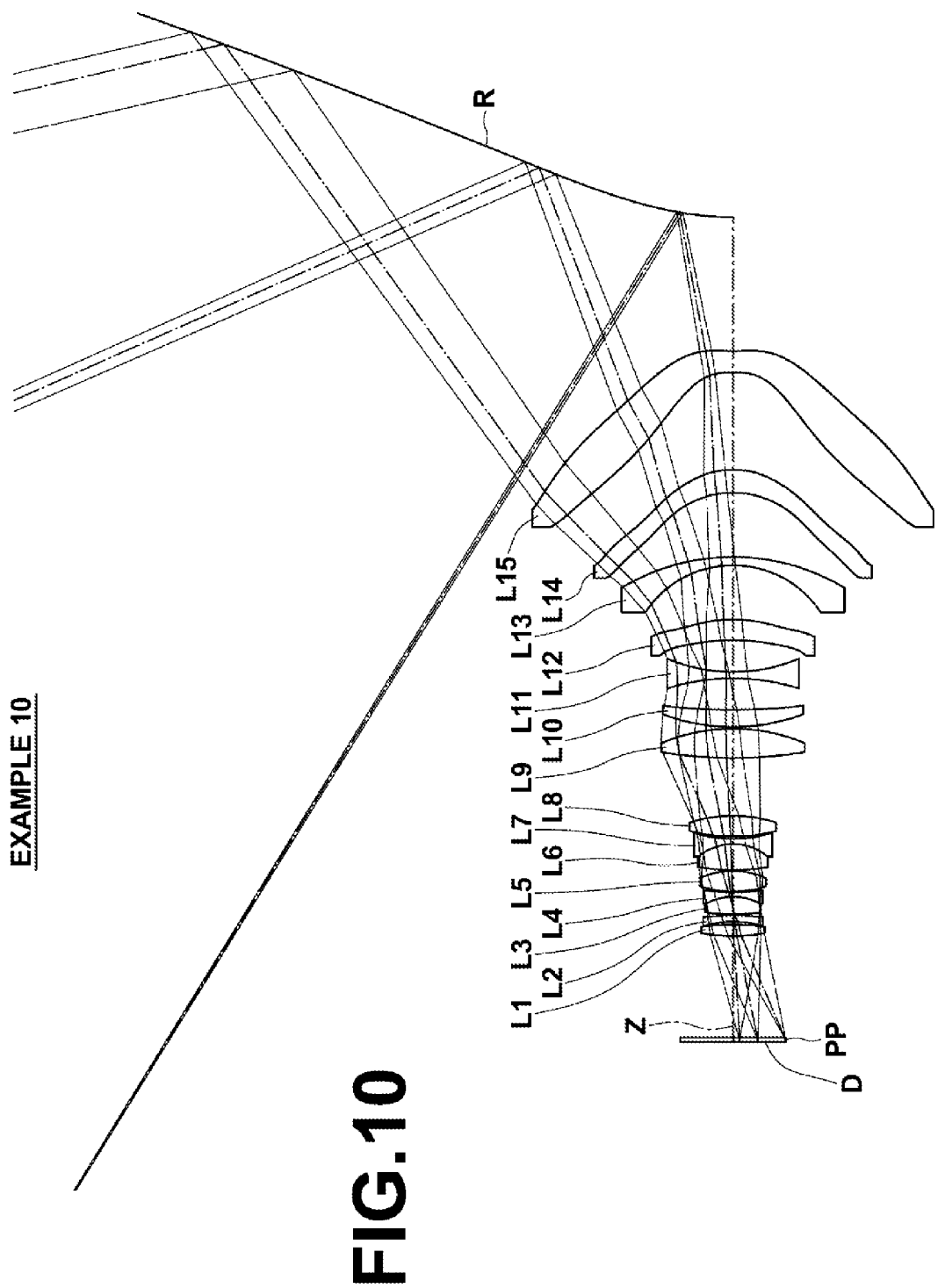
FIG. 10 is a cross section illustrating the structure of a projection optical system in Example 10 of the present invention.
Figure 27:
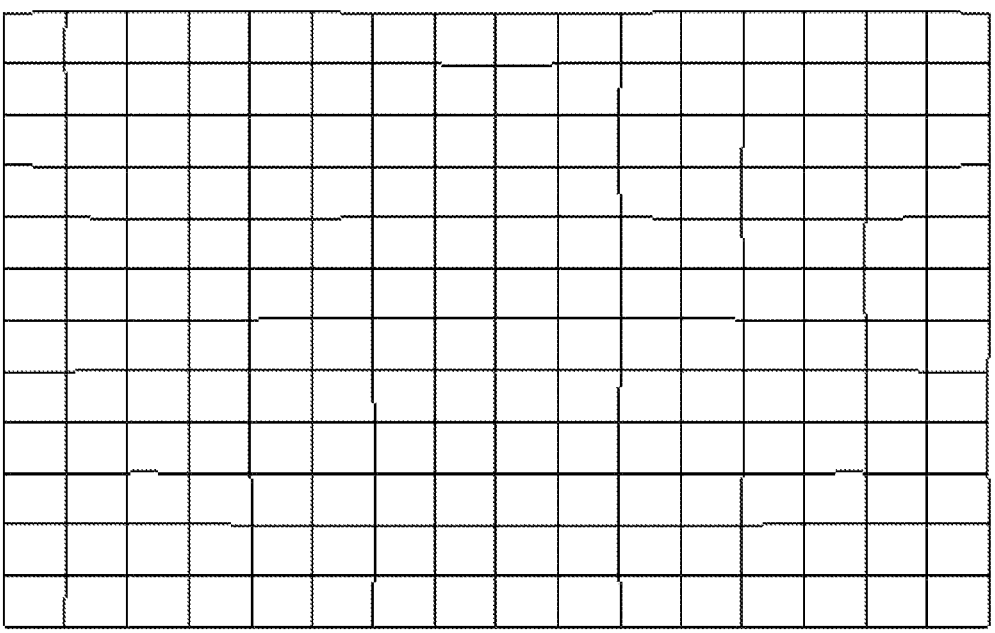
FIG. 27 is a diagram illustrating distortion performance of the projection optical system in Example 10 of the present invention.
Figure 44:
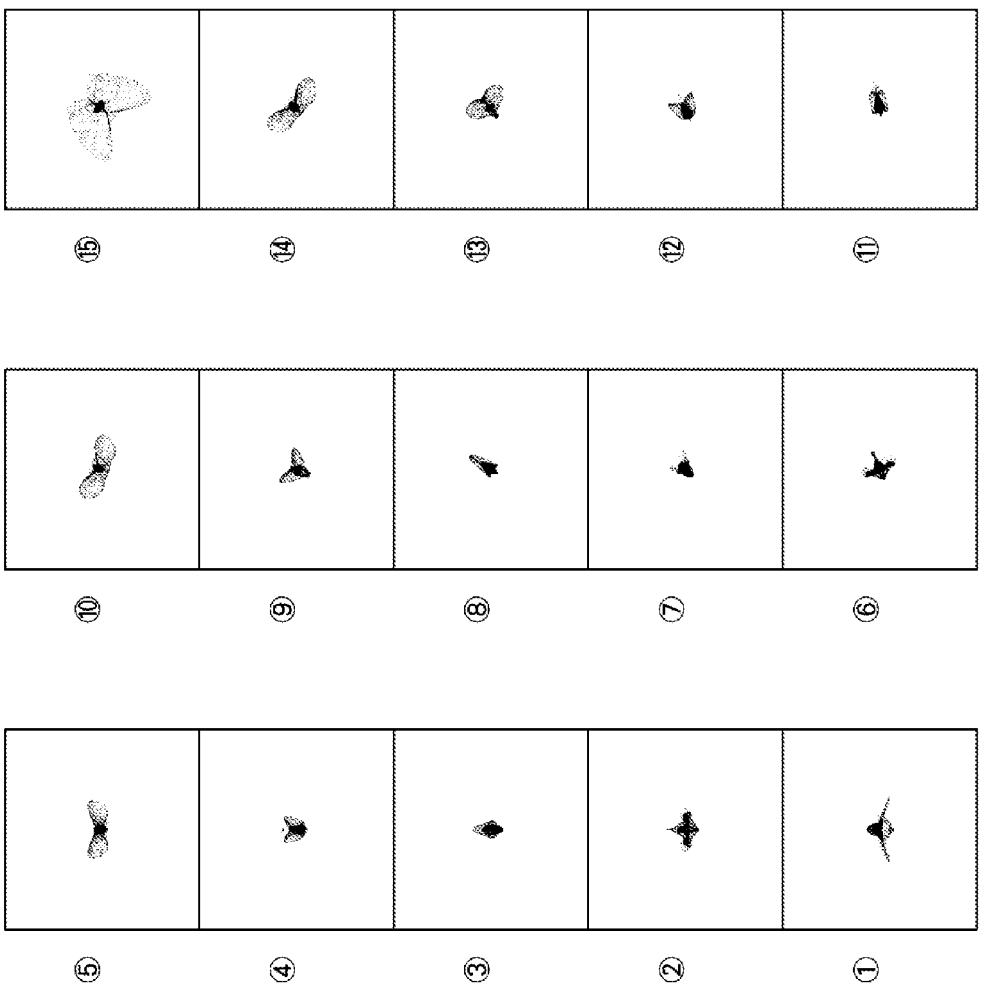
FIG. 44 is a diagram illustrating spot performance of the projection optical system in Example 10 of the present invention.

Next, a projection optical system in Example 10 will be described. FIG. 10 is a cross section illustrating the structure of the projection optical system in Example 10. Table 28 shows basic lens data on the projection optical system in Example 10, and Table 29 shows data about specification. Table 30 shows data about aspherical surface coefficients. FIG. 27 is a diagram illustrating distortion performance, and FIG. 44 is a diagram illustrating spot performance.

In Example 10, Surface 27 through Surface 26 are optical element Lp, Surface 31 through Surface 28 are a first lens group, Surface 27 through Surface 16 are a 2a-th lens group, and Surface 15 through Surface 4 are a 2b-th lens group.

TABLE 28

EXAMPLE 10·LENS DATA (n, ν FOR d-LINE)

| Si (SURFACE NUMBER) | Ri (CURVATURE RADIUS) | Di (SURFACE DISTANCE) | Ndj (REFRACTIVE INDEX) | νdj (ABBE NUMBER) |
|---|---|---|---|---|
| 1 | ∞ | 0.0111 | | |
| 2 | ∞ | 1.0500 | 1.51633 | 64.14 |
| 3 | ∞ | 24.0000 | | |
| 4 | 39.8387 | 2.7394 | 1.67790 | 55.34 |
| 5 | −45.1095 | 0.6703 | | |
| 6 | −21.3338 | 1.4820 | 1.80518 | 25.42 |
| 7 | −50.4092 | 0.1998 | | |
| 8 | 39.8543 | 4.2090 | 1.51633 | 64.14 |
| 9 | −12.1664 | 1.0006 | 1.77250 | 49.60 |
| 10 | 40.1232 | 0.2000 | | |
| 11 | 22.6870 | 4.8931 | 1.57099 | 50.80 |
| 12 | −17.3384 | 0.2006 | | |
| 13 | 43.0088 | 6.1940 | 1.48749 | 70.23 |
| 14 | −11.7230 | 1.1610 | 1.80610 | 40.92 |
| 15 | 26.5498 | 0.5784 | | |
| 16 | 37.4859 | 4.9082 | 1.51633 | 64.14 |
| 17 | −30.5336 | 13.6869 | | |
| 18 | 95.5747 | 6.9253 | 1.72825 | 28.46 |
| 19 | −40.4376 | 0.4014 | | |
| 20 | 43.7848 | 4.0166 | 1.51742 | 52.43 |
| 21 | 124.1146 | 7.4964 | | |
| 22 | −47.9497 | 1.5004 | 1.62299 | 58.16 |
| 23 | 37.0602 | 7.5053 | | |
| *24 | −42.6101 | 4.9120 | 1.49100 | 57.58 |
| *25 | −28.3253 | 12.7739 | | |
| 26 | −23.2771 | 2.0003 | 1.80518 | 25.42 |
| 27 | −47.4367 | 15.1363 | | |
| *28 | −78.2426 | 5.4470 | 1.49100 | 57.58 |
| *29 | −61.2421 | 23.0176 | | |
| *30 | −818.9245 | 5.0526 | 1.49100 | 57.58 |
| *31 | 25.3056 | 31.7038 | | |
| *32 | 61.9999 | −290.0000 | REFLECTION SURFACE | |

ENTRANCE PUPIL POSITION: 29.3 FROM FIRST SURFACE

TABLE 29

EXAMPLE 10·SPECIFICATION (d-LINE)

| | |
|---|---|
| FNo. | 2.40 |
| 2ω[°] | 152.70 |

TABLE 30

EXAMPLE 10·ASPHERICAL SURFACE COEFFICIENT

| SURFACE NUMBER | 24 |
|---|---|
| KA | 4.0207962E+00 |
| A3 | −6.2359574E−05 |
| A4 | 2.4260210E−05 |
| A5 | 3.0315217E−06 |
| A6 | −8.7417236E−07 |
| A7 | −6.8974126E−10 |
| A8 | 1.2266829E−08 |
| A9 | −2.1874992E−10 |
| A10 | −8.0518176E−11 |
| A11 | 1.5502178E−12 |
| A12 | 2.8919120E−13 |
| A13 | −4.6056801E−15 |
| A14 | −5.6744965E−16 |

TABLE 30-continued

EXAMPLE 10·ASPHERICAL SURFACE COEFFICIENT

| | |
|---|---|
| A15 | 5.1633933E−18 |
| A16 | 4.6857766E−19 |

| SURFACE NUMBER | 25 |
|---|---|
| KA | −9.6051245E−01 |
| A3 | −3.8027998E−04 |
| A4 | 1.1179819E−04 |
| A5 | −6.2142858E−06 |
| A6 | −1.1736404E−06 |
| A7 | 1.3257522E−07 |
| A8 | 6.1593066E−09 |
| A9 | −1.0000797E−09 |
| A10 | −4.9879936E−12 |
| A11 | 3.6933649E−12 |
| A12 | −6.4827940E−14 |
| A13 | −6.5924532E−15 |
| A14 | 2.0139651E−16 |
| A15 | 4.9295873E−18 |
| A16 | −1.9084085E−19 |

| SURFACE NUMBER | 28 |
|---|---|
| KA | 7.0965628E+00 |
| A3 | −4.6197923E−03 |
| A4 | 1.7413996E−04 |
| A5 | 3.5622953E−05 |
| A6 | −2.1533505E−06 |
| A7 | −1.4851853E−07 |
| A8 | 8.9928737E−09 |
| A9 | 3.5288730E−10 |
| A10 | −1.3487677E−11 |
| A11 | −1.0237058E−12 |
| A12 | 3.4187251E−14 |
| A13 | 8.4928668E−16 |
| A14 | −3.9240931E−17 |
| A15 | 1.7216154E−19 |
| A16 | 4.2658955E−21 |

| SURFACE NUMBER | 29 |
|---|---|
| KA | 2.8166231E+00 |
| A3 | −4.2844184E−03 |
| A4 | 1.3184318E−04 |
| A5 | 1.3746538E−05 |
| A6 | 1.9540189E−06 |
| A7 | −4.5661487E−07 |
| A8 | 2.7686005E−08 |
| A9 | −6.2578676E−10 |
| A10 | −8.7688938E−13 |
| A11 | 4.5769213E−13 |
| A12 | −1.9380766E−14 |
| A13 | 4.2420170E−17 |
| A14 | 2.9958262E−17 |
| A15 | −9.7725046E−19 |
| A16 | 9.5336091E−21 |

| SURFACE NUMBER | 30 |
|---|---|
| KA | 3.3497301E+02 |
| A3 | −4.8854643E−03 |
| A4 | −5.4760381E−05 |
| A5 | 1.4991593E−05 |
| A5 | 2.6026984E−07 |
| A7 | −4.2855670E−08 |
| A8 | 6.6724473E−10 |
| A9 | 1.6824790E−11 |
| A10 | −3.4565251E−13 |
| A11 | −4.1952599E−15 |
| A12 | 9.6643528E−17 |
| A13 | −3.8039529E−18 |
| A14 | 1.9401136E−19 |
| A15 | −3.4328223E−21 |
| A16 | 1.9764393E−23 |

TABLE 30-continued

EXAMPLE 10•ASPHERICAL SURFACE COEFFICIENT

| SURFACE NUMBER | 31 |
|---|---|
| KA | -9.8472941E-01 |
| A3 | -3.5819758E-03 |
| A4 | 3.7884687E-05 |
| A5 | 5.8341491E-06 |
| A6 | -2.6050838E-07 |
| A7 | 6.6284039E-09 |
| A8 | -1.7831210E-10 |
| A9 | 4.9407516E-12 |
| A10 | -1.2459978E-13 |
| A11 | 3.1126223E-15 |
| A12 | -6.0462218E-17 |
| A13 | -2.8060225E-19 |
| A14 | 5.3261544E-20 |
| A15 | -1.1446516E-21 |
| A16 | 7.9423996E-24 |

| SURFACE NUMBER | 32 |
|---|---|
| KA | -2.2510641E+00 |
| A3 | -2.4732774E-05 |
| A4 | 7.9262476E-07 |
| A5 | 1.6111326E-09 |
| A6 | -8.9009744E-10 |
| A7 | 1.8699936E-11 |
| A8 | -5.7013185E-14 |
| A9 | -2.2690220E-15 |
| A10 | 2.1896828E-17 |
| A11 | 1.0114568E-19 |
| A12 | -2.6031577E-21 |
| A13 | 1.3152983E-23 |
| A14 | 3.1117842E-27 |
| A15 | -2.1551088E-28 |
| A16 | 5.0042640E-31 |

Figure 11:
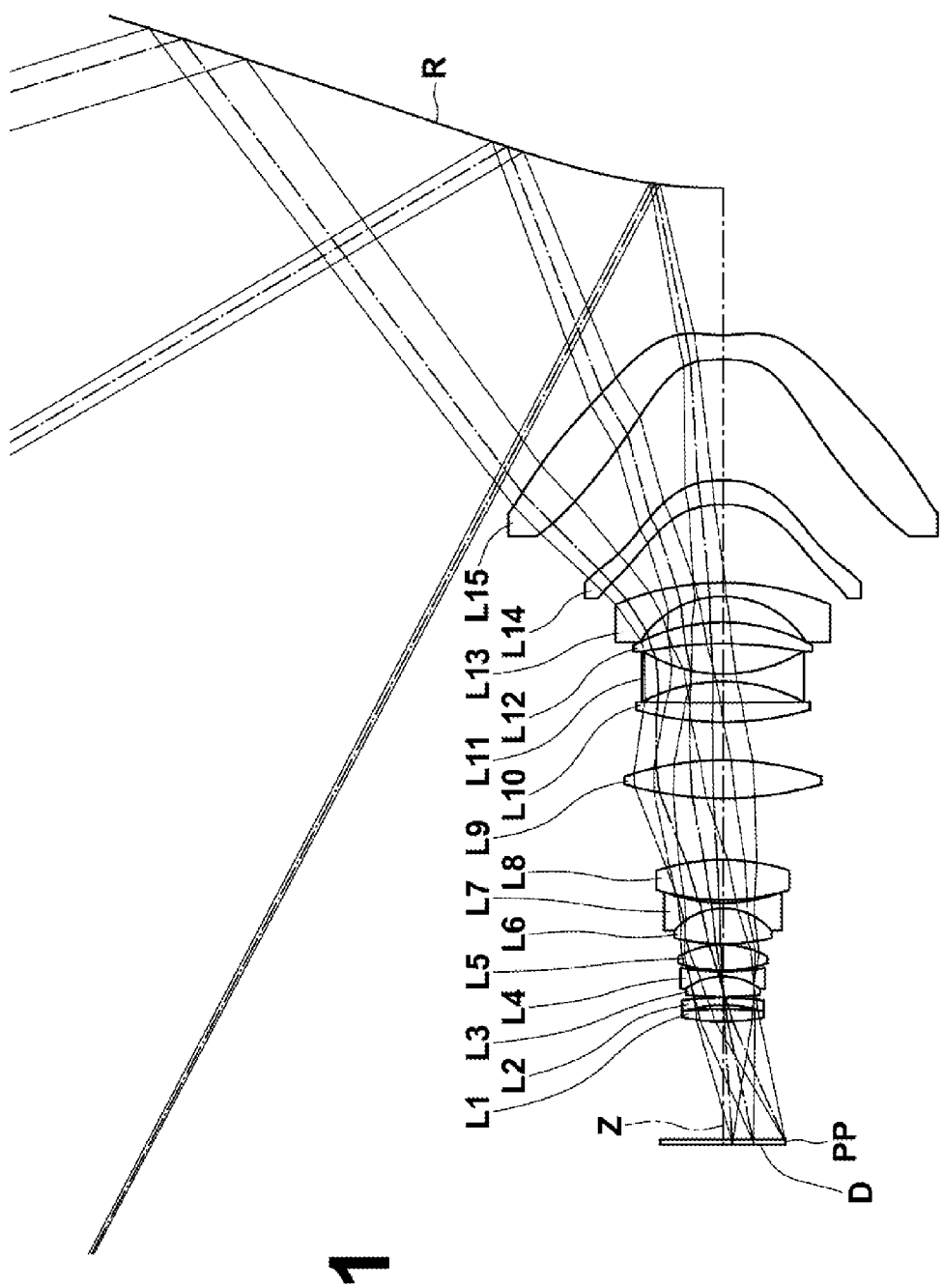
FIG. 11 is a cross section illustrating the structure of a projection optical system in Example 11 of the present invention.
Figure 45:
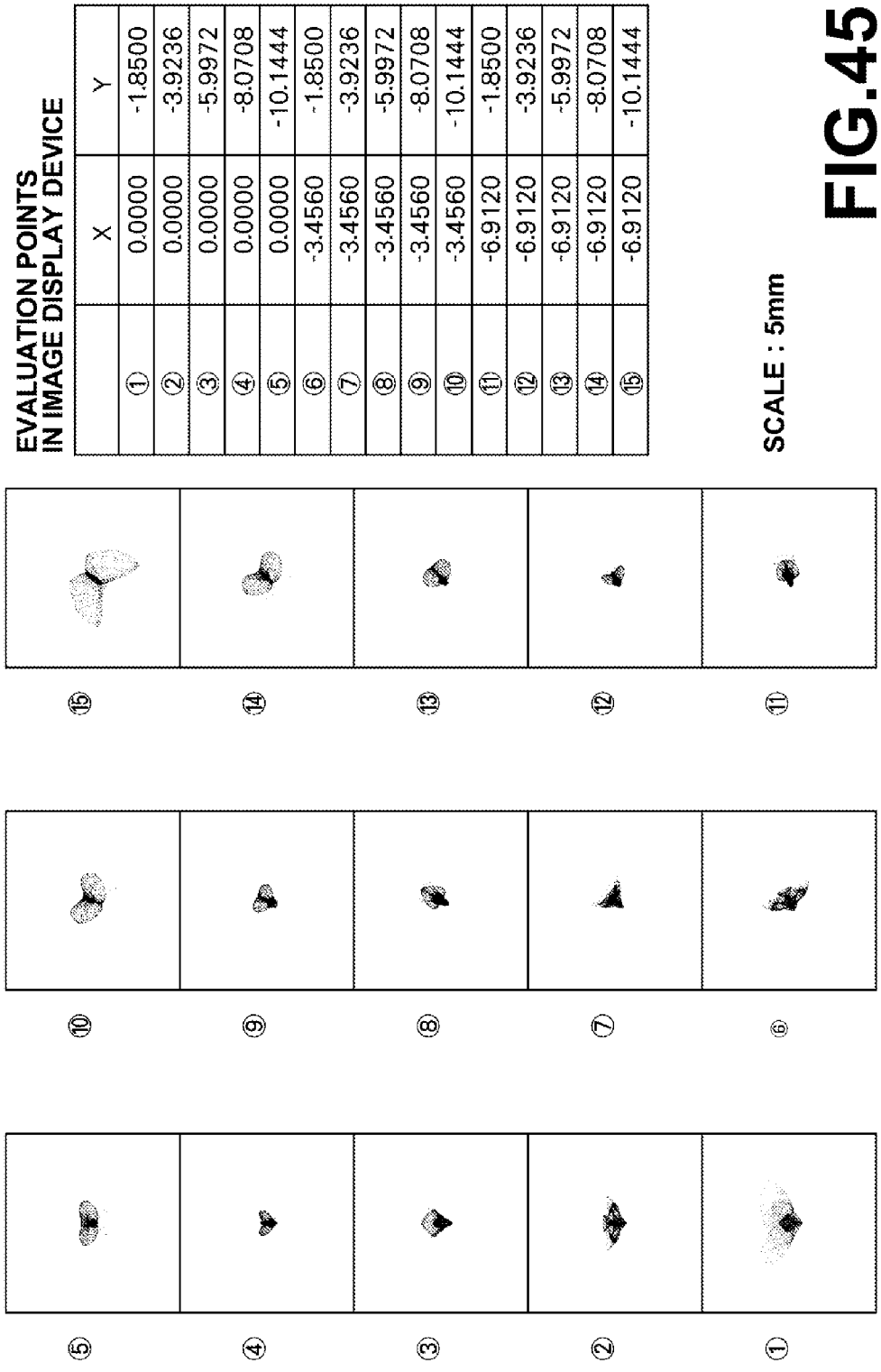
FIG. 45 is a diagram illustrating spot performance of the projection optical system in Example 11 of the present invention.

Next, a projection optical system in Example 11 will be described. FIG. 11 is a cross section illustrating the structure of the projection optical system in Example 11. Table 31 shows basic lens data on the projection optical system in Example 11, and Table 32 shows data about specification. Table 33 shows data about aspherical surface coefficients. FIG. 28 is a diagram illustrating distortion performance, and FIG. 45 is a diagram illustrating spot performance.

In Example 11, Surface 27 through Surface 26 are optical element Lp, Surface 31 through Surface 28 are a first lens group, Surface 27 through Surface 16 are a 2a-th lens group, and Surface 15 through Surface 4 are a 2b-th lens group.

TABLE 31

EXAMPLE 11•LENS DATA (n, ν FOR d-LINE)

| Si (SURFACE NUMBER) | Ri (CURVATURE RADIUS) | Di (SURFACE DISTANCE) | Ndj (REFRACTIVE INDEX) | νdj (ABBE NUMBER) |
|---|---|---|---|---|
| 1 | ∞ | 0.0102 | | |
| 2 | ∞ | 1.0500 | 1.51633 | 64.14 |
| 3 | ∞ | 24.0000 | | |
| 4 | 37.1892 | 2.5247 | 1.74400 | 44.78 |
| 5 | -104.1925 | 0.8964 | | |
| 6 | -23.2256 | 1.4769 | 1.69895 | 30.13 |
| 7 | -60.3560 | 0.2009 | | |
| 8 | 63.8991 | 4.1462 | 1.48749 | 70.23 |
| 9 | -11.7717 | 1.0003 | 1.77250 | 49.60 |
| 10 | 48.9655 | 0.2008 | | |
| 11 | 26.3175 | 5.2294 | 1.58267 | 46.42 |
| 12 | -17.1244 | 0.2007 | | |
| 13 | 39.3962 | 7.2641 | 1.48749 | 70.23 |
| 14 | -12.1652 | 1.1006 | 1.80100 | 34.97 |
| 15 | 31.2009 | 0.5937 | | |
| 16 | 42.1666 | 8.1904 | 1.62299 | 58.16 |

TABLE 31-continued

EXAMPLE 11•LENS DATA (n, ν FOR d-LINE)

| Si (SURFACE NUMBER) | Ri (CURVATURE RADIUS) | Di (SURFACE DISTANCE) | Ndj (REFRACTIVE INDEX) | νdj (ABBE NUMBER) |
|---|---|---|---|---|
| 17 | -39.7791 | 12.5227 | | |
| 18 | 65.8979 | 7.7887 | 1.80000 | 29.84 |
| 19 | -57.0081 | 7.7565 | | |
| 20 | 58.9087 | 3.9579 | 1.58913 | 61.14 |
| 21 | 825.6641 | 4.3518 | | |
| 22 | -31.8577 | 1.5001 | 1.51633 | 64.14 |
| 23 | 28.7855 | 6.1834 | | |
| 24 | -78.0750 | 4.3560 | 1.80518 | 25.42 |
| 25 | -34.8737 | 5.2877 | | |
| 26 | -18.9041 | 2.8155 | 1.84666 | 23.78 |
| 27 | -51.6913 | 15.8918 | | |
| *28 | -78.3452 | 4.9999 | 1.49100 | 57.58 |
| *29 | -39.7185 | 24.5711 | | |
| *30 | -64.3891 | 5.0000 | 1.49100 | 57.58 |
| *31 | 15.6633 | 30.0006 | | |
| *32 | 98.2779 | -425.0000 | REFLECTION SURFACE | |

ENTRANCE PUPIL POSITION: 29.3 FROM FIRST SURFACE

TABLE 32

EXAMPLE 11•SPECIFICATION (d-LINE)

| FNo. | 2.40 |
|---|---|
| 2ω[°] | 144.20 |

TABLE 33

EXAMPLE 11•ASPHERICAL SURFACE COEFFICIENT

| SURFACE NUMBER | 28 |
|---|---|
| KA | 8.3580004E+00 |
| A3 | -4.1116274E-03 |
| A4 | 1.7197848E-04 |
| A5 | 1.2682272E-05 |
| A6 | -1.8503067E-06 |
| A7 | 2.4365158E-08 |
| A8 | 4.8192812E-09 |
| A9 | -2.5340485E-10 |
| A10 | 1.3830305E-11 |
| A11 | -8.9023525E-13 |
| A12 | 1.8296073E-14 |
| A13 | 1.0057412E-15 |
| A14 | -6.6618797E-17 |
| A15 | 1.4071485E-18 |
| A16 | -9.4814544E-21 |

| SURFACE NUMBER | 29 |
|---|---|
| KA | 1.0860865E+00 |
| A3 | -2.3075972E-03 |
| A4 | -3.2577874E-05 |
| A5 | -2.7132324E-06 |
| A6 | 4.1036319E-06 |
| A7 | -5.8838142E-07 |
| A8 | 3.7463885E-08 |
| A9 | -1.1736101E-09 |
| A10 | 9.5961186E-12 |
| A11 | 9.9510211E-13 |
| A12 | -5.0513283E-14 |
| A13 | 2.3434680E-19 |
| A14 | 7.2298905E-17 |
| A15 | -2.1835172E-18 |
| A16 | 2.0536684E-20 |

TABLE 33-continued

EXAMPLE 11·ASPHERICAL SURFACE COEFFICIENT

| SURFACE NUMBER | 30 |
|---|---|
| KA | -8.0863559E+00 |
| A3 | 2.7965765E-04 |
| A4 | -3.6088477E-04 |
| A5 | -6.1940485E-06 |
| A6 | 2.1517621E-06 |
| A7 | -5.9063317E-08 |
| A8 | 2.9531977E-10 |
| A9 | -6.9033466E-11 |
| A10 | 1.8660754E-12 |
| A11 | 1.0275935E-13 |
| A12 | -2.5419951E-15 |
| A13 | -1.1878350E-16 |
| A14 | 5.1585030E-18 |
| A15 | -6.7583859E-20 |
| A16 | 2.8693193E-22 |

| SURFACE NUMBER | 31 |
|---|---|
| KA | -6.1758240E-01 |
| A3 | -4.2929557E-03 |
| A4 | 8.4814161E-05 |
| A5 | 4.6605533E-06 |
| A6 | -4.7564118E-07 |
| A7 | 2.1336645E-08 |
| A8 | -3.3357299E-10 |
| A9 | -1.2230526E-12 |
| A10 | -2.0079317E-13 |
| A11 | 1.4327562E-14 |
| A12 | -2.3111377E-16 |
| A13 | -2.8978980E-18 |
| A14 | 1.9068446E-19 |
| A15 | -3.5055118E-21 |
| A16 | 2.4174564E-23 |

| SURFACE NUMBER | 32 |
|---|---|
| KA | -1.8886101E+00 |
| A3 | -8.1732739E-06 |
| A4 | 1.3580137E-06 |
| A5 | -8.7838123E-09 |
| A6 | -1.6535504E-09 |
| A7 | 4.0342143E-11 |
| A8 | -1.2841316E-13 |
| A9 | -5.9391024E-15 |
| A10 | 6.0544119E-17 |
| A11 | 3.3056836E-19 |
| A12 | -8.7549642E-21 |
| A13 | 4.7148570E-23 |
| A14 | 1.8514268E-26 |
| A15 | -9.4818523E-28 |
| A16 | 2.3700793E-30 |

Figure 12:
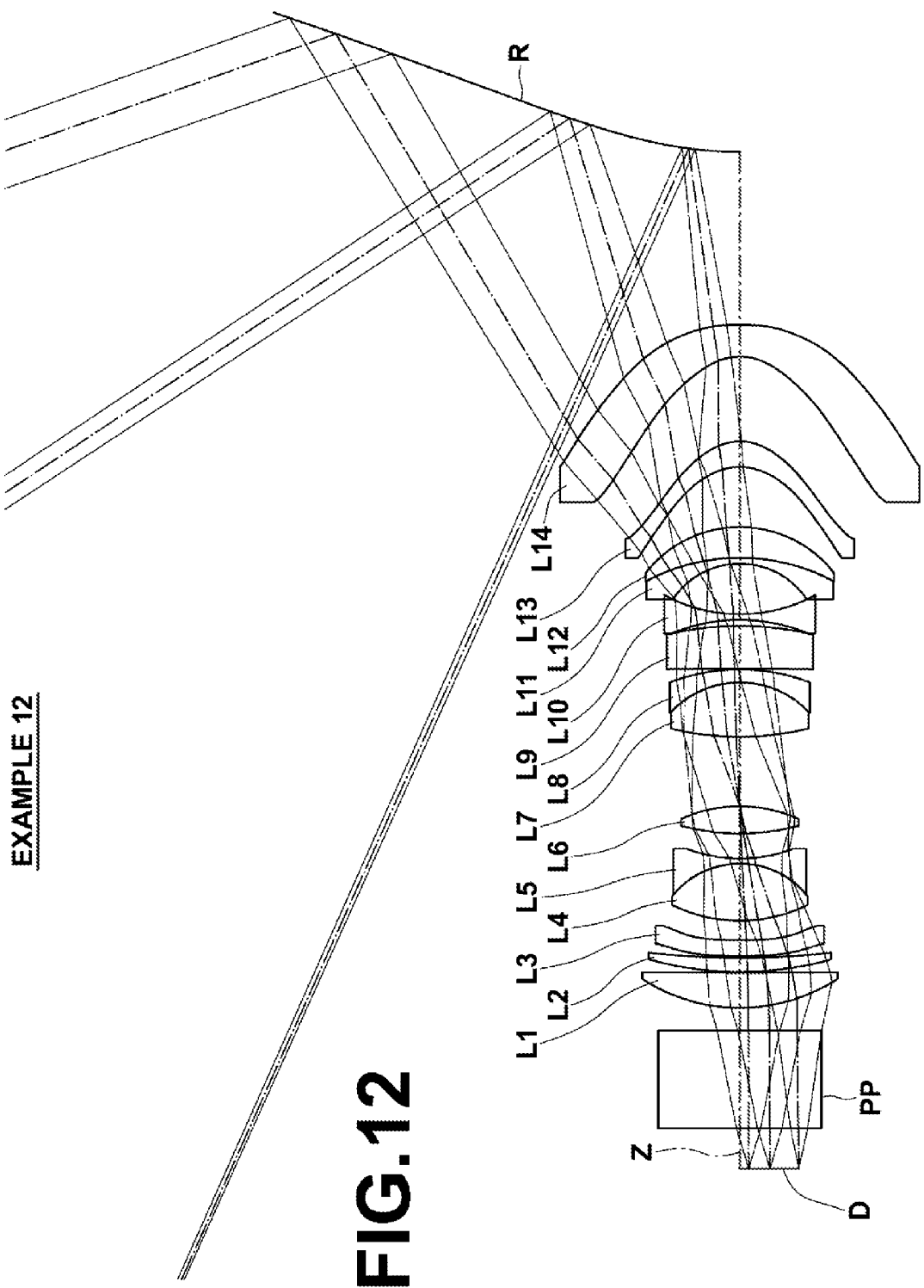
FIG. 12 is a cross section illustrating the structure of a projection optical system in Example 12 of the present invention.
Figure 46:
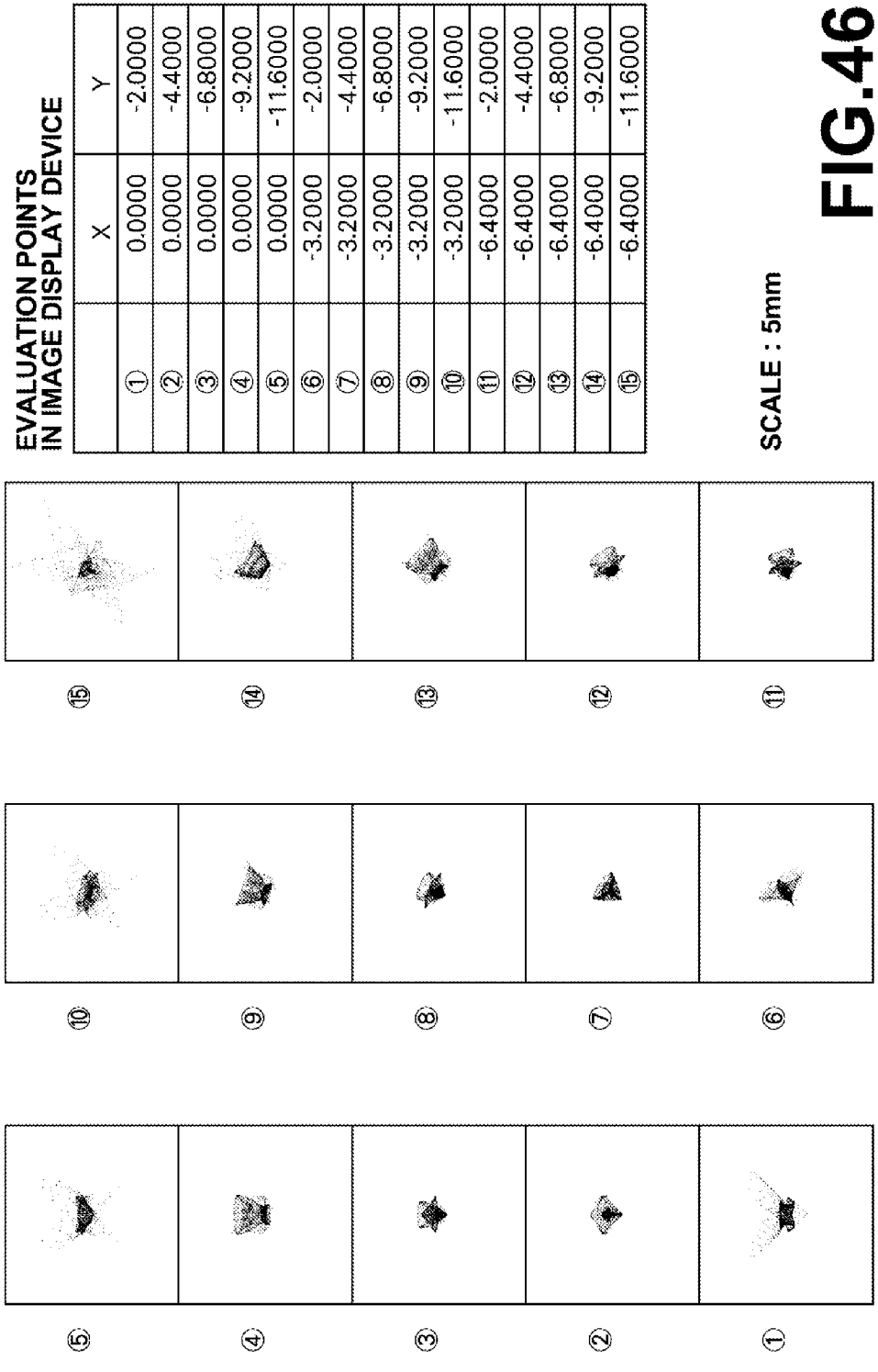
FIG. 46 is a diagram illustrating spot performance of the projection optical system in Example 12 of the present invention.

Next, a projection optical system in Example 12 will be described. FIG. 12 is a cross section illustrating the structure of the projection optical system in Example 12. Table 34 shows basic lens data on the projection optical system in Example 12, and Table 35 shows data about specification. Table 36 shows data about aspherical surface coefficients. FIG. 29 is a diagram illustrating distortion performance, and FIG. 46 is a diagram illustrating spot performance.

In Example 12, Surface 24 through Surface 22 are optical element Lp, Surface 28 through Surface 25 are a first lens group, and Surface 24 through Surface 4 are a second lens group.

TABLE 34

EXAMPLE 12·LENS DATA (n, ν FOR d-LINE)

| Si (SURFACE NUMBER) | Ri (CURVATURE RADIUS) | Di (SURFACE DISTANCE) | Ndj (REFRACTIVE INDEX) | νdj (ABBE NUMBER) |
|---|---|---|---|---|
| 1 | ∞ | 9.5189 | | |
| 2 | ∞ | 22.8800 | 1.51633 | 64.14 |
| 3 | ∞ | 5.3800 | | |
| 4 | 39.1045 | 8.2325 | 1.80518 | 25.42 |
| 5 | 2683.6464 | 0.2000 | | |
| 6 | 73.2268 | 3.3349 | 1.80518 | 25.42 |
| 7 | 182.5779 | 0.4000 | | |
| *8 | 167.2211 | 3.7366 | 1.49100 | 57.58 |
| *9 | 164.0477 | 4.5646 | | |
| 10 | 33.8582 | 13.3905 | 1.49700 | 81.54 |
| 11 | -19.0114 | 1.2001 | 1.80518 | 25.42 |
| 12 | 32.5474 | 5.8328 | | |
| 13 | 47.9288 | 6.4582 | 1.58913 | 61.14 |
| 14 | -30.4974 | 16.2777 | | |
| 15 | 62.8723 | 12.7589 | 1.64769 | 33.79 |
| 16 | -20.7981 | 3.0778 | 1.80000 | 29.84 |
| 17 | -42.4107 | 0.2007 | | |
| 18 | -704.3081 | 9.9817 | 1.75520 | 27.51 |
| 19 | -68.1613 | 1.4396 | | |
| 20 | -38.6682 | 1.3000 | 1.67003 | 47.23 |
| 21 | 34.2547 | 11.8778 | | |
| 22 | -17.7538 | 1.4100 | 1.60311 | 60.64 |
| 23 | -43.2599 | 7.1941 | 1.80518 | 25.42 |
| 24 | -26.2228 | 14.1293 | | |
| *25 | -11.9944 | 6.0004 | 1.49100 | 57.58 |
| *26 | -10.4452 | 19.8865 | | |
| *27 | -14.1202 | 7.4467 | 1.49100 | 57.58 |
| *28 | 253.6856 | 40.6700 | | |
| *29 | 115.5274 | -603.2000 | REFLECTION SURFACE | |

ENTRANCE PUPIL POSITION: 929.8 FROM FIRST SURFACE

TABLE 35

EXAMPLE 12·SPECIFICATION (d-LINE)

| FNo. | 1.80 |
|---|---|
| 2ω[°] | 139.50 |

TABLE 36

EXAMPLE 12·ASPHERICAL SURFACE COEFFICIENT

| SURFACE NUMBER | 8 |
|---|---|
| KA | -1.8729670E+01 |
| A3 | -3.9026395E-05 |
| A4 | 2.5081689E-05 |
| A5 | 3.7858816E-06 |
| A6 | -9.9024780E-07 |
| A7 | 1.1938756E-07 |
| A8 | -8.2770926E-09 |
| A9 | 3.9347907E-10 |
| A10 | -1.1809931E-11 |
| A11 | -1.0337533E-12 |
| A12 | 1.7126594E-13 |
| A13 | -8.0739882E-15 |
| A14 | 3.2305324E-17 |
| A15 | 7.8259687E-18 |
| A16 | -1.6769954E-19 |

| SURFACE NUMBER | 9 |
|---|---|
| KA | 3.7819359E+01 |
| A3 | 1.0854092E-04 |
| A4 | -9.4324243E-06 |
| A5 | 9.7864768E-06 |
| A6 | -4.8009532E-07 |

TABLE 36-continued

EXAMPLE 12·ASPHERICAL SURFACE COEFFICIENT

| | |
|---|---|
| A7 | −1.5109582E−07 |
| A8 | 2.5554611E−08 |
| A9 | −5.7919116E−10 |
| A10 | −1.8176223E−10 |
| A11 | 1.5404820E−11 |
| A12 | 7.2416280E−14 |
| A13 | −6.7967026E−14 |
| A14 | 3.7860548E−15 |
| A15 | −8.8607650E−17 |
| A16 | 7.8537900E−19 |

| SURFACE NUMBER | 25 |
|---|---|
| KA | 2.4533335E−01 |
| A3 | 5.0186041E−04 |
| A4 | −1.2440749E−04 |
| A5 | 6.9122074E−05 |
| A6 | −1.8472019E−05 |
| A7 | 2.3895483E−06 |
| A8 | −1.5110369E−07 |
| A9 | 3.3737010E−09 |
| A10 | 7.4211020E−11 |
| A11 | −1.7439111E−12 |
| A12 | −2.6300717E−13 |
| A13 | 1.0279311E−14 |
| A14 | 4.7792073E−16 |
| A15 | −6.1522373E−17 |
| A16 | 1.0512432E−18 |
| A17 | 1.8460378E−19 |
| A18 | −1.3318964E−20 |
| A19 | 3.6090060E−22 |
| A20 | −3.6248217E−24 |

| SURFACE NUMBER | 26 |
|---|---|
| KA | 1.5214495E−01 |
| A3 | 7.7045392E−04 |
| A4 | −3.8594787E−04 |
| A5 | 1.4711447E−04 |
| A6 | −2.9170246E−05 |
| A7 | 3.2542107E−06 |
| A8 | −1.9169657E−07 |
| A9 | 2.4325950E−09 |
| A10 | 4.7727624E−10 |
| A11 | −3.5790688E−11 |
| A12 | 1.0854735E−12 |
| A13 | −2.5918249E−14 |
| A14 | 1.9141082E−15 |
| A15 | −8.4480869E−17 |
| A16 | −2.1057922E−19 |
| A17 | 1.0455659E−19 |
| A18 | −1.8044943E−21 |
| A19 | −2.1874301E−23 |
| A20 | 5.8532230E−25 |

| SURFACE NUMBER | 27 |
|---|---|
| KA | −2.3279202E+00 |
| A3 | −1.3112333E−03 |
| A4 | −1.5483678E−04 |
| A5 | 1.1425286E−05 |
| A6 | 2.2637925E−06 |
| A7 | −2.6489603E−07 |
| A8 | 6.4495222E−09 |
| A9 | 1.9350310E−10 |
| A10 | −1.9088067E−12 |
| A11 | −6.5926166E−13 |
| A12 | 1.5949064E−14 |
| A13 | 4.5438171E−16 |
| A14 | −1.3263628E−17 |
| A15 | −4.1734714E−19 |
| A16 | 1.4143953E−20 |
| A17 | 9.5491702E−23 |
| A18 | −6.4078165E−24 |
| A19 | 3.8554102E−26 |
| A20 | 2.8671058E−28 |

TABLE 36-continued

EXAMPLE 12·ASPHERICAL SURFACE COEFFICIENT

| SURFACE NUMBER | 28 |
|---|---|
| KA | −2.1156382E+19 |
| A3 | −1.7190824E−03 |
| A4 | −4.3709076E−05 |
| A5 | 1.3310457E−05 |
| A6 | −4.6023666E−07 |
| A7 | −5.6047951E−09 |
| A8 | −4.0074839E−10 |
| A9 | 7.1376825E−11 |
| A10 | −1.0165856E−12 |
| A11 | −9.4856881E−14 |
| A12 | 2.7822966E−15 |
| A13 | 5.0996261E−17 |
| A14 | −2.7412501E−18 |
| A15 | 6.1018870E−21 |
| A16 | 8.9138916E−22 |
| A17 | −4.0484579E−24 |
| A18 | −2.3934231E−25 |
| A19 | 2.7988883E−27 |
| A20 | −4.1314057E−30 |

| SURFACE NUMBER | 29 |
|---|---|
| KA | 1.0930970E+00 |
| A3 | 2.0500921E−04 |
| A4 | −7.5522598E−06 |
| A5 | −5.5985360E−08 |
| A6 | 8.9414144E−09 |
| A7 | −1.5663911E−10 |
| A8 | −2.7661297E−12 |
| A9 | 1.4653416E−13 |
| A10 | −2.2231012E−15 |
| A11 | 1.3346813E−17 |
| A12 | −3.6886813E−20 |
| A13 | 9.1565994E−22 |
| A14 | −6.7799680E−24 |
| A15 | −1.4084431E−25 |
| A16 | 1.6277053E−27 |
| A17 | 9.7981637E−30 |
| A18 | −2.4320887E−31 |
| A19 | 1.4350978E−33 |
| A20 | −2.9316381E−36 |

Figure 13:
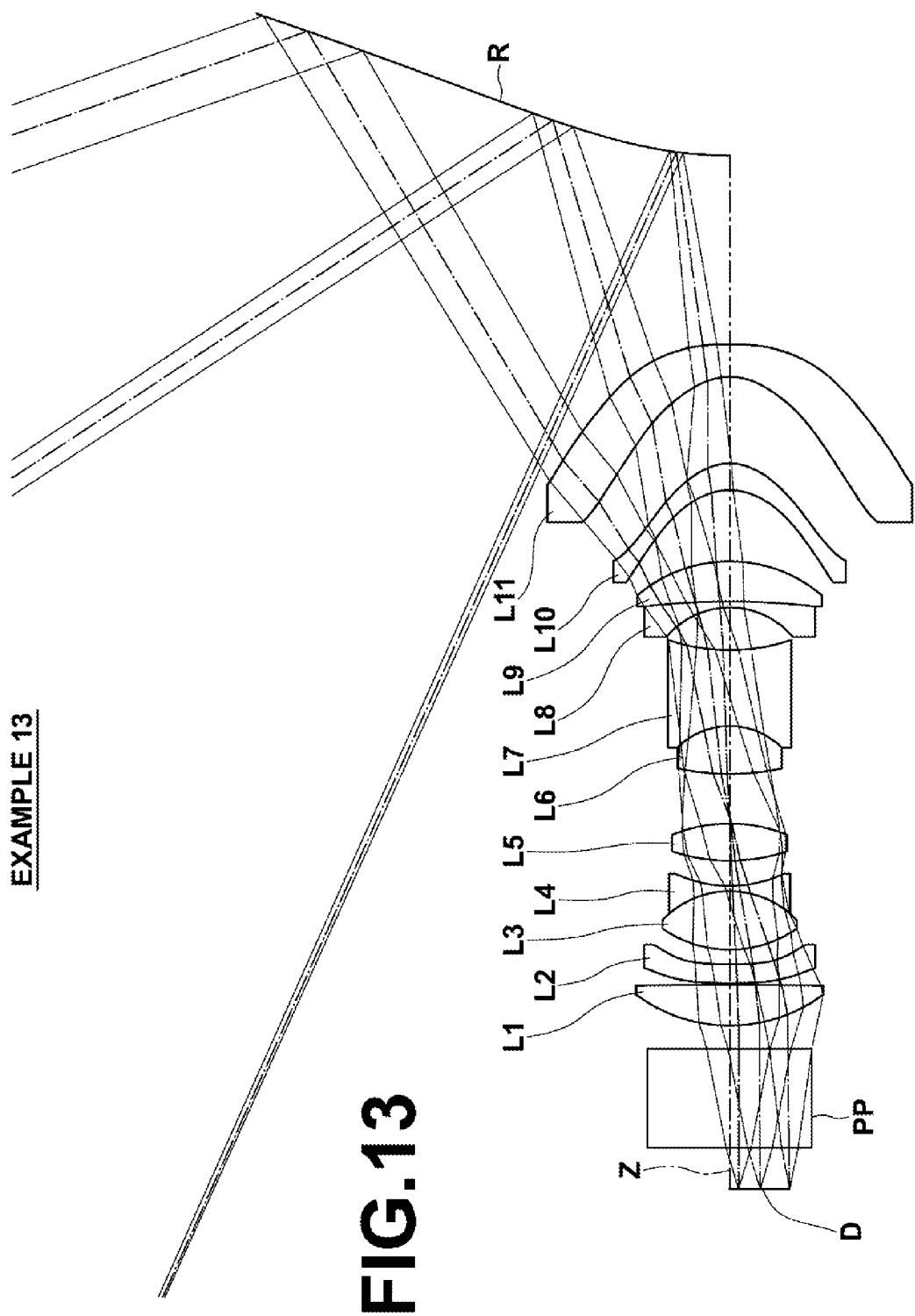
FIG. 13 is a cross section illustrating the structure of a projection optical system in Example 13 of the present invention.
Figure 30:
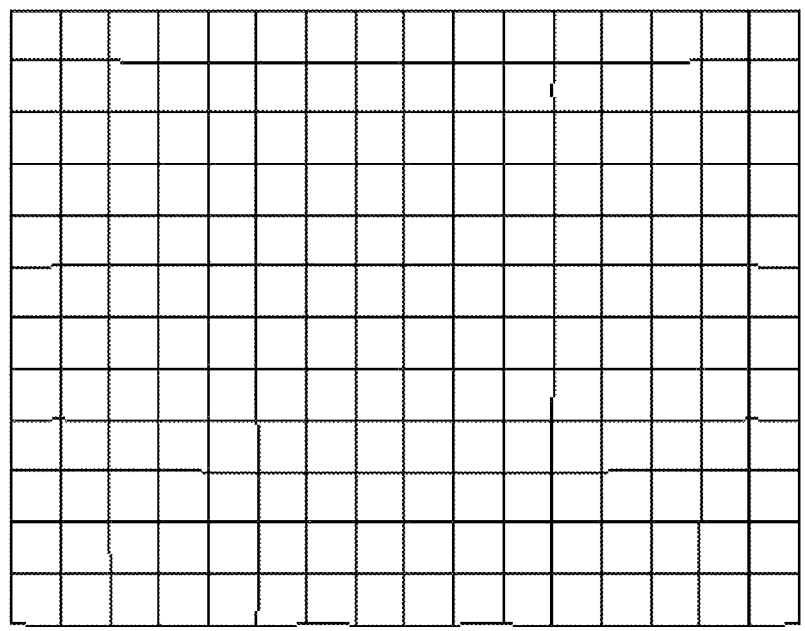
FIG. 30 is a diagram illustrating distortion performance of the projection optical system in Example 13 of the present invention.
Figure 47:
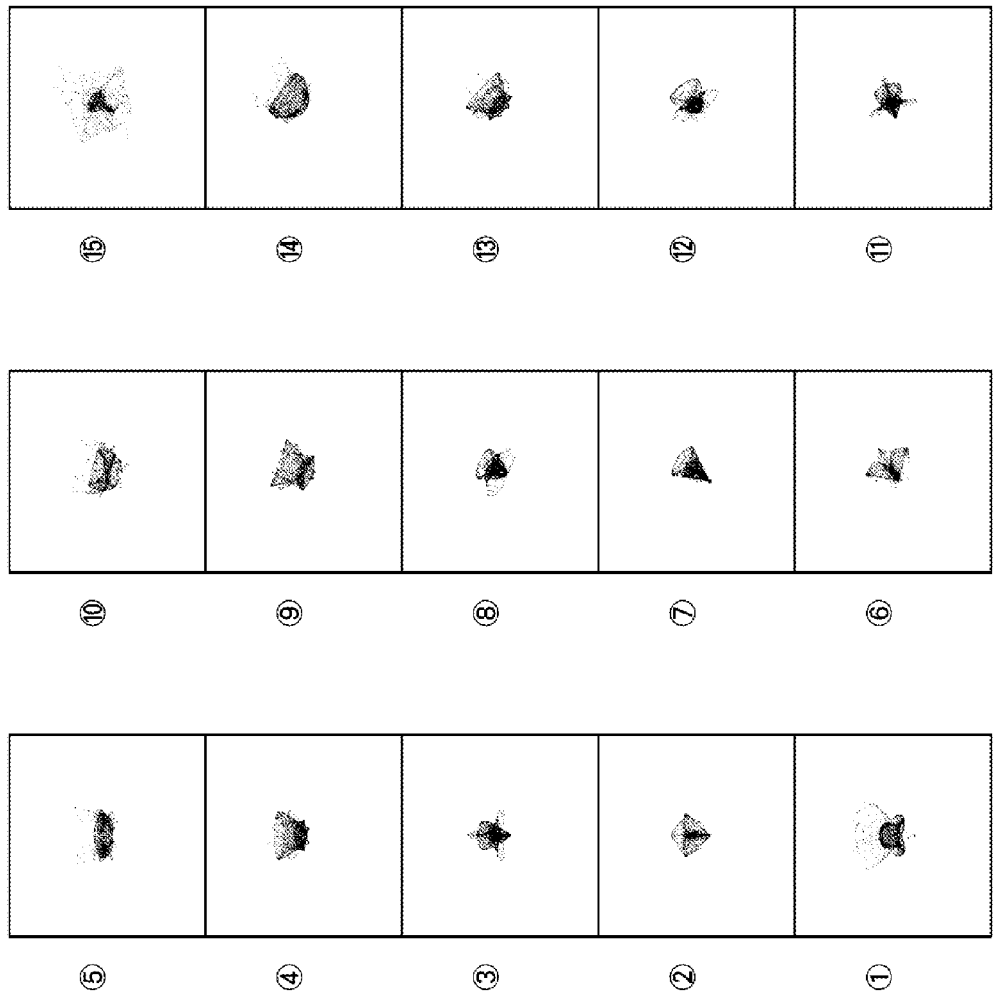
FIG. 47 is a diagram illustrating spot performance of the projection optical system in Example 13 of the present invention.

Next, a projection optical system in Example 13 will be described. FIG. 13 is a cross section illustrating the structure of the projection optical system in Example 13. Table 37 shows basic lens data on the projection optical system in Example 13, and Table 38 shows data about specification. Table 39 shows data about aspherical surface coefficients. FIG. 30 is a diagram illustrating distortion performance, and FIG. 47 is a diagram illustrating spot performance.

In Example 13, Surface 18 through Surface 16 are optical element Lp, Surface 23 through Surface 19 are a first lens group, Surface 18 through Surface 11 are a 2a-th lens group, and Surface 10 through Surface 4 are a 2b-th lens group.

TABLE 37

EXAMPLE 13·LENS DATA (n, ν FOR d-LINE)

| Si (SURFACE NUMBER) | Ri (CURVATURE RADIUS) | Di (SURFACE DISTANCE) | Ndj (REFRACTIVE INDEX) | νdj (ABBE NUMBER) |
|---|---|---|---|---|
| 1 | ∞ | 9.5103 | | |
| 2 | ∞ | 22.8800 | 1.51633 | 64.14 |
| 3 | ∞ | 5.3800 | | |
| 4 | 33.7812 | 9.3936 | 1.79544 | 25.64 |
| 5 | −1401.6603 | 0.4007 | | |
| *6 | 159.8129 | 4.3632 | 1.49100 | 57.58 |
| *7 | 116.8669 | 3.3723 | | |
| 8 | 25.2038 | 13.5077 | 1.49700 | 81.54 |

TABLE 37-continued

EXAMPLE 13·LENS DATA (n, ν FOR d-LINE)

| Si (SURFACE NUMBER) | Ri (CURVATURE RADIUS) | Di (SURFACE DISTANCE) | Ndj (REFRACTIVE INDEX) | νdj (ABBE NUMBER) |
|---|---|---|---|---|
| 9 | −20.0000 | 1.1991 | 1.74929 | 27.62 |
| 10 | 27.0040 | 5.8682 | | |
| 11 | 39.0282 | 8.5701 | 1.58812 | 61.61 |
| 12 | −32.4013 | 11.4317 | | |
| 13 | 51.3833 | 11.0982 | 1.57758 | 42.19 |
| 14 | −15.8531 | 17.5326 | 1.61001 | 41.32 |
| 15 | 40.6474 | 9.8325 | | |
| 16 | −17.8029 | 1.4091 | 1.57662 | 62.05 |
| 17 | −157.5661 | 9.2554 | 1.80518 | 25.42 |
| 18 | −30.5930 | 16.4458 | | |
| *19 | −12.2634 | 6.1991 | 1.49100 | 57.58 |
| *20 | −10.3989 | 19.9757 | | |
| *21 | −14.1305 | 7.4901 | 1.49100 | 57.58 |
| *22 | 164.3597 | 43.6714 | | |
| *23 | 116.1369 | −657.5000 | REFLECTION SURFACE | |

ENTRANCE PUPIL POSITION: 929.8 FROM FIRST SURFACE

TABLE 38

EXAMPLE 13·SPECIFICATION (d-LINE)

| FNo. | 1.80 |
|---|---|
| 2ω [°] | 139.80 |

TABLE 39

EXAMPLE 13·ASPHERICAL SURFACE COEFFICIENT

| SURFACE NUMBER | 6 |
|---|---|
| KA | 5.6079681E+01 |
| A3 | −3.0172586E−05 |
| A4 | 6.6648587E−05 |
| A5 | −2.2925425E−05 |
| A6 | 7.6878177E−06 |
| A7 | −1.5411327E−06 |
| A8 | 1.8549282E−07 |
| A9 | −1.1869984E−08 |
| A10 | 5.3265780E−11 |
| A11 | 5.8417915E−11 |
| A12 | −5.1895274E−12 |
| A13 | 2.2664450E−13 |
| A14 | −5.4161016E−15 |
| A15 | 6.3570357E−17 |
| A16 | −2.3637700E−19 |

| SURFACE NUMBER | 7 |
|---|---|
| KA | 4.4919516E+01 |
| A3 | 2.0232701E−04 |
| A4 | −4.8331328E−05 |
| A5 | 2.6387613E−05 |
| A6 | −4.9693371E−06 |
| A7 | 7.2148746E−07 |
| A8 | −8.8623500E−08 |
| A9 | 8.7751911E−09 |
| A10 | −5.6805488E−10 |
| A11 | 1.1903760E−11 |
| A12 | 1.2078073E−12 |
| A13 | −9.6738296E−14 |
| A14 | 1.8727038E−15 |
| A15 | 4.3099568E−17 |
| A16 | −1.5914424E−18 |

TABLE 39-continued

EXAMPLE 13·ASPHERICAL SURFACE COEFFICIENT

| SURFACE NUMBER | 19 |
|---|---|
| KA | 2.5868376E−01 |
| A3 | 5.5917339E−04 |
| A4 | −1.5519518E−04 |
| A5 | 7.2651815E−05 |
| A6 | −1.7936303E−05 |
| A7 | 2.3037907E−06 |
| A8 | −1.5381578E−07 |
| A9 | 4.1841481E−09 |
| A10 | 6.7336594E−11 |
| A11 | −5.4628815E−12 |
| A12 | −1.6420420E−13 |
| A13 | 1.8814336E−14 |
| A14 | 1.1318652E−16 |
| A15 | −7.5233481E−17 |
| A16 | 1.7097428E−18 |
| A17 | 1.9508630E−19 |
| A18 | −1.3949266E−20 |
| A19 | 3.5930473E−22 |
| A20 | −3.4276559E−24 |

| SURFACE NUMBER | 20 |
|---|---|
| KA | 1.5181721E−01 |
| A3 | 1.0354464E−03 |
| A4 | −4.4828184E−04 |
| A5 | 1.5317401E−04 |
| A6 | −2.9132927E−05 |
| A7 | 3.2585184E−06 |
| A8 | −1.9896975E−07 |
| A9 | 2.9771466E−09 |
| A10 | 4.9299833E−10 |
| A11 | −3.8787858E−11 |
| A12 | 1.1537217E−12 |
| A13 | −2.3490232E−14 |
| A14 | 1.9178965E−15 |
| A15 | −9.2927560E−17 |
| A16 | −9.2616324E−20 |
| A17 | 1.1316315E−19 |
| A18 | −2.0099967E−21 |
| A19 | −2.3960966E−23 |
| A20 | 6.5388306E−25 |

| SURFACE NUMBER | 21 |
|---|---|
| KA | −2.1025943E+00 |
| A3 | −5.4358481E−04 |
| A4 | −1.5011214E−04 |
| A5 | 6.1317649E−06 |
| A6 | 2.3532540E−06 |
| A7 | −2.6034715E−07 |
| A8 | 7.1740969E−09 |
| A9 | 1.5208492E−10 |
| A10 | −2.7272479E−12 |
| A11 | −6.4003421E−13 |
| A12 | 1.9351623E−14 |
| A13 | 4.1796412E−16 |
| A14 | −1.7012515E−17 |
| A15 | −4.2159324E−19 |
| A16 | 1.7887527E−20 |
| A17 | 9.0675967E−23 |
| A18 | −8.1712742E−24 |
| A19 | 5.0082923E−26 |
| A20 | 4.2841319E−28 |

| SURFACE NUMBER | 22 |
|---|---|
| KA | −2.1156382E+19 |
| A3 | −1.2390375E−03 |
| A4 | −5.2229702E−05 |
| A5 | 1.1548327E−05 |
| A6 | −4.1120450E−07 |
| A7 | −3.3911485E−09 |
| A8 | −4.8077604E−10 |
| A9 | 7.0992677E−11 |
| A10 | −9.5083699E−13 |
| A11 | −9.9091098E−14 |

TABLE 39-continued

EXAMPLE 13•ASPHERICAL SURFACE COEFFICIENT

| | |
|---|---|
| A12 | 2.8085486E−15 |
| A13 | 5.7737784E−17 |
| A14 | −2.8338197E−18 |
| A15 | 9.6802790E−22 |
| A16 | 9.7931205E−22 |
| A17 | −2.4185449E−24 |
| A18 | −2.6776143E−25 |
| A19 | 2.5057504E−27 |
| A20 | 7.3999405E−31 |

| SURFACE NUMBER | 23 |
|---|---|
| KA | 1.0887191E+00 |
| A3 | 1.9805169E−04 |
| A4 | −7.5305630E−05 |
| A5 | −4.8578661E−08 |
| A6 | 8.9996496E−09 |
| A7 | −1.6355746E−10 |
| A8 | −2.7815281E−12 |
| A9 | 1.5104119E−13 |
| A10 | −2.2866996E−15 |
| A11 | 1.3362744E−17 |
| A12 | −3.4956150E−20 |
| A13 | 9.8640041E−22 |
| A14 | −7.4229990E−24 |
| A15 | −1.4930115E−25 |
| A16 | 1.7247088E−27 |
| A17 | 1.0347675E−29 |
| A18 | −2.5508970E−31 |
| A19 | 1.4948502E−33 |
| A20 | −3.0311027E−36 |

Figure 14:
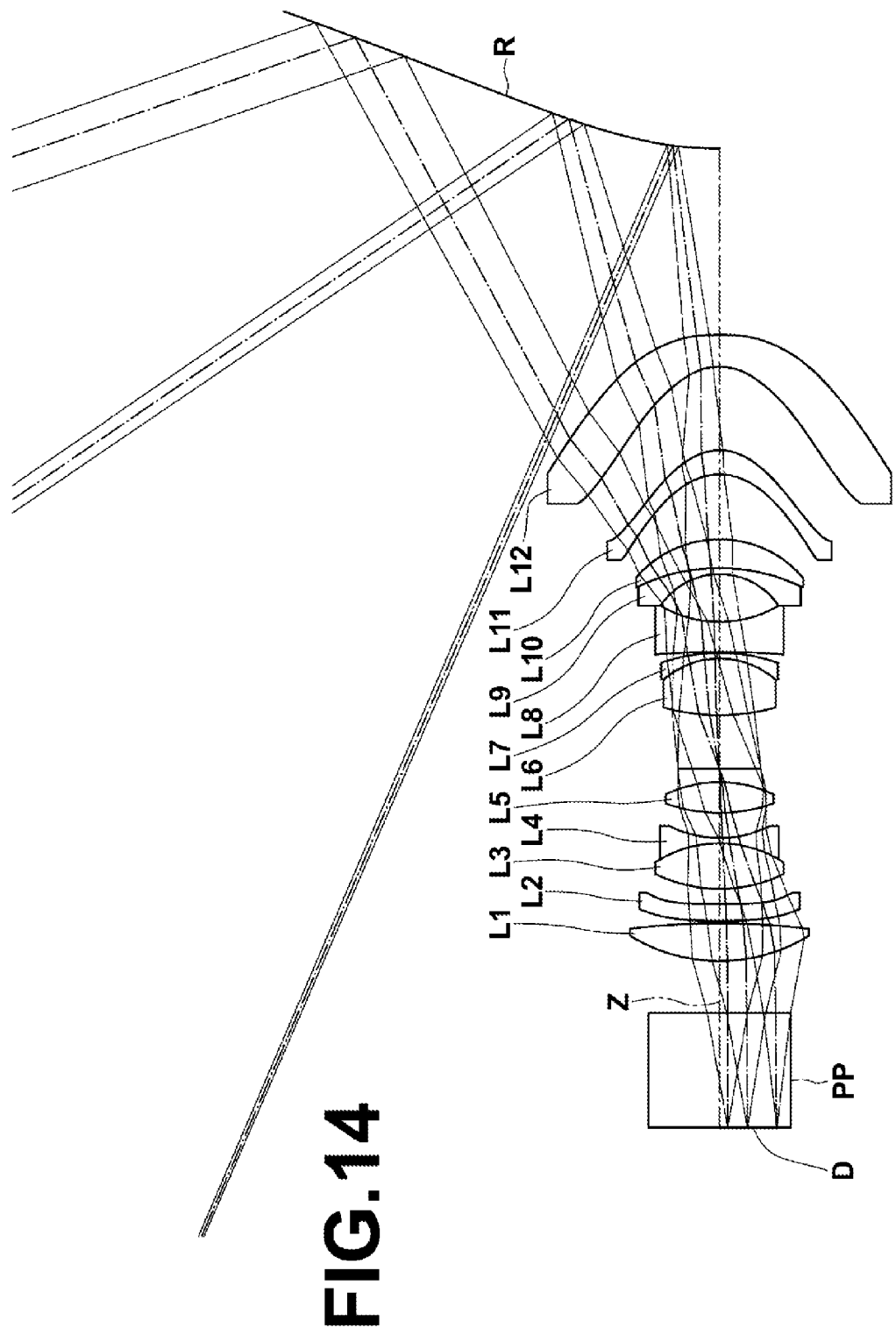
FIG. 14 is a cross section illustrating the structure of a projection optical system in Example 14 of the present invention.
Figure 31:
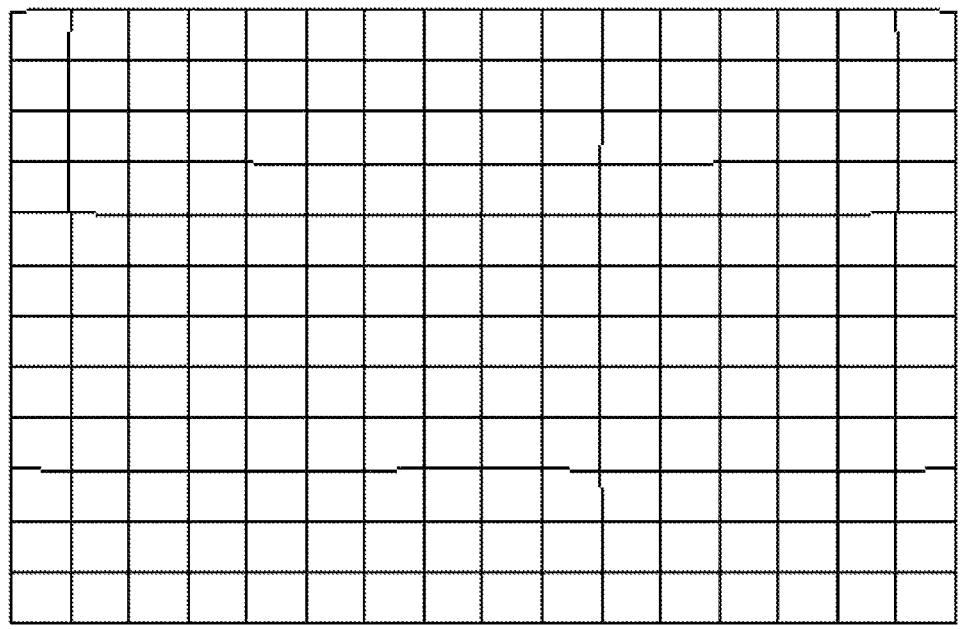
FIG. 31 is a diagram illustrating distortion performance of the projection optical system in Example 14 of the present invention.
Figure 48:
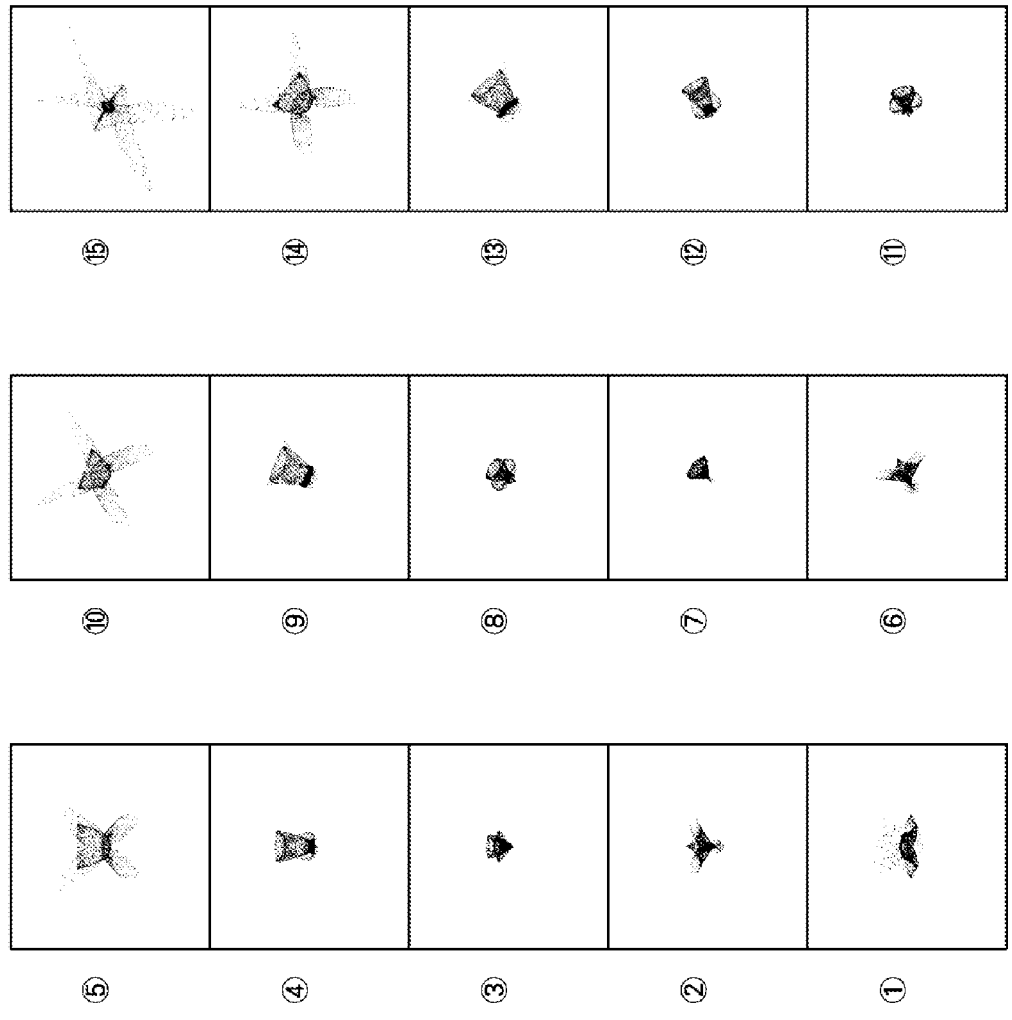
FIG. 48 is a diagram illustrating spot performance of the projection optical system in Example 14 of the present invention.

Next, a projection optical system in Example 14 will be described. FIG. 14 is a cross section illustrating the structure of the projection optical system in Example 14. Table 40 shows basic lens data on the projection optical system in Example 14, and Table 41 shows data about specification. Table 42 shows data about aspherical surface coefficients. FIG. 31 is a diagram illustrating distortion performance, and FIG. 48 is a diagram illustrating spot performance.

In Example 14, Surface 19 through Surface 17 are optical element Lp, Surface 23 through Surface 20 are a first lens group, and Surface 19 through Surface 3 are a second lens group.

TABLE 40

EXAMPLE 14•LENS DATA (n, ν FOR d-LINE)

| Si (SURFACE NUMBER) | Ri (CURVATURE RADIUS) | Di (SURFACE DISTANCE) | Ndj (REFRACTIVE INDEX) | ν dj (ABBE NUMBER) |
|---|---|---|---|---|
| 1 | ∞ | 26.0500 | 1.51633 | 64.14 |
| 2 | ∞ | 11.9604 | | |
| 3 | 35.9778 | 8.6085 | 1.80518 | 25.42 |
| 4 | −154.8133 | 0.5985 | | |
| *5 | 148.3512 | 3.8119 | 1.51007 | 56.24 |
| *6 | 1465.2411 | 3.4192 | | |
| 7 | 30.8141 | 10.3963 | 1.48749 | 70.23 |
| 8 | −24.6662 | 1.1990 | 1.80518 | 25.42 |
| 9 | 23.6026 | 5.7251 | | |
| 10 | 33.7511 | 6.9859 | 1.49700 | 81.54 |
| 11 | −26.2388 | 15.2407 | | |
| 12 | 43.8218 | 12.8945 | 1.60342 | 38.03 |
| 13 | −17.9859 | 1.3192 | 1.80610 | 33.27 |
| 14 | −36.5003 | 0.2009 | | |
| 15 | −167.7121 | 6.8460 | 1.56883 | 56.36 |
| 16 | 24.5133 | 10.8405 | | |
| 17 | −15.1471 | 1.4107 | 1.56384 | 60.67 |
| 18 | −39.7712 | 6.5466 | 1.80518 | 25.42 |
| 19 | −23.3517 | 14.7892 | | |
| *20 | −11.2050 | 5.5005 | 1.49100 | 57.58 |
| *21 | −9.8885 | 19.0075 | | |
| *22 | −13.4510 | 7.2437 | 1.49100 | 57.58 |
| *23 | −0.1067 | 42.4438 | | |
| *24 | 105.5388 | −562.0000 | REFLECTION SURFACE | |

ENTRANCE PUPIL POSITION: 709.0 FROM FIRST SURFACE

TABLE 41

EXAMPLE 14•SPECIFICATION (d-LINE)

| FNo. | 2.00 |
|---|---|
| 2ω [°] | 140.00 |

TABLE 42

EXAMPLE 14•ASPHERICAL SURFACE COEFFICIENT

| SURFACE NUMBER | 5 |
|---|---|
| KA | 6.5766135E+01 |
| A3 | 5.0795975E−05 |
| A4 | −1.4539557E−05 |
| A5 | 5.7326791E−06 |
| A6 | −9.6620064E−07 |
| A7 | 1.2733655E−07 |
| A8 | −1.1771777E−08 |
| A9 | 8.2316678E−10 |
| A10 | −3.0498203E−11 |
| A11 | −2.0343848E−12 |
| A12 | 3.4705758E−13 |
| A13 | −1.6495176E−14 |
| A14 | 5.7602520E−17 |
| A15 | 1.8371495E−17 |
| A16 | −4.2229108E−19 |

| SURFACE NUMBER | 6 |
|---|---|
| KA | −3.3557820E+06 |
| A3 | 1.6549633E−04 |
| A4 | −1.2388429E−05 |
| A5 | 4.8110204E−06 |
| A6 | 6.5251044E−08 |
| A7 | −1.0249352E−07 |
| A8 | 1.5016992E−08 |
| A9 | −3.9501197E−10 |
| A10 | −1.1048561E−10 |
| A11 | 1.0848383E−11 |
| A12 | −2.9971685E−14 |
| A13 | −4.7325483E−14 |
| A14 | 2.8875139E−15 |
| A15 | −6.8997086E−17 |
| A16 | 5.6348898E−19 |

| SURFACE NUMBER | 20 |
|---|---|
| KA | 2.3216563E−01 |
| A3 | 2.1376251E−04 |
| A4 | −6.8902504E−05 |
| A5 | 8.3269780E−05 |
| A6 | −2.5249433E−05 |
| A7 | 3.4636962E−06 |
| A8 | −2.2310818E−07 |
| A9 | 4.1030624E−09 |
| A10 | 1.6185204E−10 |
| A11 | 3.2943761E−12 |
| A12 | −8.0224409E−13 |
| A13 | 2.8220375E−16 |
| A14 | 2.1568531E−15 |
| A15 | −9.8454713E−17 |

TABLE 42-continued

EXAMPLE 14•ASPHERICAL SURFACE COEFFICIENT

| | |
|---|---|
| A16 | 8.1026974E−20 |
| A17 | 4.1787310E−19 |
| A18 | −3.2242135E−20 |
| A19 | 1.0152879E−21 |
| A20 | −1.1785269E−23 |

| SURFACE NUMBER | 21 |
|---|---|
| KA | 1.5168053E−01 |
| A3 | 4.5751265E−04 |
| A4 | −3.6314202E−04 |
| A5 | 1.7636739E−04 |
| A6 | −3.8717709E−05 |
| A7 | 4.6103336E−06 |
| A8 | −2.8168682E−07 |
| A9 | 3.0426406E−09 |
| A10 | 8.0671914E−10 |
| A11 | −5.9079226E−11 |
| A12 | 1.8450683E−12 |
| A13 | −5.5668675E−14 |
| A14 | 4.2112037E−15 |
| A15 | −1.7373035E−16 |
| A16 | −9.1389725E−19 |
| A17 | 2.4492393E−19 |
| A18 | −4.2508924E−21 |
| A19 | −5.6710702E−23 |
| A20 | 1.5564849E−24 |

| SURFACE NUMBER | 22 |
|---|---|
| KA | −2.1185681E+00 |
| A3 | −1.4168490E−03 |
| A4 | −1.2997025E−04 |
| A5 | 8.0589444E−06 |
| A6 | 2.3169271E−06 |
| A7 | −2.6082024E−07 |
| A8 | 6.8538683E−09 |
| A9 | 1.1999319E−10 |
| A10 | 1.2988798E−12 |
| A11 | −5.9782089E−13 |
| A12 | 9.8184110E−15 |
| A13 | 3.5639679E−16 |
| A14 | −3.3782258E−18 |
| A15 | −4.1301875E−19 |
| A16 | 8.4197246E−21 |
| A17 | 8.5859106E−23 |
| A18 | −4.7022379E−24 |
| A19 | 6.1175937E−26 |
| A20 | −2.8705141E−28 |

| SURFACE NUMBER | 23 |
|---|---|
| KA | −2.5885870E+43 |
| A3 | −1.9163843E−03 |
| A4 | −3.1954410E−05 |
| A5 | 1.3490083E−05 |
| A6 | −6.0802460E−07 |
| A7 | 1.1962785E−09 |
| A8 | −2.2746525E−10 |
| A9 | 5.9891347E−11 |
| A10 | −1.4087958E−12 |
| A11 | −7.5740967E−14 |
| A12 | 3.4062567E−15 |
| A13 | 2.4977620E−17 |
| A14 | −3.3162351E−18 |
| A15 | 3.2287212E−20 |
| A16 | 9.7984659E−22 |
| A17 | −1.3094848E−23 |
| A18 | −2.5996999E−25 |
| A19 | 5.2010051E−27 |
| A20 | −1.9673513E−29 |

| SURFACE NUMBER | 24 |
|---|---|
| KA | 1.0510424E+00 |
| A3 | 2.5690923E−04 |
| A4 | −9.4651289E−06 |
| A5 | −9.0558146E−08 |

TABLE 42-continued

EXAMPLE 14•ASPHERICAL SURFACE COEFFICIENT

| | |
|---|---|
| A6 | 1.2530792E−08 |
| A7 | −2.2305821E−10 |
| A8 | −4.4849446E−12 |
| A9 | 2.4469888E−13 |
| A10 | −3.9883739E−15 |
| A11 | 2.6675877E−17 |
| A12 | −8.4614751E−20 |
| A13 | 1.8762077E−21 |
| A14 | −1.4559126E−23 |
| A15 | −3.3975502E−25 |
| A16 | 4.2215174E−27 |
| A17 | 2.7262688E−29 |
| A18 | −7.3432046E−31 |
| A19 | 4.6908597E−33 |
| A20 | −1.0374796E−35 |

Figure 15:
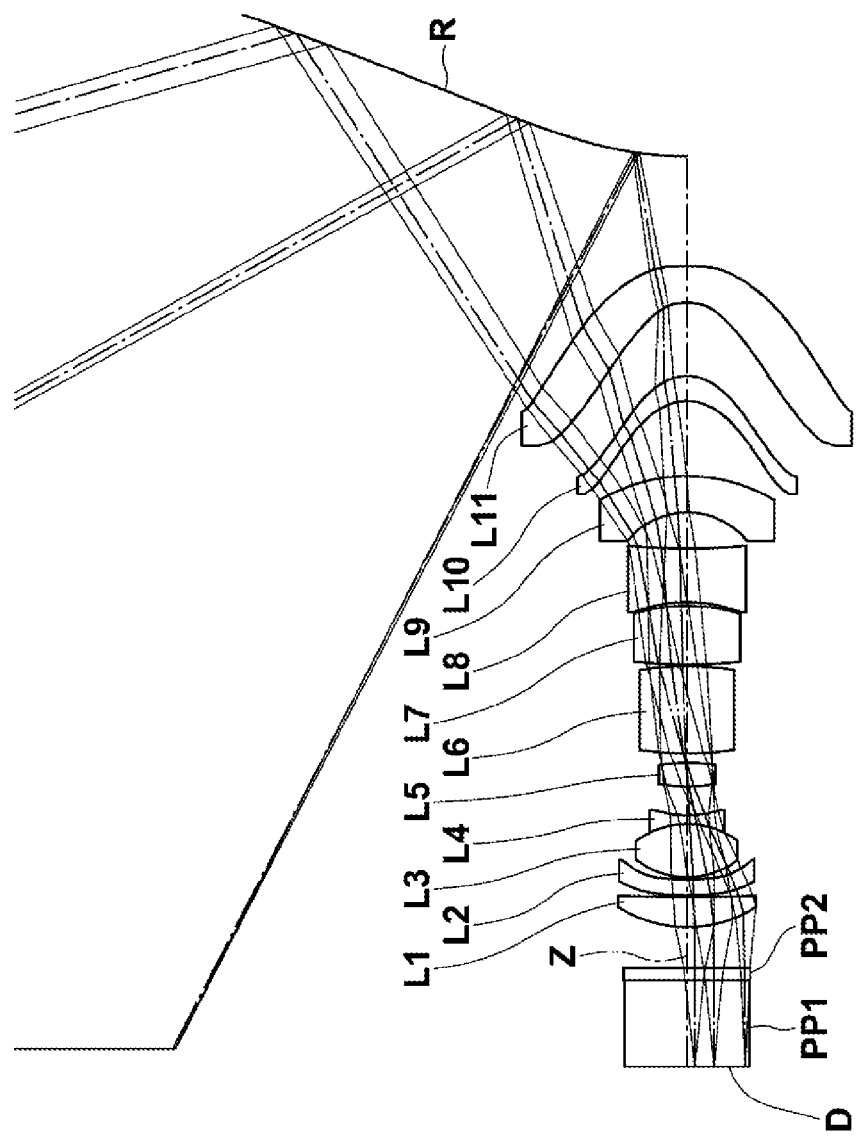
FIG. 15 is a cross section illustrating the structure of a projection optical system in Example 15 of the present invention.
Figure 32:
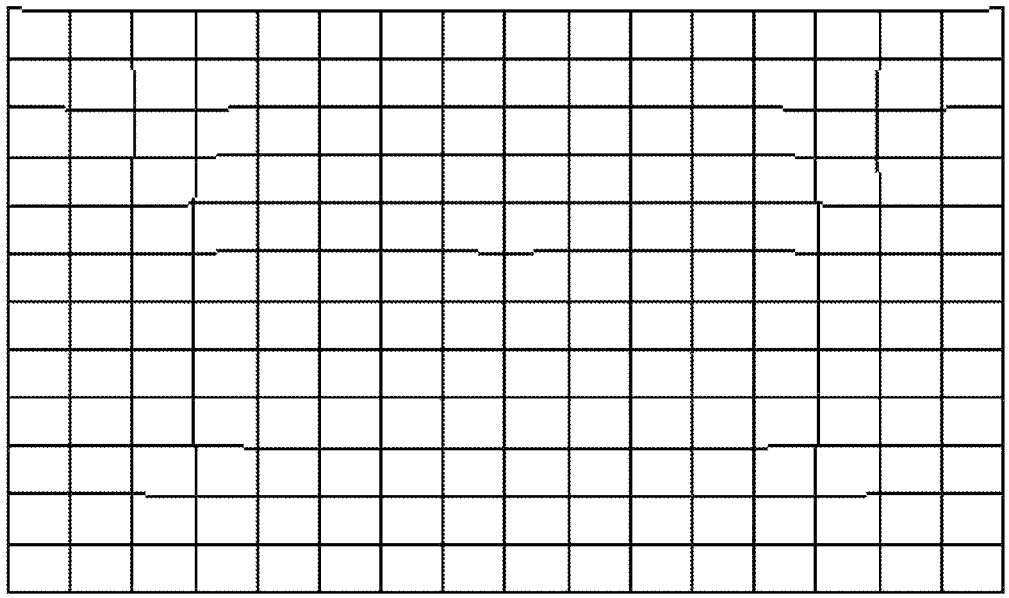
FIG. 32 is a diagram illustrating distortion performance of the projection optical system in Example 15 of the present invention.

Next, a projection optical system in Example 15 will be described. FIG. 15 is a cross section illustrating the structure of the projection optical system in Example 15. Table 43 shows basic lens data on the projection optical system in Example 15, and Table 44 shows data about specification. Table 45 shows data about aspherical surface coefficients. FIG. 32 is a diagram illustrating distortion performance, and FIG. 49 is a diagram illustrating spot performance.

In Example 15, Surface 21 through Surface 20 are optical element Lp, Surface 25 through Surface 22 are a first lens group, Surface 21 through Surface 12 are a 2a-th lens group, and Surface 11 through Surface 5 are a 2b-th lens group.

TABLE 43

EXAMPLE 15•LENS DATA (n, ν FOR d-LINE)

| Si (SURFACE NUMBER) | Ri (CURVATURE RADIUS) | Di (SURFACE DISTANCE) | Ndj (REFRACTIVE INDEX) | ν dj (ABBE NUMBER) |
|---|---|---|---|---|
| 1 | ∞ | 0.0958 | | |
| 2 | ∞ | 10.6000 | 1.84666 | 23.78 |
| 3 | ∞ | 1.5500 | 1.51633 | 64.14 |
| 4 | ∞ | 4.9000 | | |
| 5 | 14.6561 | 3.7457 | 1.78903 | 26.14 |
| 6 | 224.0807 | 0.1990 | | |
| *7 | 45.2769 | 1.9747 | 1.49100 | 57.58 |
| *8 | 55.4989 | 0.2230 | | |
| 9 | 9.3064 | 6.5792 | 1.49700 | 81.54 |
| 10 | −9.7310 | 1.0992 | 1.80240 | 25.55 |
| 11 | 12.5029 | 3.5528 | | |
| 12 | 19.0029 | 2.8979 | 1.48999 | 56.88 |
| 13 | −20.8854 | 1.1459 | | |
| 14 | 34.1576 | 10.7550 | 1.51456 | 52.27 |
| 15 | −35.1796 | 0.1991 | | |
| 16 | 62.8567 | 7.2308 | 1.80004 | 25.65 |
| 17 | −21.0449 | 0.4473 | | |
| 18 | −16.6402 | 6.5929 | 1.61752 | 60.48 |
| 19 | 74.1682 | 4.4443 | | |
| 20 | −8.9472 | 4.5015 | 1.72973 | 33.26 |
| 21 | −19.5169 | 9.2447 | | |
| *22 | −5.9583 | 3.0955 | 1.49100 | 57.58 |
| *23 | −5.2468 | 9.0046 | | |
| *24 | −44.9244 | 4.5009 | 1.49100 | 57.58 |
| *25 | −0.0781 | 13.5744 | | |
| *26 | 57.7501 | −110.0000 | REFLECTION SURFACE | |

ENTRANCE PUPIL POSITION: 461.7 FROM FIRST SURFACE

TABLE 44

EXAMPLE 15•SPECIFICATION (d-LINE)

| | |
|---|---|
| FNo. | 4.00 |
| 2ω [°] | 146.60 |

TABLE 45

EXAMPLE 15·ASPHERICAL SURFACE COEFFICIENT

| SURFACE NUMBER | 7 |
|---|---|
| KA | −4.6392765E+01 |
| A3 | −7.0478565E−04 |
| A4 | 7.9972373E−04 |
| A5 | −6.8306513E−05 |
| A6 | −3.3554150E−05 |
| A7 | 1.5736232E−05 |
| A8 | −1.9261250E−06 |
| A9 | −1.0830313E−07 |
| A10 | 2.8004572E−08 |
| A11 | 1.4510131E−09 |
| A12 | −1.8672656E−10 |
| A13 | −4.5534704E−11 |
| A14 | 3.9684816E−12 |
| A15 | 1.5237886E−13 |
| A16 | −1.5355110E−14 |

| SURFACE NUMBER | 8 |
|---|---|
| KA | −1.7956130E+02 |
| A3 | −1.1305315E−04 |
| A4 | 5.4684152E−04 |
| A5 | 1.7861424E−04 |
| A6 | −6.0430901E−05 |
| A7 | −4.4997542E−06 |
| A8 | 6.5886420E−06 |
| A9 | −9.0401925E−07 |
| A10 | −1.7580192E−07 |
| A11 | 5.0394622E−08 |
| A12 | −5.4998562E−10 |
| A13 | −9.0064904E−10 |
| A14 | 1.0208012E−10 |
| A15 | −4.0958032E−12 |
| A16 | 5.0163064E−14 |

| SURFACE NUMBER | 22 |
|---|---|
| KA | 2.3716576E−01 |
| A3 | −1.0579370E−02 |
| A4 | 2.0387995E−03 |
| A5 | 1.5249766E−03 |
| A6 | −7.8852791E−04 |
| A7 | 1.5158835E−04 |
| A8 | −1.4814481E−05 |
| A9 | 8.2667132E−07 |
| A10 | −3.7586489E−08 |
| A11 | 2.4173434E−09 |
| A12 | 8.5914805E−12 |
| A13 | −2.9466682E−11 |
| A14 | 3.1966324E−12 |
| A15 | −4.4109745E−13 |
| A16 | 2.1625020E−14 |
| A17 | 1.0261536E−14 |
| A18 | −1.7760618E−15 |
| A19 | 1.0667902E−16 |
| A20 | −2.2510132E−18 |

| SURFACE NUMBER | 23 |
|---|---|
| KA | 1.5246062E−01 |
| A3 | 5.1331499E−04 |
| A4 | −4.9706280E−03 |
| A5 | 2.7705955E−03 |
| A6 | −8.2845093E−04 |
| A7 | 1.8323949E−04 |
| A8 | −2.7192802E−05 |
| A9 | 1.2388616E−06 |
| A10 | 2.8897079E−07 |
| A11 | −4.5117632E−08 |
| A12 | 1.7215740E−09 |
| A13 | −3.2848767E−11 |
| A14 | 1.8675233E−11 |
| A15 | −1.7157086E−12 |
| A16 | −1.9601438E−14 |
| A17 | 7.6670049E−15 |
| A18 | −2.0417022E−16 |

TABLE 45-continued

EXAMPLE 15·ASPHERICAL SURFACE COEFFICIENT

| A19 | −6.6340849E−18 |
|---|---|
| A20 | 2.7355201E−19 |

| SURFACE NUMBER | 24 |
|---|---|
| KA | −3.1856395E+00 |
| A3 | −3.1013559E−02 |
| A4 | −3.7060674E−04 |
| A5 | 7.7918887E−04 |
| A6 | 4.2213449E−05 |
| A7 | −2.5863509E−05 |
| A8 | 1.3681830E−06 |
| A9 | 1.3375653E−07 |
| A10 | −6.4057864E−09 |
| A11 | −1.1905894E−09 |
| A12 | 6.6479437E−11 |
| A13 | 3.8430832E−12 |
| A14 | −2.3889387E−13 |
| A15 | −1.1560425E−14 |
| A16 | 7.7155480E−16 |
| A17 | 1.2488066E−17 |
| A18 | −1.2455464E−18 |
| A19 | 6.7736438E−21 |
| A20 | 3.7111248E−22 |

| SURFACE NUMBER | 25 |
|---|---|
| KA | −2.1156382E+19 |
| A3 | −2.7451387E−03 |
| A4 | −1.7950739E−03 |
| A5 | 1.7288434E−04 |
| A6 | 1.3247307E−05 |
| A7 | 2.2070499E−07 |
| A8 | −4.7314308E−07 |
| A9 | 2.8325839E−08 |
| A10 | 1.9788122E−09 |
| A11 | −2.9092837E−10 |
| A12 | −2.1331870E−12 |
| A13 | 6.2559028E−13 |
| A14 | −1.0811452E−14 |
| A15 | −4.9865013E−16 |
| A16 | 9.1838832E−18 |
| A17 | 4.2227044E−19 |
| A18 | −2.5894931E−20 |
| A19 | 1.2137733E−21 |
| A20 | −2.3623223E−23 |

| SURFACE NUMBER | 26 |
|---|---|
| KA | 1.0921890E+00 |
| A3 | 8.9836331E−04 |
| A4 | −5.8899357E−05 |
| A5 | −1.1346015E−06 |
| A6 | 2.8167686E−07 |
| A7 | −9.3986473E−09 |
| A8 | −3.5136649E−10 |
| A9 | 3.6240681E−11 |
| A10 | −1.1064024E−12 |
| A11 | 1.3759930E−14 |
| A12 | −8.2027665E−17 |
| A13 | 3.4859873E−18 |
| A14 | −4.9439235E−20 |
| A15 | −2.2026962E−21 |
| A16 | 5.0266169E−23 |
| A17 | 6.1761378E−25 |
| A18 | −3.0508431E−26 |
| A19 | 3.6132882E−28 |
| A20 | −1.4835427E−30 |

Figure 16:
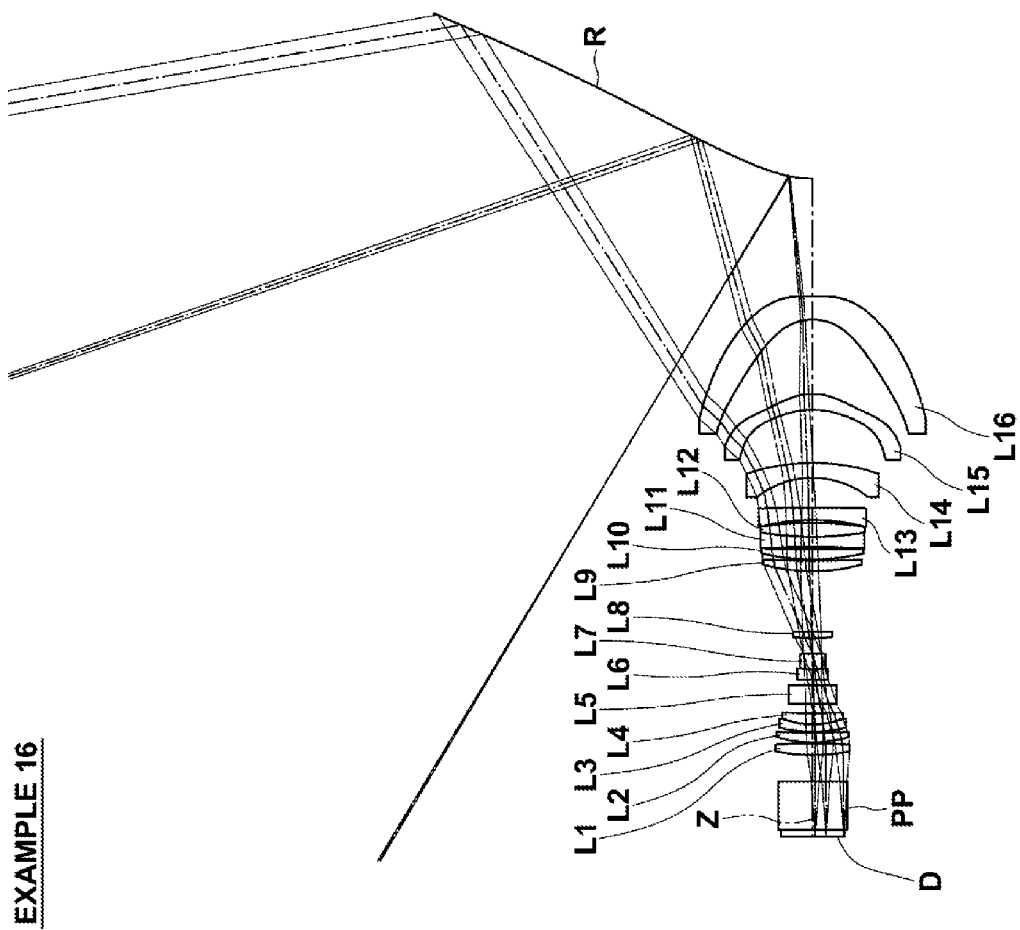
FIG. 16 is a cross section illustrating the structure of a projection optical system in Example 16 of the present invention.
Figure 33:
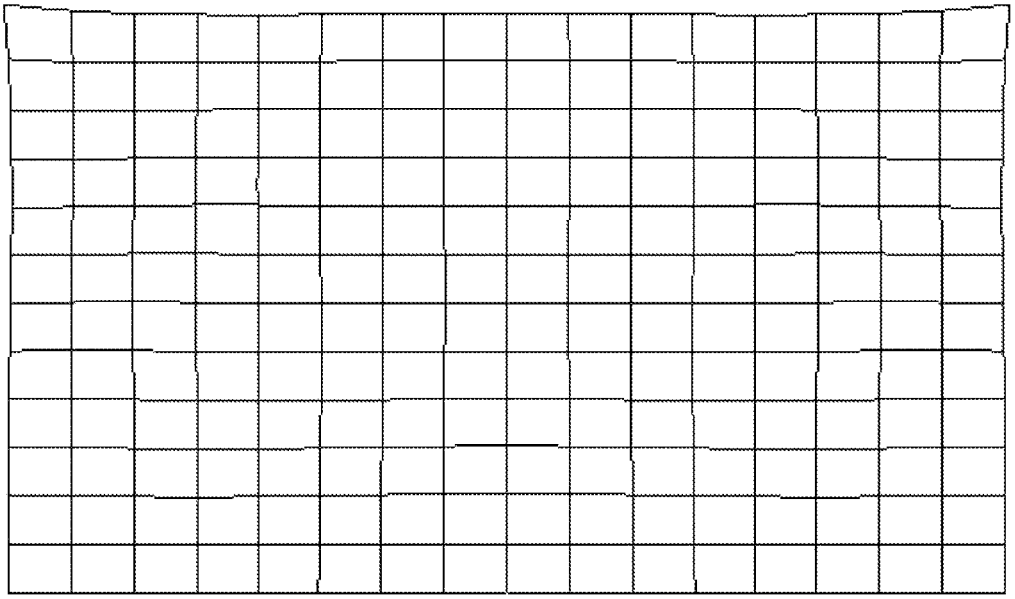
FIG. 33 is a diagram illustrating distortion performance of the projection optical system in Example 16 of the present invention.
Figure 50:
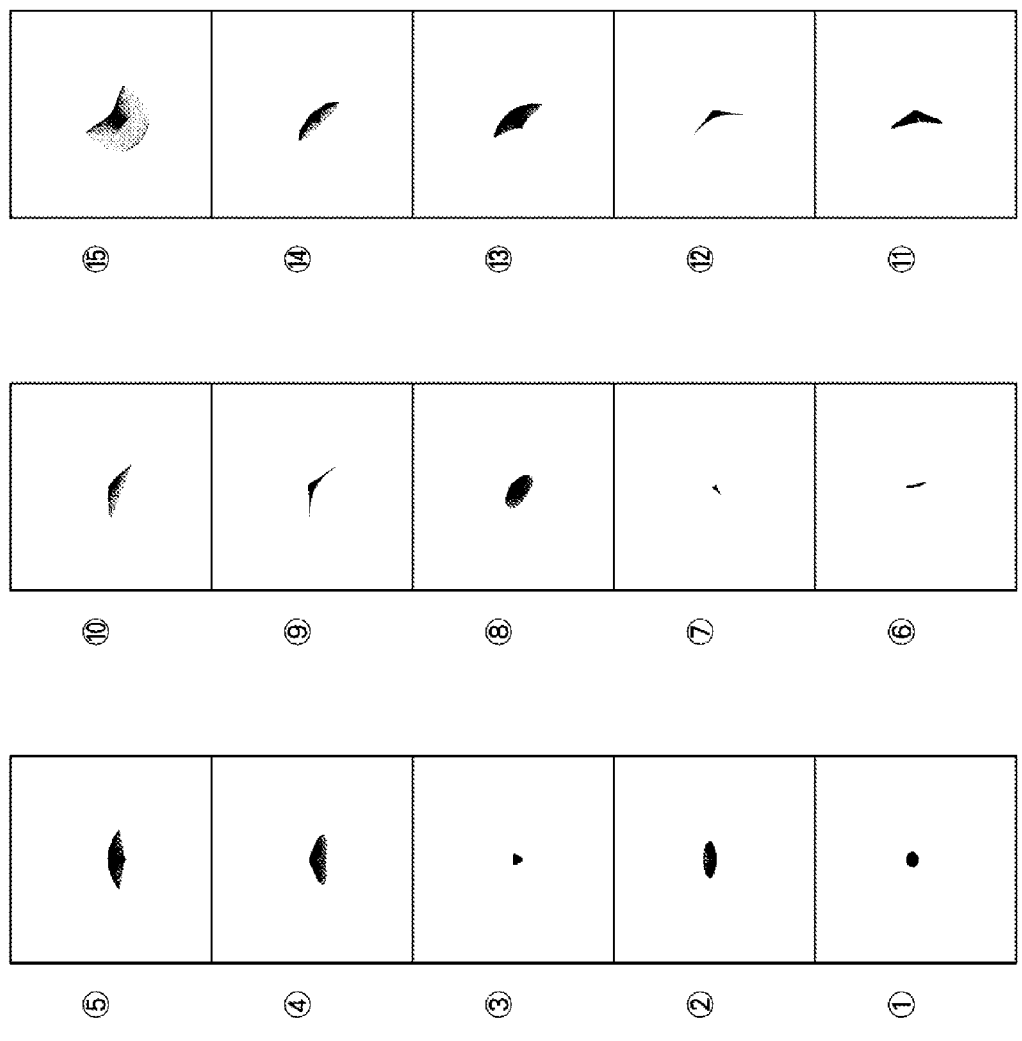
FIG. 50 is a diagram illustrating spot performance of the projection optical system in Example 16 of the present invention.

Next, a projection optical system in Example 16 will be described. FIG. 16 is a cross section illustrating the structure of the projection optical system in Example 16. Table 46 shows basic lens data on the projection optical system in Example 16, and Table 47 shows data about specification. Table 48 shows data about aspherical surface coefficients. FIG. 33 is a diagram illustrating distortion performance, and FIG. 50 is a diagram illustrating spot performance.

In Example 16, Surface 29 through Surface 28 are optical element Lp, Surface 33 through Surface 30 are a first lens group, and Surface 29 through Surface 5 are a second lens group.

TABLE 46

EXAMPLE 16•LENS DATA (n, ν FOR d-LINE)

| Si (SURFACE NUMBER) | Ri (CURVATURE RADIUS) | Di (SURFACE DISTANCE) | Ndj (REFRACTIVE INDEX) | ν dj (ABBE NUMBER) |
|---|---|---|---|---|
| 1   | ∞         | 1.5500   | 1.51680 | 64.20 |
| 2   | ∞         | 0.0000   |         |       |
| 3   | ∞         | 10.6000  | 1.84666 | 23.78 |
| 4   | ∞         | 5.7991   |         |       |
| 5   | 40.9778   | 2.5739   | 1.78111 | 49.89 |
| 6   | −105.4155 | 0.1991   |         |       |
| 7   | 24.6916   | 2.0956   | 1.74756 | 5324  |
| 8   | 141.7015  | 0.1995   |         |       |
| 9   | 26.9099   | 1.6650   | 1.77620 | 26.19 |
| 10  | 16.5703   | 2.4744   | 1.69946 | 56.53 |
| 11  | 226.7436  | 1.9797   |         |       |
| *12 | 122.2666  | 4.1250   | 1.51007 | 56.24 |
| *13 | 318.7030  | 1.2375   |         |       |
| 14  | −107.0069 | 2.2600   | 1.84481 | 29.86 |
| 15  | 16.9691   | 3.5363   | 1.48746 | 64.27 |
| 16  | −49.0550  | 3.2975   |         |       |
| 17  | 27.7522   | 1.5008   | 1.48751 | 57.34 |
| 18  | −4594.9840| 13.2789  |         |       |
| 19  | 38.8081   | 2.2341   | 1.66731 | 32.33 |
| 20  | 161.2215  | 0.3549   |         |       |
| 21  | 46.0541   | 2.2326   | 1.74816 | 33.08 |
| 22  | 338.6393  | 0.4569   |         |       |
| 23  | −244.7909 | 2.2650   | 1.50881 | 63.43 |
| 24  | 62.9054   | 3.0902   | 1.59385 | 39.18 |
| 25  | −67.2985  | 0.5741   |         |       |
| 26  | −42.8970  | 2.7000   | 1.73160 | 53.18 |
| 27  | −441.1616 | 6.5765   |         |       |
| 28  | −18.4239  | 3.3000   | 1.80991 | 44.62 |
| 29  | −42.4857  | 11.6576  |         |       |
| *30 | −17.2281  | 3.4991   | 1.49100 | 57.58 |
| *31 | −11.4306  | 16.3210  |         |       |
| *32 | −13.6384  | 5.0986   | 1.49100 | 57.58 |
| *33 | 64.8825   | 25.9045  |         |       |
| *34 | 21.2202   | −150.0000| REFLECTION SURFACE | |

ENTRANCE PUPIL POSITION: 314.3 FROM FIRST SURFACE

TABLE 47

EXAMPLE 16•SPECIFICATION (d-LINE)

| FNo. | 3.97 |
|---|---|
| 2ω [°] | 159.60 |

TABLE 48

EXAMPLE 16•ASPHERICAL SURFACE COEFFICIENT

| SURFACE NUMBER | 12 |
|---|---|
| KA  | −1.1587015E+03 |
| A3  | −2.5120665E−05 |
| A4  | −1.2696991E−04 |
| A5  | 1.9368835E−06  |
| A6  | −5.0028444E−06 |
| A7  | 2.2995257E−07  |
| A8  | 2.1441755E−07  |
| A9  | −5.8922525E−09 |
| A10 | −8.4981907E−10 |
| A11 | −1.1921538E−09 |
| A12 | 2.3295231E−11  |
| A13 | 3.4382533E−12  |
| A14 | 7.6230019E−12  |

TABLE 48-continued

EXAMPLE 16•ASPHERICAL SURFACE COEFFICIENT

| A15 | −3.2817751E−13 |
|---|---|
| A16 | −8.5102663E−15 |
| A17 | 3.4120894E−15  |
| A18 | 4.3152682E−15  |
| A19 | −3.8078062E−17 |
| A20 | 7.5497357E−17  |

| SURFACE NUMBER | 13 |
|---|---|
| KA  | −6.2744169E+03 |
| A3  | −7.9005711E−05 |
| A4  | −1.0207015E−05 |
| A5  | −2.5931068E−05 |
| A6  | 5.6204196E−07  |
| A7  | 1.9536046E−07  |
| A8  | 5.3545102E−08  |
| A9  | 2.1293548E−07  |
| A10 | 3.3607326E−09  |
| A11 | −2.3031204E−08 |
| A12 | −1.7951249E−09 |
| A13 | 1.8379720E−10  |
| A14 | 3.8264717E−10  |
| A15 | 3.3715107E−11  |
| A16 | −1.5400874E−11 |
| A17 | −7.8324681E−14 |
| A18 | −5.0117454E−13 |
| A19 | 1.8841489E−14  |
| A20 | 1.7154792E−14  |

| SURFACE NUMBER | 30 |
|---|---|
| KA  | −2.9503762E−01 |
| A3  | −5.8491507E−05 |
| A4  | −7.8146781E−05 |
| A5  | 1.2934056E−05  |
| A6  | 8.9089980E−07  |
| A7  | −1.8450519E−07 |
| A8  | 5.9930360E−09  |
| A9  | −1.5846249E−10 |
| A10 | 2.5029599E−11  |
| A11 | −1.0327021E−12 |
| A12 | −8.4867084E−14 |
| A13 | 6.0251682E−15  |
| A14 | 3.0893042E−17  |
| A15 | 1.4113052E−18  |
| A16 | −5.1330874E−19 |
| A17 | −7.4152610E−20 |
| A18 | 7.6488837E−21  |
| A19 | −2.5272112E−22 |
| A20 | 1.8072971E−24  |

| SURFACE NUMBER | 31 |
|---|---|
| KA  | 1.6797579E−01  |
| A3  | −1.6611232E−04 |
| A4  | 9.4682232E−05  |
| A5  | −1.3829502E−05 |
| A6  | 4.6355743E−06  |
| A7  | −5.3633840E−07 |
| A8  | 3.9219226E−08  |
| A9  | −1.7717638E−09 |
| A10 | −3.4187551E−11 |
| A11 | 6.7006420E−12  |
| A12 | 3.5926093E−14  |
| A13 | −2.2073744E−14 |
| A14 | 1.5657581E−16  |
| A15 | 5.9195497E−17  |
| A16 | −2.4024388E−18 |
| A17 | 2.1095060E−20  |
| A18 | 1.3148771E−22  |
| A19 | 1.3131270E−23  |
| A20 | −3.5014132E−25 |

| SURFACE NUMBER | 32 |
|---|---|
| KA  | −9.8418190E+00 |
| A3  | −4.0524612E−03 |
| A4  | −9.9250632E−05 |

TABLE 48-continued

EXAMPLE 16•ASPHERICAL SURFACE COEFFICIENT

| | |
|---|---|
| A5 | 2.4118088E−06 |
| A6 | 3.7110006E−07 |
| A7 | 3.5789032E−07 |
| A8 | −4.2590496E−08 |
| A9 | 8.9262884E−10 |
| A10 | 7.1518698E−11 |
| A11 | −1.6592989E−12 |
| A12 | −1.9885938E−13 |
| A13 | 7.3679429E−15 |
| A14 | 3.3057642E−16 |
| A15 | −2.9874900E−17 |
| A16 | 8.2135603E−19 |
| A17 | −1.5274389E−20 |
| A18 | 7.1776388E−22 |
| A19 | −2.6263932E−23 |
| A20 | 3.2336776E−25 |

| SURFACE NUMBER | 33 |
|---|---|
| KA | −2.7572211E+03 |
| A3 | −1.9905092E−03 |
| A4 | −1.1637874E−04 |
| A5 | −2.7098745E−06 |
| A6 | 2.5884194E−06 |
| A7 | −2.2640692E−07 |
| A8 | 6.1093455E−09 |
| A9 | 3.4354415E−10 |
| A10 | −3.5202993E−11 |
| A11 | 7.7541210E−13 |
| A12 | 3.5282913E−14 |
| A13 | −1.7134594E−15 |
| A14 | −1.5495969E−17 |
| A15 | 9.4419789E−19 |
| A16 | 5.7476033E−20 |
| A17 | −1.7457513E−21 |
| A18 | −5.2028340E−23 |
| A19 | 2.4924611E−24 |
| A20 | −2.6090820E−26 |

| SURFACE NUMBER | 34 |
|---|---|
| KA | −2.5240145E+00 |
| A3 | −1.9286019E−05 |
| A4 | 1.7668451E−07 |
| A5 | 3.9992188E−09 |
| A6 | −2.4527463E−10 |
| A7 | 1.5311011E−12 |
| A8 | 4.5638539E−14 |
| A9 | −4.6896864E−16 |
| A10 | 3.5785627E−18 |
| A11 | −1.3751802E−19 |
| A12 | 1.3911262E−21 |
| A13 | −4.0646214E−24 |
| A14 | 1.1081513E−25 |
| A15 | −1.1139248E−27 |
| A16 | −4.6280612E−29 |
| A17 | 1.5204343E−30 |
| A18 | −1.8772399E−32 |
| A19 | 1.0063718E−34 |
| A20 | −1.7551985E−37 |

Figure 17:
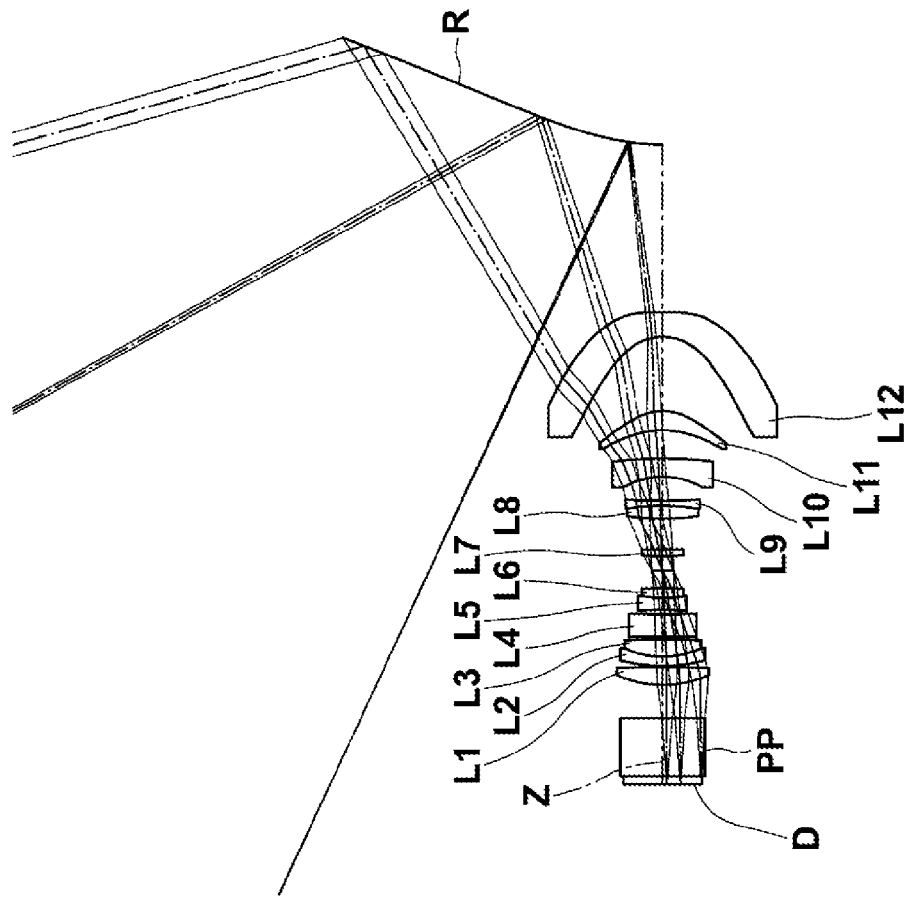
FIG. 17 is a cross section illustrating the structure of a projection optical system in Example 17 of the present invention.
Figure 34:
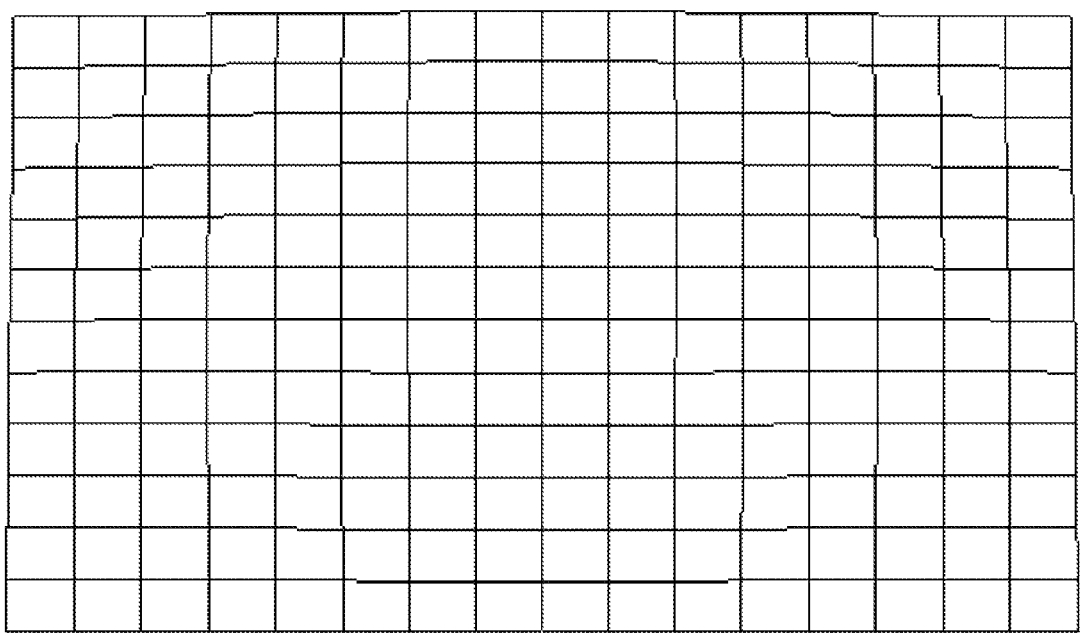
FIG. 34 is a diagram illustrating distortion performance of the projection optical system in Example 17 of the present invention.
Figure 51:
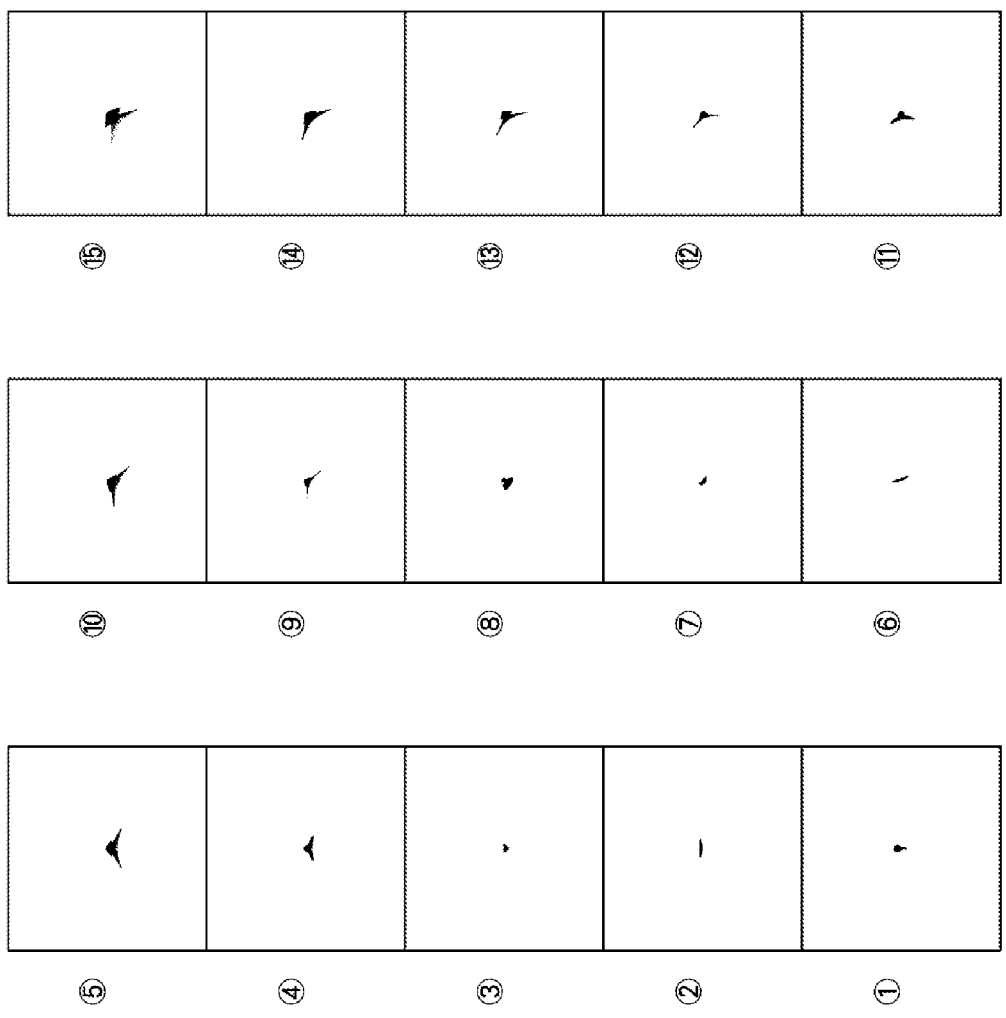
FIG. 51 is a diagram illustrating spot performance of the projection optical system in Example 17 of the present invention.

Next, a projection optical system in Example 17 will be described. FIG. 17 is a cross section illustrating the structure of the projection optical system in Example 17. Table 49 shows basic lens data on the projection optical system in Example 17, and Table 50 shows data about specification. Table 51 shows data about aspherical surface coefficients. FIG. 34 is a diagram illustrating distortion performance, and FIG. 51 is a diagram illustrating spot performance.

In Example 17, Surface 21 through Surface 20 are optical element Lp, Surface 25 through Surface 22 are a first lens group, Surface 21 through Surface 15 are a 2a-th lens group, and Surface 14 through Surface 5 are a 2b-th lens group.

TABLE 49

EXAMPLE 17•LENS DATA (n, ν FOR d-LINE)

| Si (SURFACE NUMBER) | Ri (CURVATURE RADIUS) | Di (SURFACE DISTANCE) | Ndj (REFRACTIVE INDEX) | ν dj (ABBE NUMBER) |
|---|---|---|---|---|
| 1 | ∞ | 1.5500 | 1.51680 | 64.20 |
| 2 | ∞ | 0.0000 | | |
| 3 | ∞ | 10.6000 | 1.84665 | 23.78 |
| 4 | ∞ | 6.0005 | | |
| 5 | 18.9205 | 3.2903 | 1.75345 | 52.66 |
| 6 | −169.5404 | 0.1990 | | |
| 7 | 28.4640 | 1.6650 | 1.84500 | 22.75 |
| 8 | 14.7639 | 3.1274 | 1.82319 | 45.68 |
| 9 | −143.2185 | 0.4787 | | |
| *10 | 58.9029 | 4.1250 | 1.51007 | 56.24 |
| *11 | 59.0005 | 0.7877 | | |
| 12 | −68.7558 | 2.2600 | 1.84502 | 22.75 |
| 13 | 18.4710 | 1.7129 | 1.65893 | 58.55 |
| 14 | −76.5603 | 5.8046 | | |
| 15 | 32.7560 | 1.3427 | 1.71841 | 32.31 |
| 16 | −179.3248 | 5.5780 | | |
| 17 | 40.7001 | 2.3222 | 1.83194 | 23.40 |
| 18 | −36.2430 | 0.9991 | 1.48749 | 65.48 |
| 19 | 107.6291 | 4.3351 | | |
| 20 | −13.2419 | 3.3000 | 1.83484 | 29.89 |
| 21 | −68.6753 | 5.1774 | | |
| *22 | −14.7770 | 3.5010 | 1.49100 | 57.58 |
| *23 | −8.3245 | 13.5225 | | |
| *24 | −11.3030 | 4.4994 | 1.49100 | 57.58 |
| *25 | 60.9090 | 30.6513 | | |
| *26 | 37.6466 | −150.0000 | REFLECTION SURFACE | |

ENTRANCE PUPIL POSITION : 450.0 FROM FIRST SURFACE

TABLE 50

EXAMPLE 17•SPECIFICATION (d-LINE)

| | |
|---|---|
| FNo. | 3.78 |
| 2ω [°] | 147.40 |

TABLE 51

EXAMPLE 17•ASPHERICAL SURFACE COEFFICIENT

| SURFACE NUMBER | 10 |
|---|---|
| KA | −2.0000001E+02 |
| A3 | −2.0608485E−06 |
| A4 | −2.2367059E−04 |
| A5 | −2.4777364E−07 |
| A6 | −2.1566237E−06 |
| A7 | 3.5005867E−07 |
| A8 | −3.1394773E−07 |
| A9 | 1.9989087E−07 |
| A10 | −4.3110702E−08 |
| A11 | −2.3089218E−09 |
| A12 | 3.4509613E−09 |
| A13 | −8.7858845E−10 |
| A14 | 1.1533089E−10 |
| A15 | −8.0572036E−12 |
| A16 | 2.3712436E−13 |

| SURFACE NUMBER | 11 |
|---|---|
| KA | 9.8589363E+01 |
| A3 | −1.1031376E−04 |
| A4 | −2.3161674E−04 |
| A5 | −5.3127939E−06 |
| A6 | −1.4741562E−05 |
| A7 | 1.3487739E−05 |
| A8 | −3.7148720E−06 |
| A9 | 1.3162064E−07 |
| A10 | 6.4016856E−08 |

TABLE 51-continued

EXAMPLE 17·ASPHERICAL SURFACE COEFFICIENT

| | |
|---|---|
| A11 | 1.6986505E−08 |
| A12 | −4.0186408E−09 |
| A13 | −2.3297468E−09 |
| A14 | 8.8545192E−10 |
| A15 | −1.1144580E−10 |
| A16 | 4.9506701E−12 |

| SURFACE NUMBER | 22 |
|---|---|
| KA | 9.0926128E−06 |
| A3 | −2.8227329E−05 |
| A4 | −2.4729788E−05 |
| A5 | 1.5310496E−05 |
| A6 | 2.5974141E−07 |
| A7 | −2.4627082E−07 |
| A8 | −4.9697654E−09 |
| A9 | 3.0455089E−09 |
| A10 | 4.7094904E−11 |
| A11 | −3.4004259E−11 |
| A12 | 1.9970819E−12 |
| A13 | −1.1995782E−13 |
| A14 | 1.6375356E−14 |
| A15 | −1.0568710E−15 |
| A16 | 2.2938782E−17 |

| SURFACE NUMBER | 23 |
|---|---|
| KA | 1.7871517E−01 |
| A3 | −1.8662288E−04 |
| A4 | 1.6820070E−04 |
| A5 | −1.4740000E−05 |
| A6 | 3.5348908E−06 |
| A7 | −3.7716615E−07 |
| A8 | 3.4224910E−08 |
| A9 | −2.7347524E−09 |
| A10 | 8.9405987E−11 |
| A11 | −3.8618208E−12 |
| A12 | 5.6698147E−13 |
| A13 | 6.7031004E−14 |
| A14 | −1.6432750E−14 |
| A15 | 1.0214001E−15 |
| A16 | −2.1230747E−17 |

| SURFACE NUMBER | 24 |
|---|---|
| KA | −5.9145369E+00 |
| A3 | −4.1853991E−03 |
| A4 | −2.9526853E−04 |
| A5 | −1.9583792E−07 |
| A6 | 4.1682669E−06 |
| A7 | 1.8217440E−07 |

TABLE 51-continued

EXAMPLE 17·ASPHERICAL SURFACE COEFFICIENT

| | |
|---|---|
| A8 | −4.2361684E−08 |
| A9 | −2.3791647E−09 |
| A10 | 4.5146294E−10 |
| A11 | −5.0525982E−12 |
| A12 | −1.2113652E−12 |
| A13 | 2.0487937E−14 |
| A14 | 3.1280781E−15 |
| A15 | −1.4729329E−16 |
| A16 | 1.9269750E−18 |

| SURFACE NUMBER | 25 |
|---|---|
| KA | −5.0000001E+02 |
| A3 | −2.7819326E−03 |
| A4 | −1.3760975E−04 |
| A5 | 1.5886030E−06 |
| A6 | 4.2566726E−06 |
| A7 | −5.5623976E−07 |
| A8 | 3.2449967E−08 |
| A9 | −1.4404690E−09 |
| A10 | 1.4126691E−10 |
| A11 | −1.4620887E−11 |
| A12 | 9.0638146E−13 |
| A13 | −3.4143557E−14 |
| A14 | 8.4125438E−16 |
| A15 | −1.4197753E−17 |
| A16 | 1.3267372E−19 |

| SURFACE NUMBER | 26 |
|---|---|
| KA | −3.1118883E+00 |
| A3 | 2.0340631E−05 |
| A4 | −1.3965350E−05 |
| A5 | 2.6181849E−06 |
| A6 | −2.4143206E−07 |
| A7 | 1.3148226E−08 |
| A8 | −4.4574735E−10 |
| A9 | 8.8689764E−12 |
| A10 | −7.1990857E−14 |
| A11 | −6.9016277E−16 |
| A12 | 1.3883358E−17 |
| A13 | 2.0275535E−19 |
| A14 | −7.2527639E−21 |
| A15 | 7.2481660E−23 |
| A16 | −2.5849556E−25 |

Table 52 shows values corresponding to conditional formulas (1) through (5) about projection optical systems in Examples 1 through 17. In all of the examples, d-line is reference wavelength, and the following Table 52 shows values at this reference wavelength.

TABLE 52

| | EXAMPLE 1 | EXAMPLE 2 | EXAMPLE 3 | EXAMPLE 4 | EXAMPLE 5 | EXAMPLE 6 |
|---|---|---|---|---|---|---|
| L/D + 2ω min/ω max | 0.95 | 0.96 | 0.97 | 0.94 | 0.95 | 0.95 |
| ω min/ω max | 0.41 | 0.41 | 0.40 | 0.37 | 0.35 | 0.35 |
| L/D | 0.12 | 0.14 | 0.17 | 0.21 | 0.25 | 0.25 |
| \|cos θ − 2cos φ cos ψ\| | 0.21 | 0.23 | 0.26 | 0.30 | 0.34 | 0.34 |
| (ZL + ZD)/Hm | 1.23 | 1.20 | 1.21 | 1.27 | 1.59 | 1.46 |

| | EXAMPLE 7 | EXAMPLE 8 | EXAMPLE 9 | EXAMPLE 10 | EXAMPLE 11 | EXAMPLE 12 |
|---|---|---|---|---|---|---|
| L/D + 2ω min/ω max | 0.95 | 0.95 | 0.93 | 0.95 | 0.96 | 0.94 |
| ω min/ω max | 0.35 | 0.35 | 0.36 | 0.40 | 0.37 | 0.33 |
| L/D | 0.25 | 0.25 | 0.21 | 0.15 | 0.21 | 0.28 |
| \|cos θ − 2cos φ cos ψ\| | 0.34 | 0.34 | 0.30 | 0.24 | 0.31 | 0.35 |
| (ZL + ZD)/Hm | 1.36 | 1.42 | 1.48 | 1.34 | 1.48 | 1.96 |

| | EXAMPLE 13 | EXAMPLE 14 | EXAMPLE 15 | EXAMPLE 16 | EXAMPLE 17 |
|---|---|---|---|---|---|
| L/D + 2ω min/ω max | 0.95 | 0.90 | 0.89 | 0.68 | 0.76 |
| ω min/ω max | 0.33 | 0.32 | 0.36 | 0.29 | 0.29 |

TABLE 52-continued

| | | | | | |
|---|---|---|---|---|---|
| L/D | 0.28 | 0.25 | 0.17 | 0.10 | 0.17 |
| $|\cos \theta - 2\cos \phi \cos \psi|$ | 0.34 | 0.34 | 0.29 | 0.18 | 0.28 |
| (ZL + ZD)/Hm | 1.95 | 2.07 | 1.93 | 1.60 | 1.74 |

As the above data show, all of the projection optical systems in Examples 1 through 17 satisfy conditional formulas (1) through (5). It is recognizable that all of the projection optical systems can display a magnified video image in sufficient size on a screen at a short projection distance while achieving reduction in the size and the cost of the optical system.

Figure 54:
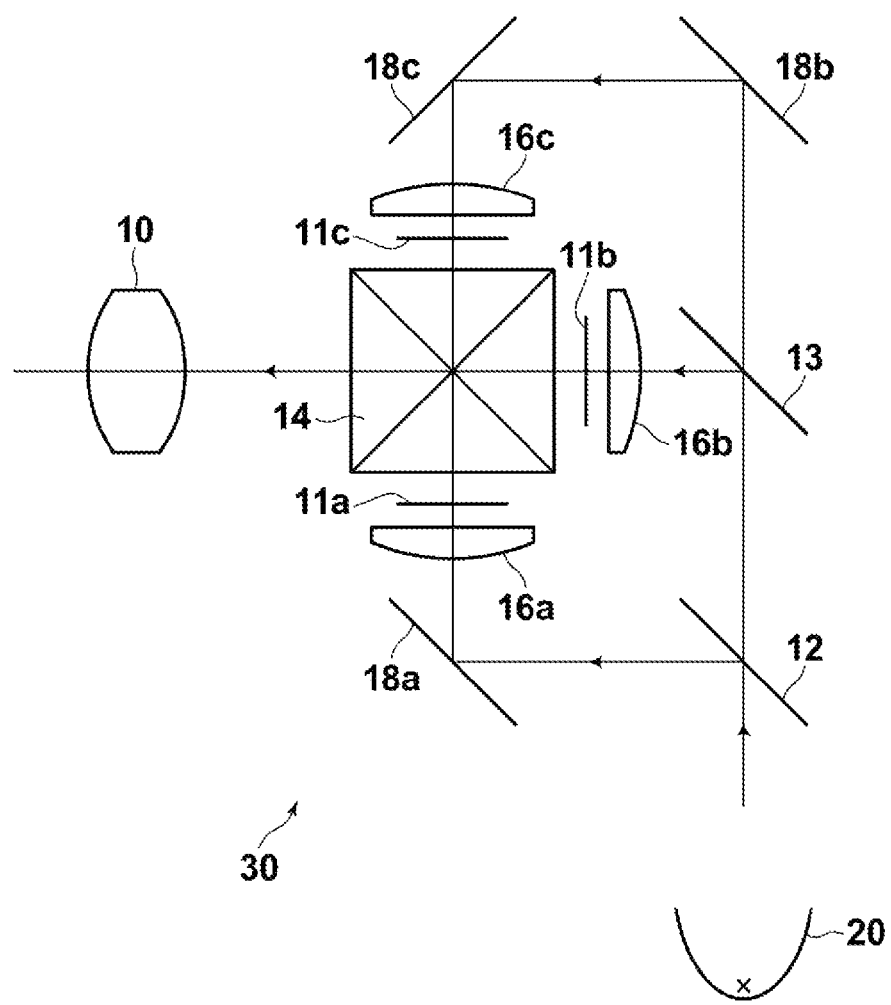
FIG. 54 is a schematic diagram illustrating the configuration of a projection-type display apparatus according to an embodiment of the present invention.

Next, embodiments of a projection-type display apparatus according to the present invention will be described with reference to FIG. 54. FIG. 54 is a schematic diagram illustrating the configuration of a projection-type display apparatus according to an embodiment of the present invention.

A projection-type display apparatus 100 illustrated in FIG. 54 includes the projection optical system 10 according to an embodiment of the present invention, a light source 20, transmission-type display devices 11a through 11c, as light valves corresponding to light of respective colors, and an illumination optical unit 30 for guiding rays from the light source 20 to the light valves. The illumination optical unit 30 includes dichroic mirrors 12 and 13 for color separation, a cross-dichroic prism 14 for color combination, condenser lenses 16a through 16c, and total reflection mirrors 18a through 18c. In FIG. 54, the projection optical system 10 is schematically illustrated. Further, an integrator, such as a fly-eye integrator, is arranged between the light source 20 and the dichroic mirror 12. However, the integrator is not illustrated in FIG. 54.

White light that has been output from the light source 20 is separated into rays of three colors (G light, B light and R light) by the dichroic mirrors 12 and 13 in the illumination optical unit 30. After then, optical paths of the separated rays of respective colors are deflected by the total reflection mirrors 18a through 18c, respectively. Further, the separated rays enter transmission-type display devices 11a through 11c corresponding to the rays of respective colors through condenser lenses 16a through 16c, respectively, and are optically modulated. After the colors are combined by the cross-dichroic prism 14, the light enters the projection optical system 10. The projection optical system 10 projects an optical image of the light that has been optically modulated by the transmission-type display devices 11a through 11c onto a screen, which is not illustrated.

As the transmission-type display devices 11a through 11c, for example, transmission-type liquid crystal display devices or the like may be used. FIG. 54 illustrates an example in which transmission-type display devices are used as light valves. However, light valves provided in the projection-type display apparatus of the present invention are not limited to the transmission-type display devices. Other light modulation means, such as a reflection-type liquid crystal display device or a DMD, may be used.

So far, the present invention has been described by using embodiments and examples. However, the present invention is not limited to the aforementioned embodiments nor examples, and various modifications are possible. For example, a curvature radius, a distance between surfaces, a refractive index, an Abbe number and the like of each lens element are not limited to the values in each of the above numerical value examples, but may be other values.

What is claimed is:

1. A projection optical system that projects an image displayed on an image display device arranged on a reduction-side conjugate plane onto a magnification-side conjugate plane, as a magnified image, the projection optical system comprising:
   a refractive optical system; and
   a reflective optical system having negative refractive power in this order from a reduction side,
   wherein the following conditional formula (1) is satisfied:

$$L/D + 2\omega min/\omega max \leq 1.01 \quad (1),\text{ where}$$

L: a distance on an optical axis between the reflective optical system and the magnification-side conjugate plane,
   D: a diagonal length of the magnified image,
   ωmin: a minimum angle of incidence of a chief ray entering the magnification-side conjugate plane, and
   ωmax: a maximum angle of incidence of the chief ray entering the magnification-side conjugate plane.

2. The projection optical system, as defined in claim 1, wherein the refractive optical system and the reflective optical system have a common optical axis.

3. The projection optical system, as defined in claim 1, wherein the refractive optical system and the reflective optical system are rotationally symmetric about the optical axis.

4. The projection optical system, as defined in claim 1, wherein the reflective optical system substantially consists of a mirror having negative refractive power.

5. The projection optical system, as defined in claim 1, wherein the following conditional formula (2) is satisfied:

$$\omega min/\omega max \leq 0.60 \quad (2).$$

6. The projection optical system, as defined in claim 1, wherein the following conditional formula (3) is satisfied:

$$0.095 \leq L/D \leq 0.45 \quad (3).$$

7. The projection optical system, as defined in claim 1, wherein the following conditional formula (4) is satisfied:

$$|\cos \theta - 2 \cos \phi \cos \psi| \leq 0.6 \quad (4),\text{ where}$$

θ: an angle between a chief ray from a most peripheral area on a display surface of the image display device and the optical axis when the chief ray exits from the refractive optical system,
   φ: an angle between a normal to the reflective optical system and the optical axis at a point where the chief ray from the most peripheral area on the display surface enters the reflective optical system, and
   ψ: an angle between the chief ray and the normal to the reflective optical system at the point where the chief ray from the most peripheral area on the display surface enters the reflective optical system.

8. The projection optical system, as defined in claim 1, wherein the following conditional formula (5) is satisfied:

$$0.5 \leq (ZL+ZD)/Hm \leq 2.1 \quad (5),\text{ where}$$

ZL: a total length of the refractive optical system,
   ZD: a distance on the optical axis between the refractive optical system and the reflective optical system, and Hm: a maximum effective diameter at a reflection surface of the reflective optical system.

9. The projection optical system, as defined in claim 1, wherein the refractive optical system includes at least one aspheric lens between optical element Lp and the reflective optical system when an optical element including one of a spherical surface or surfaces arranged closest to a magnification side in the refractive optical system is optical element Lp.

10. The projection optical system, as defined in claim 9, wherein a second lens group, as a whole, has positive refractive power when a lens system arranged between the optical element Lp and the reflective optical system is a first lens group in the refractive optical system and a lens system including the optical element Lp, and which is arranged toward a reduction side of the optical element Lp, is the second lens group in the refractive optical system.

11. The projection optical system, as defined in claim 10, wherein the first lens group substantially consists of two lenses of an aspheric lens having negative refractive power and an aspheric lens having positive refractive power in this order from the magnification side.

12. The projection optical system, as defined in claim 10, wherein the first lens group substantially consists of an aspheric lens having negative refractive power.

13. The projection optical system, as defined in claim 9, wherein a most-magnification-side surface of the optical element Lp has a convex shape toward the magnification side.

14. The projection optical system, as defined in claim 9, wherein a most-reduction-side surface of the optical element Lp has a concave shape facing the reduction side.

15. The projection optical system, as defined in claim 9, wherein the optical element Lp has negative refractive power.

16. The projection optical system, as defined in claim 10, wherein the second lens group substantially consists of a 2a-th lens group, in which the optical element Lp, a positive lens with its convex surface facing the magnification side, a negative lens with its concave surface facing the magnification side, a positive lens with its convex surface facing the reduction side and at least one positive lens having biconvex shape are arranged in this order from the magnification side, and a 2b-th lens group arranged toward the reduction side of the 2a-th lens group, and in which a most-magnification-side optical element has negative refractive power.

17. The projection optical system, as defined in claim 10, wherein the second lens group substantially consists of a 2a-th lens group, in which the optical element Lp, a negative lens with its concave surface facing the magnification side, a positive lens with its convex surface facing the reduction side and at least one positive lens having biconvex shape are arranged in this order from the magnification side, and a 2b-th lens group arranged toward the reduction side of the 2a-th lens group, and in which a most-magnification-side optical element has negative refractive power.

18. The projection optical system, as defined in claim 16, wherein the 2a-th lens group, as a whole, has positive refractive power.

19. The projection optical system, as defined in claim 16, wherein the 2b-th lens group, as a whole, has positive refractive power.

20. A projection-type display apparatus comprising:
a light source;
a light valve on which light from the light source is incident; and
the projection optical system, as defined in claim 1, as a projection optical system that projects an optical image of light that has been optically modulated by the light valve onto a screen.

* * * * *